US007851550B2

(12) United States Patent
Kadonaga et al.

(10) Patent No.: US 7,851,550 B2
(45) Date of Patent: Dec. 14, 2010

(54) METHOD FOR SURFACE CROSSLINKING WATER-ABSORBING RESIN AND METHOD FOR MANUFACTURING WATER-ABSORBING RESIN

(75) Inventors: Kenji Kadonaga, Kakogawa (JP); Yorimichi Dairoku, Himeji (JP); Shin-ichi Fujino, Himeji (JP); Hiroko Okochi, Himeji (JP); Yoshio Irie, Himeji (JP); Hideyuki Tahara, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 759 days.

(21) Appl. No.: 11/641,885

(22) Filed: Dec. 20, 2006

(65) Prior Publication Data

US 2007/0149760 A1 Jun. 28, 2007

(30) Foreign Application Priority Data

Dec. 22, 2005 (JP) ............................ 2005-370858
Jul. 13, 2006 (JP) ............................ 2006-193318

(51) Int. Cl.
*C08F 8/00* (2006.01)
*C08F 20/04* (2006.01)

(52) U.S. Cl. .................. 525/53; 525/329.5; 525/329.7; 525/330.1; 524/916; 528/502 R

(58) Field of Classification Search ............. 525/330.1, 525/53, 329.5, 329.7; 526/930; 524/916; 528/502 R
See application file for complete search history.

(56) References Cited

U.S. PATENT DOCUMENTS

| | | | | |
|---|---|---|---|---|
| 3,259,374 A | | 7/1966 | Doebl et al. | |
| 3,346,242 A | | 10/1967 | List | |
| 4,734,478 A | | 3/1988 | Tsubakimoto | |
| 5,140,076 A | | 8/1992 | Hatsuda | |
| 5,633,316 A | * | 5/1997 | Gartner et al. | 525/54.32 |
| 5,656,087 A | | 8/1997 | Kikuchi et al. | |

(Continued)

FOREIGN PATENT DOCUMENTS

| | | |
|---|---|---|
| EP | 0450923 A2 | 10/1991 |
| EP | 0629411 A1 | 12/1994 |
| EP | 0695763 A1 | 2/1996 |
| EP | 1462473 A1 | 9/2004 |

(Continued)

OTHER PUBLICATIONS

Partial European Search Report dated May 25, 2007.
European Search Report dated Nov. 26, 2007 for European patent application No. 06026348.0.

*Primary Examiner*—Fred M Teskin
(74) *Attorney, Agent, or Firm*—Harness, Dickey & Pierce, P.L.C.

(57) ABSTRACT

A method for surface crosslinking water-absorbing resin of the present invention includes a step (1) of obtaining a wet mixture, a step (2) of obtaining a dried particulate composition, and a step (3) of carrying out a surface crosslinking reaction. With this, since a processing time of each step becomes short, it is possible to mass produce the water-absorbing resin having excellent physical properties. Moreover, a method for manufacturing the water-absorbing resin of the present invention includes a modifying step and a cooling step. The modifying step and/or the cooling step are/is carried out by using stirring means including a rotation axis having a plurality of stirring boards, and the stirring means includes the stirring board having a specific thickness and/or a scraping blade having a specific shape. With this, it is possible to suppress the generation of the fine powder in the modifying step and/or the cooling step.

27 Claims, 4 Drawing Sheets

U.S. PATENT DOCUMENTS

| | | | |
|---|---|---|---|
| 5,672,633 | A | 9/1997 | Brehm |
| 5,837,789 | A | 11/1998 | Stockhausen |
| 6,254,990 | B1 | 7/2001 | Ishizaki |
| 6,300,423 | B1 | 10/2001 | Engelhardt et al. |
| 6,514,615 | B1 | 2/2003 | Sun et al. |
| 6,743,391 | B2 | 6/2004 | Sun |
| 6,841,229 | B2 | 1/2005 | Sun |
| 2001/0025093 | A1 | 9/2001 | Ishizaki |
| 2003/0118820 | A1 | 6/2003 | Sun |
| 2003/0118821 | A1 | 6/2003 | Sun |
| 2004/0181031 | A1 | 9/2004 | Nogi |
| 2004/0242761 | A1 | 12/2004 | Dairoku et al. |
| 2005/0048221 | A1 | 3/2005 | Irie |
| 2005/0101680 | A1 | 5/2005 | Sun |

FOREIGN PATENT DOCUMENTS

| | | |
|---|---|---|
| JP | 04-214734 | 8/1992 |
| JP | 2847113 | 11/1998 |
| JP | 11-302391 | 11/1999 |
| JP | 2002-121291 | 4/2002 |
| JP | 2002-515079 | 5/2002 |
| JP | 2003-503554 | 1/2003 |
| JP | 2004-300425 | 10/2004 |
| JP | 2004-352941 | 12/2004 |
| JP | 2004352941 | 12/2004 |

* cited by examiner

METHOD FOR SURFACE CROSSLINKING WATER-ABSORBING RESIN AND METHOD FOR MANUFACTURING WATER-ABSORBING RESIN

This Nonprovisional application claims priority under 35 U.S.C. §119(a) on Patent Application Nos. 370858/2005 and 193318/2006 filed in Japan respectively on Dec. 22, 2005, and on Jul. 13, 2006, the entire contents of which are hereby incorporated by reference.

FIELD OF THE INVENTION

The present invention relates to a method for surface crosslinking water-absorbing resin, and particularly to a method for surface crosslinking water-absorbing resin having excellent physical properties which method is suitable for manufacturing the water-absorbing resin on an industrial scale. Moreover, the present invention relates to a method for manufacturing water-absorbing resin, and more particularly to a method for manufacturing high-quality water-absorbing resin, the amount of fine power of which is small, by carrying out a modifying step and/or a cooling step by using a stirrer having a specific configuration.

BACKGROUND OF THE INVENTION

Water-absorbing resin has a property of absorbing a large amount of water, and is used as a material constituting sanitary goods such as paper diapers, sanitary napkins and incontinence pads, a water-retention agent for soil, a water sealing agent, a dew condensation preventing agent, a freshness keeping agent, a solvent dehydrating agent, a water-absorbing sheet of food, etc. As above, since the water-absorbing resin is widely used in the industry, the demand thereof is increasing more and more.

Especially in the case of sanitary goods such as paper diapers, etc., in order to reduce the thickness of the goods, the amount of pulp tends to be reduced and the amount of water-absorbing resin used tends to be increased. Moreover, since diapers became widespread worldwide, the demand thereof is increasing more and more.

Conventionally, by slightly crosslinking a hydrophilic polymer (crosslinking is usually carried out during polymerization), water-absorbing resin having a water insoluble property and a water swelling property is manufactured normally in the form of powdery particles. Examples of the water-absorbing resin are (i) a crosslinked polyacrylic acid partially neutralized product, (ii) hydrolysate of starch-acrylonitrile copolymer, (iii) a neutralized product of a starch-acrylic acid graft polymer, (iv) a saponified product of vinyl acetate-acrylic ester copolymer, (v) hydrolysate of acrylonitrile copolymer or acrylamide copolymer, (vi) crosslinked acrylonitrile copolymer, (vii) crosslinked acrylamide copolymer, (viii) crosslinked carboxymethylcellulose, (ix) crosslinked copolymer of 2-acrylamide-2-methylpropanesulfonic acid (AMPS), (x) crosslinked polyethylene oxide, (xi) crosslinked polyallylamine, and (xii) crosslinked polyethylenimine. However, in recent years, since there is a demand for high functions of the water-absorbing resin as improvements of performances of diapers, the method for manufacturing the water-absorbing resin has been improved variously. For example, by, in addition to the internal crosslinking of the powder, surface crosslinking (secondary crosslinking) the resin subjected to polymerization, a crosslink density gradient is given to the inside and surface of the resin. This improves the water-absorbing speed, liquid permeability and absorbency against pressure of the water-absorbing resin.

Then, in the case of sanitary goods such as paper diapers, etc., in order to reduce the thickness of the goods, there is a need for water-absorbing resin having high absorbency against pressure. Generally, the smaller the amount of fine powder (having a particle diameter of 150 μm or less) contained in the water-absorbing resin is, the better. This is because the fine powder causes clogging in water-absorbing goods such as diapers, and this becomes a factor of deteriorating liquid permeability. Such fine powder easily absorbs moisture, so that it becomes a factor of clogging in a process of manufacturing diapers, and moreover, it is not preferable for users in light of safety and health.

Disclosed as a method for manufacturing water-absorbing resin, the amount of fine powder of which is small, which has high absorbency against pressure, etc. is a method for (i) adding a crosslinking agent to dried water-absorbing resin powder, and (ii) when crosslinking the vicinity of the surface of the power while crushing the mixture, using water-absorbing resin coarse particles whose weight average particle diameters are from 200 μm to 1,000 μm (Document 1). The invention of Document 1 is as follows: When the water-absorbing resin has small particle diameters, the water-absorbing resin forms fish eyes by contacting with aqueous liquid, and an absorption speed deteriorates; Therefore, the particle diameter of the water-absorbing resin power before surface crosslinking is controlled to be large (coarse particles), and further, while crushing at least part of the particles, the vicinity of the surface is crosslinked; Thus, obtained is a water-absorbing agent, the amount of fine powder of which is small, and which has high absorbency against pressure and liquid permeability under pressure.

Moreover, disclosed are (i) a method for manufacturing the water-absorbing resin which method is characterized in that when surface crosslinking the water-absorbing resin, a crosslinking reaction is completed at 90° C. to 250° C. by using a horizontal stirring drier, a rotary drier, a disc drier, a mix drier, a fluidized bed dryer, a through-flow dryer, an infrared dryer, etc. (Document 2), and (ii) a method for manufacturing the water-absorbing resin which method is characterized in that a surface crosslinking agent is added to an internal crosslinked polymer prepared by sieve classification so that its particles are from 150 μm to 850 μm, and the resulting mixture is heated by a paddle mixer so as to be surface crosslinked (Document 3).

However, there is a problem with the techniques of Documents 1 to 3 in that a large amount of coarse particles (aggregate of the water-absorbing resin) remain in the water-absorbing resin. When the coarse particles remains in the water-absorbing resin, the sense of use of the product such as diapers is not good. Therefore, it is necessary to remove those coarse particles. However, it is necessary to carry out, for example, classification to remove the coarse particles. Moreover, throwing away the classified coarse particles is economically disadvantageous. Meanwhile, crushing the coarse particles generates fine powder.

Here, disclosed is a method for heating a mixture of the water-absorbing resin and a surface crosslinking agent-containing aqueous solution by using a stirring dryer including stirring boards having scraping blades or a stirring dryer including crushing means between stirring boards, so as to complete the surface crosslinking while suppressing the generation of the coarse particles (Document 4).

Moreover, disclosed as a method for carrying out a surface crosslinking treatment of the water-absorbing resin by using a stirrer including stirring boards is a method for manufacturing the water-absorbing resin which method is characterized in that the water-absorbing resin subjected to the heat treatment is stirred and cooled down under a stream of air by using a stirring cooler including stirring boards for the purpose of sufficiently achieving the effect of improving physical properties by the surface crosslinking on an industrial scale (Document 5).

Further, Document 6 discloses a method for (i) adding aqueous liquid containing a surface crosslinking agent to water-absorbing resin powder obtained through steps such as polymerization of monomers, heating, drying, cooling, and crushing, and (ii) heating and drying the mixture, so as to surface crosslink the water-absorbing resin powder.

Moreover, Document 7 discloses a method for treating with heat more than once the water-absorbing resin subjected to the surface treatment, for the purpose of delaying free water absorption. Moreover, Document 8 discloses that an expansion strength under pressure can be improved by repeating twice a step of adding surface treatment agent-containing liquid to the water-absorbing resin and heating this mixture.

[Document 1]

Japanese Unexamined Patent Publication 11-302391 (Tokukaihei 11-302391, published on Nov. 2, 1999)

[Document 2]

Japanese Unexamined Patent Publication 4-214734 (Tokukaihei 4-214734, published on Aug. 5, 1992)

[Document 3]

Published Japanese Translation of PCT International Publication for Patent Application 2002-515079 (Tokuhyo 2002-515079, published on May 21, 2002)

[Document 4]

Japanese Unexamined Patent Publication 2004-352941 (Tokukai 2004-352941, published on Dec. 16, 2004)

[Document 5]

Japanese Unexamined Patent Publication 2004-300425 (Tokukai 2004-300425, published on Oct. 28, 2004)

[Document 6]

Japanese Unexamined Patent Publication 2002-121291 (Tokukai 2002-121291, published on Apr. 23, 2002)

[Document 7]

Published Japanese Translation of PCT International Publication for Patent Application 2003-503554 (Tokuhyo 2003-503554, published on Jan. 28, 2003)

[Document 8]

Japanese Patent No. 2847113 (registered on Nov. 6, 1998) (Kyohyo (National Publication of Translated Version) No.: Published Japanese Translation of PCT International Publication for Patent Application 9-502221 (Tokuhyohei 9-502221, published on Mar. 4, 1997))

As disclosed in Documents 4 and 5, conventionally, in the case of improving the functionality of the water-absorbing resin by the surface treatment, it is believed that it is effective to use a stirrer such as a stirring dryer or stirring cooler including stirring boards in light of improvement of miscibility. Meanwhile, in the case of using the stirrer as disclosed in the techniques of Documents 4 and 5, there is still such a problem that a large amount of fine powder is generated during the surface crosslinking treatment. If a large amount of fine powder is generated, a surface crosslinked layer tends to be destroyed. Thus, a large amount of fine power adversely affects the physical properties of the water-absorbing resin.

The above problem may be caused because the shape of the stirring board is not appropriate for stirring a hydrophilic crosslinked polymer. That is, in conventional technologies, the stirring board is used to improve the miscibility, and the shape thereof is determined to improve the miscibility. Therefore, conventionally, there is no idea of using the stirring board to suppress the generation of the fine powder. That is, the shape of the stirring board is not determined to suppress the generation of the fine powder.

For example, since the difference between the maximum thickness and minimum thickness of the stirring board used in conventional techniques is large, too much pressure is applied to the powder of the hydrophilic crosslinked polymer when the stirring board breaks into the powder, and the powder is compressed. Thus, the density of the powder is increased, and the water-absorbing resin is damaged mechanically during the surface crosslinking treatment. As a result, the amount of fine powder may increase.

Moreover, in addition to the improvement of the functions of the water-absorbing resin, there is a problem of how to effectively massproduce the water-absorbing resin without deteriorating its performances to keep up with a growing demand for the water-absorbing resin in recent years. As disclosed in Documents 7 and 8, a method for improving the functionality by the surface treatment has already been suggested. However, the deterioration of the physical properties of the water-absorbing resin due to damage, etc. to the water-absorbing resin by the heat treatment device including stirring blades has not been discussed in light of the surface treatment, although this deterioration is problematic when scaling up the manufacture of the water-absorbing resin.

Here, as a method for increasing the amount of production of the water-absorbing resin, it may be possible to use a large heat treatment device that is simply a larger version of an existing heat treatment device. However, in the large heat treatment device, the heat transfer area with respect to the effective volume is small. Therefore, in order to keep the temperature of the water-absorbing resin within a certain range and cause a desired surface crosslinking reaction, it is necessary to extend a time for the water-absorbing resin to stay in the above device. Then, if a time for stirring the water-absorbing resin by the stirring board during the surface crosslinking treatment becomes long, the water-absorbing resin is damaged mechanically. As a result, the amount of fine powder increases, and the physical properties of the water-absorbing resin deteriorate.

That is, conventionally, there is no finding regarding what stirrer can suppress the generation of the fine powder and manufacture high-performance water-absorbing resin.

In order to avoid (i) the generation of the fine powder which generation is caused due to the increase in size of a device and (ii) the deterioration of the physical properties due to the generation of the fine powder, it may be possible to simply arrange a plurality of small heat treatment devices in parallel. However, since the numbers of accessory devices and pipings provided in front of and behind each heat treatment device increase by arranging a plurality of heat treatment devices, the cost increases. Moreover, since it is necessary to control a plurality of heat treatment devices, the efficiency deteriorates.

Here, there is a demand for a method for surface crosslinking the water-absorbing resin which method can effectively massproduce the water-absorbing resin on an industrial scale and can maintain the performances of the water-absorbing resin.

SUMMARY OF THE INVENTION

The present invention was made to solve the above problems. In order to manufacture water-absorbing resin, the amount of fine powder of which is small and which has excellent physical properties, an object of the present invention is to provide (i) a method for manufacturing the water-absorbing resin, the method including a modifying step and/or a cooling step which are carried out by using a stirrer having a specific configuration, and (ii) a method for surface crosslinking the water-absorbing resin in which method a processing time of a heat treatment is shortened when scaling up manufacturing of the water-absorbing resin.

The present inventors have focused on and diligently studied the configuration of a stirrer used for the surface crosslinking treatment of the water-absorbing resin. As a result, it is found that by (i) carrying out the modifying step and/or the cooling step by using the stirrer having the specific configuration and (ii) when surface crosslinking the water-absorbing resin, carrying out, as separate steps, a stirring/drying step and a surface crosslinking step which are included in the modifying step, it is possible to optimize stirring conditions and temperature conditions for each step. As a result, it is found that the processing time of the heat treatment can be shortened, the damage to the water-absorbing resin can be reduced, and the water-absorbing resin, the amount of fine powder of which is small, can be manufactured without decreasing the amount of production. Thus, the present invention has been completed.

That is, a method for manufacturing water-absorbing resin of the present invention includes: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (i) the modifying step and/or the cooling step are/is carried out by using stirring means including a rotation axis having a plurality of stirring boards, and (ii) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board is 5 or less in a cross section taken along a y-z plane of the stirring means.

According to the above configuration, since the ratio of the maximum thickness to the minimum thickness is 5 or less, that is, a plurality of stirring boards each of whose thickness is comparatively uniform are used, it is possible to significantly reduce a pressure applied to the hydrophilic crosslinked polymer per cross-sectional area of the stirring board, and also possible to reduce friction generated between the stirring board and the hydrophilic crosslinked polymer. Therefore, it is possible to uniformly stir the hydrophilic crosslinked polymer while reducing mechanical damage to the hydrophilic crosslinked polymer. On this account, it is possible to manufacture the water-absorbing resin, the amount of fine powder of which is small.

Moreover, a method for manufacturing water-absorbing resin of the present invention includes: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step are/is carried out by using stirring means including a rotation axis having a plurality of stirring boards having scraping blades, and (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring means is 10% or more but less than 50% of an area in the y-z plane between one stirring board from which the scraping blade projects and another stirring board provided so as to face the above one stirring board, and (ii) a length of the scraping blade in the y direction in the cross section taken along the y-z plane is 50% or more of a distance in the y-z plane between the above one stirring board and the above another stirring board.

In the case of using a stirring dryer or stirring cooler used in conventional technologies, the hydrophilic crosslinked polymer is compressed excessively as the stirring of the hydrophilic crosslinked polymer continues, the hydrophilic crosslinked polymer is damaged mechanically, and the fine powder is generated. However, according to the above configuration, since the cross-sectional area and length of the scraping blade provided on the stirring board are adjusted to be in the above ranges, the hydrophilic crosslinked polymer is not compressed excessively and can be stirred in a floating state, and the aggregate and compression of the hydrophilic crosslinked polymer can be prevented. Therefore, it is possible to uniformly stir the mixture of the hydrophilic crosslinked polymer and the aqueous solution, and also possible to suppress the generation of the fine powder.

Therefore, it is possible to manufacture the water-absorbing resin, the amount of fine powder of which is small. Moreover, since the hydrophilic crosslinked polymer can be less compressed, and the degree of compression of the hydrophilic crosslinked polymer can be lowered, it is possible to stir the hydrophilic crosslinked polymer with a low stirring power, and also possible to improve producibility.

Moreover, it is preferable that a method for surface crosslinking water-absorbing resin of the present invention include the steps of: (1) mixing a solution containing a surface crosslinking agent with a water-absorbing resin precursor, so as to obtain a wet mixture; (2) stirring and drying the wet mixture, so as to obtain a dried particulate composition containing the surface crosslinking agent; and (3) carrying out a heat treatment of the dried particulate composition, so as to cause a surface crosslinking reaction of the dried particulate composition, and in this method, 80 weight % or more of the dried particulate composition obtained in the step (2) be particles which pass through a sieve having a mesh size of 10 mm, each of the steps (2) and (3) be carried out by using at least one processing device, and the processing device used for the step (2) and the processing device used for the step (3) be serially connected to each other.

According to the above configuration, by stirring and drying the wet mixture so that the aggregate of particles which occurs when processing the wet mixture is suppressed, it is possible to obtain the dried particulate composition which is powder having high flowability. Therefore, in the step of causing the surface crosslinking reaction, it is possible to carry out a desired surface crosslinking with weak stirring or a device having no stirring blade. Therefore, it is possible to stably manufacture the water-absorbing resin having excellent physical properties.

Moreover, in order to solve the above problems, it is preferable that a method for surface crosslinking water-absorbing resin of the present invention include the steps of: (1) mixing a solution containing a surface crosslinking agent with a water-absorbing resin precursor, so as to obtain a wet mixture; (2) stirring and drying the wet mixture, so as to obtain a dried particulate composition containing the surface crosslinking agent; and (3) carrying out a heat treatment of the dried particulate composition, so as to cause a surface crosslinking reaction of the dried particulate composition, and in this method, 80 weight % or more of the dried particulate composition obtained in the step (2) be particles which pass through a sieve having a mesh size of 10 mm, the steps (2) and (3) be carried out by using one processing device, and the steps (2) and (3) be carried out under different heating conditions and/or different stirring conditions.

According to the above configuration, stirring conditions and temperature setting can be determined in accordance with the characteristics of the powder in each of the steps (2) and (3). As a result, it is possible to shorten the processing time of the heat treatment. Therefore, the damage to the water-absorbing resin is reduced, and it is possible to obtain the water-absorbing resin having excellent physical properties without decreasing the amount of production.

Moreover, by carrying out the steps (2) and (3) by using one processing device, it is possible to avoid problems, such as cost increase and space expansion due to an increase in number of devices.

Moreover, it is preferable that a method for manufacturing water-absorbing resin of the present invention include: a modifying step that (i) is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer and (ii) includes a step (2) of stirring and drying the mixture, so as to obtain a dried particulate composition containing the surface crosslinking agent, and a step (3) of carrying out a heat treatment of the dried particulate composition, so as to cause a surface crosslinking reaction of the dried particulate composition; and a cooling step of cooling down the hydrophilic crosslinked polymer thus surface crosslinked, and in this method, (I) at least one of the step (2), the step (3) and the cooling step be carried out by using a processing device including stirring means including a rotation axis having a plurality of stirring boards, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board be 5 or less in a cross section taken along a y-z plane of the stirring means, (III) the mixture be a wet mixture manufactured in a step (1) of mixing the hydrophilic crosslinked polymer containing the carboxyl group with the aqueous solution containing the surface crosslinking agent containing two or more functional groups which react with the carboxyl group, (IV) 80 weight % or more of the dried particulate composition obtained in the step (2) be particles which pass through a sieve having a mesh size of 10 mm, (V) each of the steps (2) and (3) be carried out by using at least one processing device, and (VI) the processing device used for the step (2) and the processing device used for the step (3) be serially connected to each other.

According to the above configuration, the stirring means including the rotation axis having the stirring boards each having the above shape can be used for at least one of the step (2), the step (3) and the cooling step.

Therefore, in the modifying step and/or the cooling step, it is possible to uniformly stir the hydrophilic crosslinked polymer while suppressing the mechanical damage to the hydrophilic crosslinked polymer. Further, by stirring and drying, in the step (2), the wet mixture so that the aggregate of particles which occurs when processing the wet mixture is suppressed, it is possible to obtain the dried particulate composition which is powder having high flowability. Then, in the step (3), it is possible to carry out a desired surface crosslinking with weak stirring or a device having no stirring blade.

As a result, it is possible to realize the reduction in the mechanical damage and the shortening of the processing time of the heat treatment.

Therefore, it is possible to efficiently manufacture the water-absorbing resin, the amount of fine powder of which is small and which has excellent characteristics.

Moreover, it is preferable that a method for manufacturing water-absorbing resin of the present invention include: a modifying step that (i) is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer and (ii) includes a step (2) of stirring and drying the mixture, so as to obtain a dried particulate composition containing the surface crosslinking agent, and a step (3) of carrying out a heat treatment of the dried particulate composition, so as to cause a surface crosslinking reaction of the dried particulate composition; and a cooling step of cooling down the hydrophilic crosslinked polymer thus surface crosslinked, and in this method, (I) at least one of the step (2), the step (3) and the cooling step be carried out by using a processing device including stirring means including a rotation axis having a plurality of stirring boards having scraping blades, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (a) a cross-sectional area of the scraping blade in a cross section taken along a y-z plane of the stirring means be 10% or more but less than 50% of an area in the y-z plane between one stirring board from which the scraping blade projects and another stirring board provided so as to face the above one stirring board, and (b) a length of the scraping blade in the y direction in the cross section taken along the y-z plane be 50% or more of a distance in the y-z plane between the above one stirring board and the above another stirring board, (III) the mixture be a wet mixture manufactured in a step (1) of mixing the hydrophilic crosslinked polymer containing the carboxyl group with the aqueous solution containing the surface crosslinking agent containing two or more functional groups which react with the carboxyl group, (IV) 80 weight % or more of the dried particulate composition obtained in the step (2) be particles which pass through a sieve having a mesh size of 10 mm, (V) each of the steps (2) and (3) be carried out by using at least one processing device, and (VI) the processing device used for the step (2) and the processing device used for the step (3) be serially connected to each other.

According to the above configuration, the stirring means including the rotation axis having stirring boards having the scraping blades each having the above shape can be used for at least one of the step (2), the step (3) and the cooling step. Therefore, in the modifying step and/or the cooling step, the hydrophilic crosslinked polymer and/or the water-absorbing resin can be stirred uniformly in a floating state. Further, by stirring and drying, in the step (2), the wet mixture so that the aggregate of particles which occurs when processing the wet mixture is suppressed, it is possible to obtain the dried particulate composition which is powder having high flowability. Then, in the step (3), it is possible to carry out a desired surface crosslinking with weak stirring or a device having no stirring blade.

As a result, it is possible to realize the reduction in the mechanical damage, energy saving of the stirring power, and the shortening of the processing time of the heat treatment. Therefore, it is possible to efficiently manufacture the water-absorbing resin, the amount of fine powder of which is small and which has excellent characteristics.

Moreover, it is preferable that a method for manufacturing water-absorbing resin of the present invention include: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step be carried out by using a processing device including stirring means including a rotation axis having a plurality of stirring boards, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board be 5 or less in a cross section taken along a y-z plane of the stirring means, (III) the mixture be a wet mixture manufactured in a step (1) of mixing the hydrophilic crosslinked polymer containing the carboxyl group with the aqueous solution containing the surface crosslinking agent containing two or more functional groups which react with the carboxyl group, (IV) the modifying step include a step (2) of stirring and drying the wet mixture, so as to obtain a dried particulate composition containing the surface crosslinking agent and a step (3) of carrying out a heat treatment of the dried particulate composition, so as to cause a surface crosslinking reaction of the dried particulate composition, (V) 80 weight % or more of the dried particulate composition obtained in the step (2) be particles which pass through a sieve having a mesh size of 10 mm, (VI) the steps (2) and (3) be carried out by using one processing device, and (VII) the steps (2) and (3) be carried out under different heating conditions and/or different stirring conditions.

According to the above configuration, the modifying step and/or the cooling step are/is carried out by using the stirring means including the rotation axis having the stirring boards each having the above shape, and the steps (2) and (3) in the modifying step can be carried out by one processing device. Moreover, stirring conditions and/or temperature conditions in the steps (2) and (3) can be set appropriately for each step.

Therefore, in the modifying step and/or the cooling step, it is possible to uniformly stir the hydrophilic crosslinked polymer while suppressing the mechanical damage to the hydrophilic crosslinked polymer. Further, stirring conditions and temperature setting can be determined in accordance with the characteristics of the powder in each of the steps (2) and (3).

As a result, it is possible to realize the reduction in the mechanical damage and the shortening of the processing time of the heat treatment. Therefore, it is possible to obtain the water-absorbing resin having excellent physical properties.

Moreover, by carrying out the steps (2) and (3) by using one processing device, it is possible to avoid problems, such as cost increase and space expansion due to an increase in number of devices.

Moreover, it is preferable that a method for manufacturing water-absorbing resin of the present invention include: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step be carried out by using a processing device including stirring means including a rotation axis having a plurality of stirring boards having scraping blades, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring means be 10% or more but less than 50% of an area in the y-z plane between one stirring board from which the scraping blade projects and another stirring board provided so as to face the above one stirring board, and (ii) a length of the scraping blade in the y direction in the cross section taken along the y-z plane be 50% or more of a distance in the y-z plane between the above one stirring board and the above another stirring board, (III) the mixture be a wet mixture manufactured in a step (1) of mixing the hydrophilic crosslinked polymer containing the carboxyl group with the aqueous solution containing the surface crosslinking agent containing two or more functional groups which react with the carboxyl group, (IV) the modifying step include a step (2) of stirring and drying the wet mixture, so as to obtain a dried particulate composition containing the surface crosslinking agent and a step (3) of carrying out a heat treatment of the dried particulate composition, so as to cause a surface crosslinking reaction of the dried particulate composition, (V) 80 weight % or more of the dried particulate composition obtained in the step (2) be particles which pass through a sieve having a mesh size of 10 mm, (VI) the steps (2) and (3) be carried out by using one processing device, and (VII) the steps (2) and (3) be carried out under different heating conditions and/or different stirring conditions.

According to the above configuration, the modifying step and/or the cooling step are/is carried out by using the processing device including the stirring means including the rotation axis having a plurality of stirring boards having the scraping blades each having the above shape, and the steps (2) and (3) in the modifying step can be carried out by one processing device. Moreover, stirring conditions and/or temperature conditions in the steps (2) and (3) can be set appropriately for each step.

Therefore, in the modifying step and/or the cooling step, the hydrophilic crosslinked polymer and/or the water-absorbing resin can be stirred uniformly in a floating state. Further, stirring conditions and temperature setting can be determined in accordance with the characteristics of the powder in each of the steps (2) and (3).

As a result, it is possible to realize the reduction in the mechanical damage, energy saving of the stirring power, and the shortening of the processing time of the heat treatment. Therefore, it is possible to efficiently manufacture the water-absorbing resin, the amount of fine powder of which is small and which has excellent characteristics.

Moreover, by carrying out the steps (2) and (3) by using one processing device, it is possible to avoid problems, such as cost increase and space expansion due to an increase in number of devices.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention. However, the present invention is not limited to this.

[Aspect of Stirrer (Stirring Means) Used in Modifying Step and/or Cooling Step in Method for Manufacturing Water-Absorbing Resin of Present Invention]

<Thickness of Stirring Board>

In one embodiment, a method for manufacturing water-absorbing resin of the present invention includes: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (A) the modifying step and/or the cooling step are/is carried out by using stirring means including a rotation axis having a plurality of stirring boards, and (B) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board is 5 or less in a cross section taken along a y-z plane of the stirring means.

In the present embodiment, the modifying step and/or the cooling step are/is carried out by using the stirring means having the stirring board whose thickness is within a predetermined range.

Figure 1:
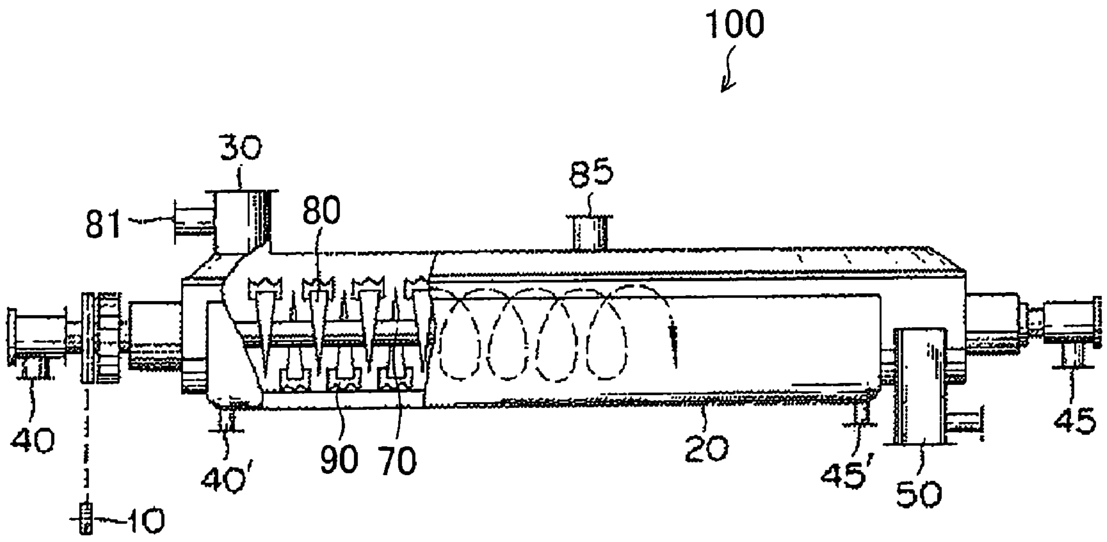
FIG. 1 is a cross-sectional diagram showing one example of a configuration of a stirrer (stirring means) used in the present embodiments.

FIG. 1 is a cross-sectional diagram showing one example of a configuration of a stirrer (stirring means) 100 used in the present embodiment. Moreover, in the present specification, the term “stirring board” is synonymous with the term “stirring blade”.

As shown in FIG. 1, the stirrer 100 includes a driving device 10, a horizontal drum 20, a raw material supply opening 30, heat medium/cooling medium input ports 40 and 40', heat medium/cooling medium outlet ports 45 and 45', a water-absorbing resin discharge opening 50, a carrier gas installation port 81, and an exhaust port 85. Inside the horizontal drum 20, stirring boards 80 are provided on a rotation axis 70 which rotates by the driving device 10, and the stirring board 80 has a scraping blade 90.

In FIG. 1, the stirring board 80 has the scraping blade 90. However, in the present embodiment, the stirring board 80 may or may not have the scraping blade 90. Details of the scraping blade will be described later.

The shape of the stirring board 80 is not especially limited as long as the stirring board 80 can stir the above mixture supplied from the raw material supply opening 30 to the horizontal drum 20. For example, the shape of the stirring board 80 may be a disc shape or a disc shape a part of which is lacking. Moreover, the shape of the stirring board 80 may be a fan shape that is a disc shape a part of which is lacking. However, in light of the reduction in the density of powder in the hydrophilic crosslinked polymer, the shape of the stirring board 80 is preferably a disc shape, and especially preferably a flat disc shape. The term “disc shape” means that the shape of a cross section taken along an x-z plane of the stirring board is a circle, however this circle does not have to be a complete circle. The term “flat disc shape” means that the surface of the stirring board having the disc shape is flat. Moreover, the term “disc shape a part of which is lacking” means that the shape of the cross section taken along the x-z plane of the stirring board is a circle but this circle is partially lacking. This lacking portion is not especially limited, and may be, for example, an outer circumference of the disc shape or the inside of the disc shape. A case where the inside of the disc shape is lacking includes a case where, for example, the stirring board has a hole.

In the case of using the stirring board having the fan shape, the inner angle of the fan is preferably from 15 degrees to 75 degrees, and more preferably from 30 degrees to 60 degrees. When the inner angle of the fan is smaller than 15 degrees and when it is larger than 75 degrees, an effect of suppressing the generation of the fine powder deteriorates.

FIG. 2(A) is a cross-sectional diagram taken along a y-z plane of the stirrer (stirring means) 100 including stirring boards 80*a* each having a wedge shape. FIG. 2(B) is a cross-sectional diagram taken along an x-z plane of the stirrer (stirring means) 100 including stirring boards 80*a* each having a flat disc shape (fan shape).

Figure 2:
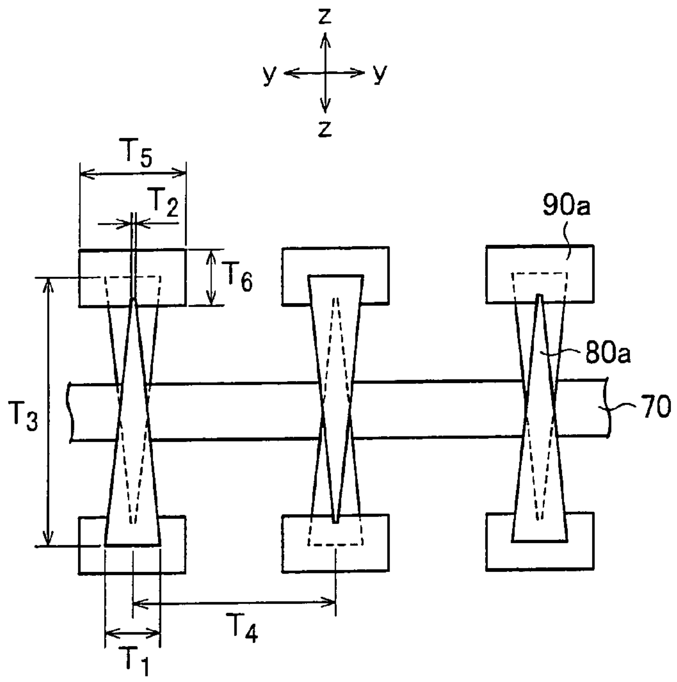
FIG. 2(A) is a cross-sectional diagram taken along a y-z plane of a stirrer (stirring means) including stirring boards each having a wedge shape.
FIG. 2(B) is a cross-sectional diagram taken along an x-z plane of a stirrer (stirring means) including stirring boards each having a wedge shape.
Figure 2:
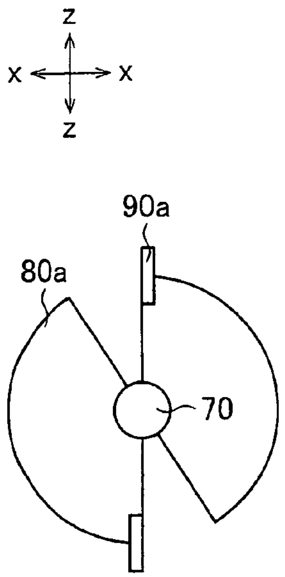
Figure 3:
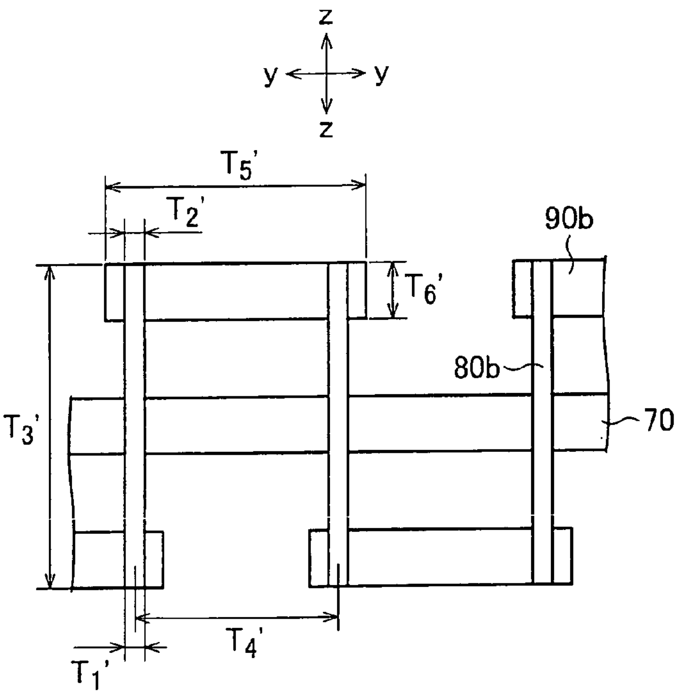
FIG. 3(A) is a cross-sectional diagram taken along a y-z plane of a stirrer (stirring means) including stirring boards each having a flat disc shape (fan shape).
FIG. 3(B) is a cross-sectional diagram taken along an x-z plane of a stirrer (stirring means) including stirring boards each having a flat disc shape (fan shape).
Figure 3:
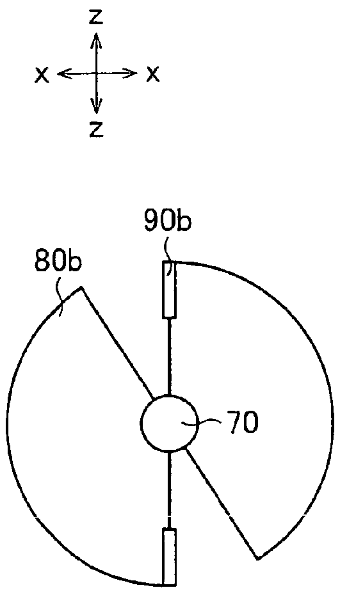

Moreover, FIG. 3(A) is a cross-sectional diagram taken along a y-z plane of the stirrer (stirring means) 100 including stirring boards 80*b* each having a flat disc shape (fan shape). FIG. 3(B) is a cross-sectional diagram taken along an x-z plane of the stirrer (stirring means) 100 including the stirring boards 80*b* each having a flat disc shape (fan shape). Note that FIGS. 2 and 3 show the stirring boards 80*a* and 80*b*, the rotation axis 70 and scraping blades 90*a* and 90*b*, and other members are not shown.

In the cross section taken along the y-z plane of the stirrer (stirring means) 100, a ratio of the maximum thickness of the stirring board 80 to the minimum thickness of the stirring board 80 needs to be 5 or less. The ratio of the maximum thickness to the minimum thickness means a ratio of the maximum value of a thickness of the stirring board in a cross section taken along the y-z plane of the stirring means to the minimum value of the thickness of the stirring board in the cross section taken along the y-z plane of the stirring means. For example, in FIG. 2(A), the above ratio can be expressed by $T_1/T_2$, and in FIG. 3(A), the above ratio can be expressed by $T_1'/T_2'$.

By setting the ratio of the maximum thickness to the minimum thickness to 5 or less, the thickness of the stirring board 80 becomes comparatively uniform. Therefore, it is possible to drastically reduce a pressure per cross-sectional area of the stirring board 80 applied to the hydrophilic crosslinked polymer, and also possible to reduce friction generated between the stirring board 80 and the hydrophilic crosslinked polymer. On this account, it is possible to uniformly stir the hydrophilic crosslinked polymer while reducing mechanical damage to the hydrophilic crosslinked polymer, and thereby possible to suppress the generation of the fine powder. The ratio of the maximum thickness to the minimum thickness is not especially limited as long as it is 5 or less. However, the ratio is preferably 4 or less, more preferably 3 or less, further preferably 2 or less, and most preferably 1. Moreover, the stirring board 80 may have a rounded portion at its top so that it can smoothly cut into a powder layer.

The stirring means using the stirring board has already been disclosed in, for example, Document 4. However, the thickness of the stirring board has not been considered at all, and the generation of the fine powder could not have been suppressed sufficiently. The present invention is completed as a result of study on an appropriate thickness of the stirring board for suppressing the amount of fine powder.

The more the ratio of the maximum thickness of the stirring board 80 to the minimum thickness of the stirring board 80 approaches 1, the smaller the difference between the maximum thickness and the minimum thickness becomes. That is, since the gradient of the stirring board 80 in the cross section taken along the y-z plane of the stirrer (stirring means) 100 becomes gentle, the pressure and frictional force applied to the hydrophilic crosslinked polymer during stirring become weaker. Thus, it is possible to suppress the generation of the fine powder. In contrast, when the ratio of the maximum thickness of the stirring board 80 to the minimum thickness of the stirring board 80 is more than 5, the gradient of the stirring board 80 becomes steep. Thus, the pressure and frictional force applied to the hydrophilic crosslinked polymer during stirring become strong. As a result, the hydrophilic crosslinked polymer is compressed, the density of powder increases, and the hydrophilic crosslinked polymer is easily destroyed. Therefore, it is difficult to suppress the generation of the fine powder.

In order to sufficiently stir the hydrophilic crosslinked polymer and efficiently carry out the surface crosslinking, a plurality of the stirring boards 80 are provided. Note that the number of the stirring boards 80 is not especially limited as long as it is plural, and the number of the stirring boards 80 may be set properly depending on the size of the stirrer (stirring means) 100 and a manufacturing scale. Regarding all the stirring boards, the ratio of the maximum thickness to the minimum thickness needs to be 5 or less. As long as this ratio is 5 or less regarding all the stirring boards, the thicknesses of these stirring boards may be the same as each other or may be different from each other.

Moreover, the size of the stirring board 80 is not especially limited as long as the ratio of the maximum thickness to the minimum thickness is 5 or less, and the size of the stirring board 80 may be set properly depending on the size of the stirrer (stirring means) 100. Moreover, the diameter of the stirring board is preferably 9.0 cm or more, more preferably 40 cm or more, and especially preferably 60 cm or more.

<Scraping Blade>

In one embodiment, a method for manufacturing water-absorbing resin of the present invention includes: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (A) the modifying step and/or the cooling step are/is carried out by using stirring means including a rotation axis having a plurality of stirring boards having scraping blades, and (B) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring means is 10% or more but less than 50% of an area in the y-z plane between one stirring board from which the scraping blade projects and another stirring board provided so as to face the above one stirring board, and (ii) a length of the scraping blade in the y direction in the cross section taken along the y-z plane is 50% or more of a distance in the y-z plane between the above one stirring board and the above another stirring board.

The scraping blade is a plate-like member fixed to the stirring board, and the material thereof is not especially limited. Although the stirring means using the scraping blade has already been disclosed in, for example, Document 4, the shape of the scraping blade for suppressing the generation of the fine powder has not yet been considered in detail. For example, Document 4 discloses only the length of the scraping blade projecting from the stirring board.

The present inventor has achieved the present invention by finding that since, by adjusting the area and length of the scraping blade in an appropriate range, it is possible to stir the hydrophilic crosslinked polymer in a floating state without excessively compressing the hydrophilic crosslinked polymer and also possible to prevent the aggregate and compression of the hydrophilic crosslinked polymer, it is possible to stir the hydrophilic crosslinked polymer uniformly and suppress the generation of the fine powder.

The scraping blade is provided on the stirring board so as to project from the stirring board in the y-z plane. The above expression "project from the stirring board" means that, in other words, the scraping blade is provided so as to cross the stirring board in the y-z plane. For example, in the y-z plane of FIG. 2(A), the scraping blade 90*a* is provided on the stirring board 80*a* so as to project from the stirring board 80*a* and cross the stirring board 80*a* at a right angle. Moreover, for example, in the y-z plane of FIG. 3(A), the scraping blade 90*b* is provided so as to project from the stirring board 80*b* and cross the stirring board 80*b* at a right angle. Note that FIGS. 2(A) and 3(A) are just examples, and the angle of crossing is not limited to the right angle.

As long as the scraping blade projects from the stirring board in the y-z plane, it may be attached to the stirring board as a separate member. That is, the scraping blade may be configured as a member separated from the stirring board, and may be connected to the stirring board. Moreover, as long as the functions of the scraping blade are not hindered, the scraping blade may be formed integrally with the stirring board.

The shape of the scraping blade is not especially limited as long as the area and length of the scraping blade are in the above ranges. Moreover, the number of the scraping blades is not especially limited as long as it is at least 1.

The above expression "another stirring board provided so as to face the above one stirring board" means another stirring board adjacent in the y direction to one stirring board from which the scraping blade projects. Moreover, the above expression "area in the y-z plane between one stirring board from which the scraping blade projects and another stirring board provided so as to face the above one stirring board" (area between the stirring boards) means an area of a region which is sandwiched by these stirring boards in the y-z plane. For example, in FIG. 2(A), this area is an area obtained by $T_3 \times T_4$, and in FIG. 3(A), this area is an area obtained by $T_3' \times T_4'$.

The cross-sectional area of the scraping blade occupies 10% or more but less than 50% of the area between the stirring boards, and it is preferably 10% or more but less than 40%, further preferably 15% or more but less than 40%, and most preferably 20% or more but less than 40%. When the cross-sectional area of the scraping blade is less than 10% of the area between the stirring boards, the efficiency of stirring and the delivery of powder deteriorate, and it is impossible to improve the aggregate of the hydrophilic crosslinked polymer. Therefore, it is difficult to suppress the generation of the fine powder. Moreover, it is not preferable that the cross-sectional area of the scraping blade be more than 50% of the area between the stirring boards. This is because, in this case, the scraping blade is too large, and therefore stirring power needs to be high. On this account, the stirring speed decreases, the stirring becomes nonuniform, and a layer of the hydrophilic crosslinked polymer becomes nonuniform.

Note that the scraping blade needs only to project from one stirring board, and does not have to project from a plurality of stirring boards. However, for example, as shown in FIG. 3(A), it is preferable that (i) the scraping blade project from a plurality of stirring boards, and (ii) in the cross section taken along the y-z plane of the stirring means, adjacent scraping blades be provided alternately while sandwiching the rotation axis or be provided in parallel with each other. The cross-sectional area of the scraping blade is, for example, an area of the scraping blade in the area between the stirring boards. Examples of the cross-sectional area of the scraping blade are an area expressed by $(T_6 \times T_5) \div 2 \times 4$ in FIG. 2(A), and an area expressed by $T_6' \times T_5'$ in FIG. 3(A).

Thus, the cross-sectional area of the scraping blade can be made larger relative to the area between the stirring boards, and the length of the scraping blade can be increased. Moreover, the scraping blade is strongly fixed to the stirring board. Further, an arbitrary angle setting can be carried out to improve the proceeding of the powder layer. Therefore, the efficiency of stirring and the delivery of powder can be improved, and the surface crosslinking can be carried out uniformly.

The above expression "the scraping blade projects from a plurality of stirring boards" is not limited to a case shown in FIG. 3(A) where the scraping blade projects from two stirring boards, and includes a case where the scraping blade projects from three or more stirring boards. The above expression "adjacent scraping blades" means one scraping blade and another scraping blade which are adjacent to each other in the y direction in the cross section taken along the y-z plane of the stirring means.

Moreover, the above expression "in the cross section taken along the y-z plane of the stirring means, adjacent scraping blades be provided alternately while sandwiching the rotation axis" means that, in the y-z plane, the adjacent scraping blades are located so as to be opposite to each other when viewed from the z direction while sandwiching the rotation axis.

Further, the above expression "in the cross section taken along the y-z plane of the stirring means, adjacent scraping blades be provided in parallel with each other" means that, in the y-z plane, two scraping blades are provided so as to sandwich the rotation axis, and each scraping blade has a gradient angle.

Moreover, in the x-y plane and/or the x-z plane and/or the y-z plane, the scraping blade can be attached to the stirring board so as to be inclined at an arbitrary angle. The above "gradient angle" means the above "arbitrary angle", and is preferably 0 degree or more but less than 45 degrees, more preferably 0.5 degree or more but less than 10 degrees, further preferably 1 degree or more but less than 7 degrees, and most preferably 3 degrees or more but less than 7 degrees.

The length of the scraping blade in the y direction in the cross section taken along the y-z plane occupies 50% or more of the distance in the y-z plane between the above one stirring board and the above another stirring board. Moreover, the above length occupies preferably 80% or more, and most preferably 100%. When the length of the scraping blade is less than 50% of the distance between the stirring boards, it is impossible to obtain sufficient power for stirring the mixture of the hydrophilic crosslinked polymer and the aqueous solution. Therefore, the surface of the resin is crosslinked nonuniformly, so that the above configuration is not suitable as a stirrer for the water-absorbing resin.

Meanwhile, the upper limit of the length of the scraping blade in the y direction is not especially limited, and may be more than 100% of the distance between the stirring boards as long as the efficiency of stirring and the delivery of powder do not deteriorate.

The above expression "the length of the scraping blade in the y direction" means, for example, a length expressed by $T_5$ $(T_5 \div 2 \times 2)$ in FIG. 2(A), and a length expressed by $T_5'$ in FIG. 3(A). Moreover, the above expression "a distance in the y-z plane between the above one stirring board and the above another stirring board" means a length expressed by, for example, $T_4$ in FIG. 2(A), or a length expressed by $T_4'$ in FIG. 3(A).

Moreover, the "distance in the y-z plane between the above one stirring board and the above another stirring board" is, on an industrial scale, preferably from 5 cm to 40 cm, more preferably from 10 cm to 40 cm, further preferably from 10 cm to 30 cm, and especially preferably from 15 cm to 25 cm.

In the present embodiment, by setting the cross-sectional area of the scraping blade in the above range and also setting the length of the scraping blade in the y direction in the above range, it is possible to stir the hydrophilic crosslinked polymer in a floating state without excessively compressing the hydrophilic crosslinked polymer, prevent the aggregate and compression of the hydrophilic crosslinked polymer, and decrease the density of powder. Therefore, it is possible to uniformly stir the mixture of the hydrophilic crosslinked polymer and the aqueous solution and also possible to suppress the generation of the fine powder.

Moreover, in one embodiment of a method for manufacturing water-absorbing resin of the present invention, it is preferable that (i) the cross-sectional area of the scraping blade be set in the above range, (ii) the length of the scraping blade in the y direction be set in the above range, and (iii) in the cross section taken along the y-z plane of the stirring means, the ratio of the maximum thickness of the stirring board to the minimum thickness of the stirring board be set to 5 or less. Thus, since the shape of the scraping blade is set in an appropriate range, and the thickness of the stirring board is set in an appropriate range, it is possible to obtain a high effect of suppressing the generation of the fine powder.

<Aspect of Stirring Board>

It is preferable that the stirring board also act as heat transferring means. As above, the surface crosslinking of the hydrophilic crosslinked polymer is carried out by heating the mixture of the hydrophilic crosslinked polymer containing the carboxyl group and the aqueous solution containing the surface crosslinking agent containing two or more functional groups which react with the carboxyl group. In this case, heating means is not especially limited as long as it can uniformly heat the above mixture. For example, it is possible to use, as heating means, vapor, thermal oil, electric energy, warm air, etc., as long as these can heat the above mixture uniformly.

However, as above, in the present invention, since the thickness of the stirring board is controlled and the stirring can be carried out uniformly, it is preferable that the stirring board also act as heat transferring means. Thus, it is possible to heat the above mixture uniformly, and also possible to proceed with a surface crosslinking reaction uniformly.

When the stirring board also acts as the heat transferring means, for example, (i) a flow path in which the heat medium can circulate is provided inside the stirring board or on the surface of the stirring board, (ii) the heat medium is supplied to the flow path, (iii) the surface of the stirring board is utilized as a heat transferring surface, and (iv) the temperature of this surface is set to a temperature necessary for the surface crosslinking. The temperature of the heat medium may be adjusted properly by using a conventionally known temperature control device, so as to be a temperature necessary for the surface crosslinking. In order to efficiently utilize the heat medium, the flow path may be provided in or on the rotation axis, and the heat medium may circulate in each stirring board. Moreover, similarly, the flow path may be provided in or on the scraping blade, and the heat medium may be supplied to the flow path of the scraping blade.

Moreover, it is preferable that the stirring board also act as cooling means. In order to immediately terminate the surface crosslinking after a desired surface crosslinking is completed, it is preferable to quickly and uniformly cool down the mixture. In this case, the cooling means is not especially limited as long as it can uniformly cool down the mixture. For example, it is possible to use a conventionally known cooling device. The cooling medium is not especially limited as long as it can uniformly cool down the mixture, and may be water, cold water, wind, ventilation, air flow, etc.

However, as above, in the present invention, since the thickness of the stirring board is controlled and the stirring can be carried out uniformly, it is preferable that the stirring board also act as the cooling means. Thus, it is possible to uniformly cool down the mixture, and also possible to uniformly stop the surface crosslinking reaction.

For example, when the stirring board also acts as the cooling means, (i) a flow path in which the cooling medium such as water can circulate is provided inside the stirring board or on the surface of the stirring board, (ii) the cooling medium is supplied to the flow path, (iii) the surface of the stirring board is utilized as a cooling surface, (iv) the temperature of this surface is set to a temperature necessary for terminating the surface crosslinking. The temperature of the cooling medium may be adjusted properly by using a conventionally known temperature control device, so as to be a temperature necessary for terminating the surface crosslinking. In order to efficiently utilize the cooling medium, the flow path may be provided in or on the rotation axis, and the cooling medium may circulate in each stirring board. Moreover, similarly, the flow path may be provided in or on the scraping blade, and the cooling medium may be supplied to the flow path of the scraping blade.

[Manufacture of Water-Absorbing Resin]

A method for manufacturing water-absorbing resin of the present invention includes (i) a step (hereinafter referred to as "water-absorbing resin precursor manufacturing step") of manufacturing a hydrophilic crosslinked polymer (In the present specification, this polymer may be referred to as "water-absorbing resin precursor".) containing a carboxyl group, (ii) a step (1) (hereinafter referred to as "wet mixture preparing step") of mixing (a) the above polymer and (b) an aqueous solution (hereinafter referred to as "aqueous solution") containing the surface crosslinking agent containing two or more functional groups which react with the carboxyl group, so as to obtain a wet mixture, (iii) a step (2) (hereinafter referred to as "stirring/drying step") of stirring and drying the wet mixture so as to obtain a dried particulate composition containing the surface crosslinking agent, (iv) a step (3) (hereinafter referred to as "surface crosslinking step") of heating the dried particulate composition so as to cause the surface crosslinking reaction, and (v) "a cooling step" of cooling down the hydrophilic crosslinked polymer thus surface crosslinked.

Here, the "surface crosslinking method" used in the present specification is a method including the steps (1), (2) and (3). Moreover, the modifying step is a step of heating the mixture of the hydrophilic crosslinked polymer containing the carboxyl group and the aqueous solution containing the surface crosslinking agent containing two or more functional groups which react with the carboxyl group, so as to crosslink the surface of the hydrophilic crosslinked polymer. The modifying step includes the steps (2) and (3).

Figure 5:
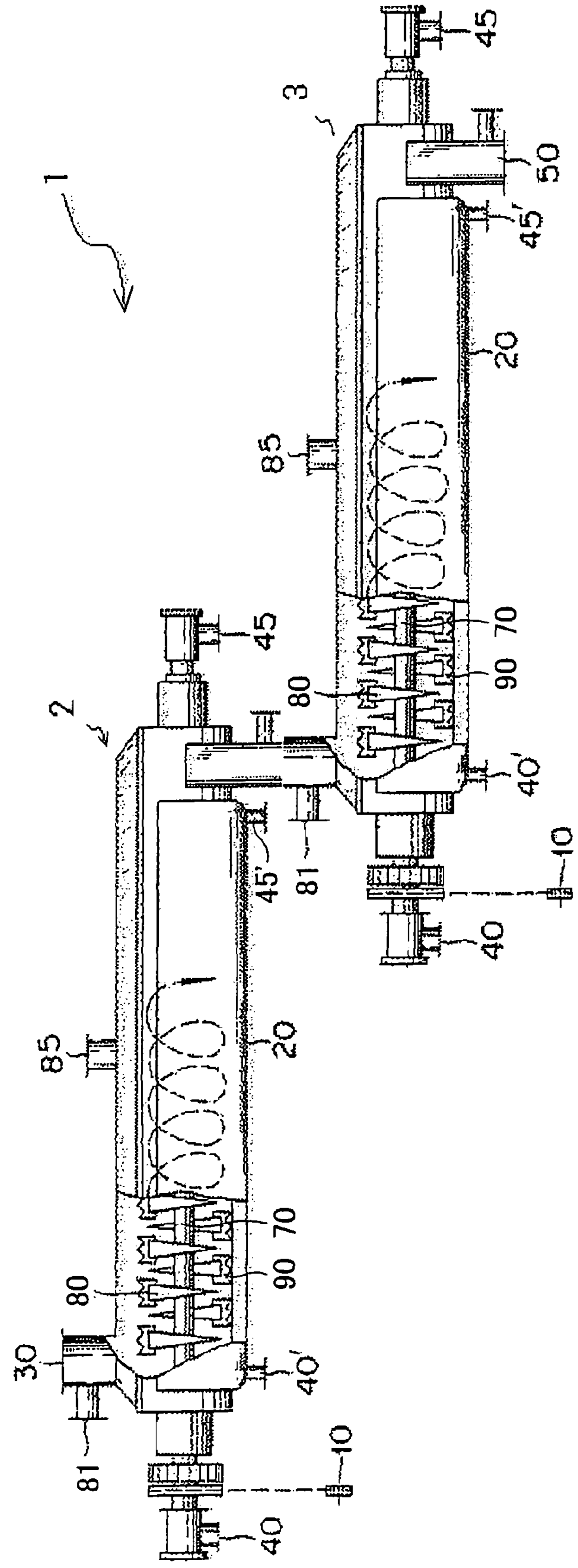
FIG. 5 is a schematic diagram showing a longitudinal cross-section of a water-absorbing resin manufacturing device of the present embodiments.

In reference to FIGS. 1 and 5, the following will explain the modifying step and cooling step in the method for manufacturing the water-absorbing resin of the present invention, and then explain the entire method for manufacturing the water-absorbing resin of the present invention.

(1. Modifying Step)

The following will explain one embodiment of the modifying step in reference to FIG. 1. That is, after the wet mixture preparing step, the mixture, supplied from the raw material supply opening 30, of (a) the hydrophilic crosslinked polymer and (b) the aqueous solution containing the surface crosslinking agent containing two or more functional groups which react with the carboxyl group floats in the stirrer (stirring means) 100 by (i) the rotation of the stirring board 80 which rotates in accordance with the rotation of the driving device 10 and (ii) the rotation of the scraping blade 90 provided on the stirring board 80, and the mixture is heated and dried by contacting with the stirring board 80 which contains the heat medium (stirring/drying step).

Although the mixture is wet at first, it is stirred and heated by the stirring board 80, and the hydrophilic crosslinked polymer is surface crosslinked (surface crosslinking step). The mixture moves in the drum 20 from the raw material supply opening 30 to the discharge opening 50. By carrier gas, such as a small amount of air or inactive gas, supplied from the carrier gas installation port 81, vapor generated during the heating flows above the top surface of a heating/stirring layer and is discharged from the exhaust port 85. The mixture supplied continuously is mixed and heated by the rotation of the stirring board 80. Then, the mixture moves toward the discharge opening 50 and is discharged therefrom.

In FIG. 1, the number of the rotation axes 70 attached to the stirrer (stirring means) is 1, however the number of the rotation axes 70 is not especially limited, and it is preferable that the number of the rotation axes 70 be plural in light of the efficiency of stirring with respect to the effective volume. For example, when a plurality of the rotation axes 70 are attached to the stirrer (stirring means), it is preferable that these rotation axes 70 be attached in parallel in the x-y plane. When there are a plurality of the rotation axes 70, a plurality of the stirring boards 80 provided on different rotation axes 70 may overlap each other and engage with each other, or may be independent from each other and not engage with each other.

As shown in FIG. 1, the heat medium/cooling medium input port 40 is provided at one end of the hollow rotation axis 70, and the heat medium/cooling medium outlet port 45 is provided at another end of the hollow rotation axis 70. Since the heat medium moves from the heat medium/cooling medium input port 40 through the hollow of the rotation axis to the heat medium/cooling medium outlet port 45 and also flows into the stirring board 80, the surface of the stirring board 80 is also heated by the heat medium. Note that the flow of the heat medium or the cooling medium may be set to a counter flow or a parallel flow with respect to the flow of the material in the device. In FIG. 1, the heat medium is supplied to the stirring board 80, and the surface of the stirring board 80 is used as the heat transferring surface. However, as above, the heat medium does not have to flow into the stirring board 80. Note that an arrow in FIG. 1 indicates a direction of the rotation of the stirring board 80. As the stirrer (stirring means) 100 shown in FIG. 1, it is possible to use, for example, a multi-fin processor (produced by Nara Machinery Co., Ltd., NFP-1.6W).

Water-absorbing resin is used in a wide range of applications, and is general-purpose resin which should be massproduced. Therefore, it is necessary that the stirrer (stirring means) 100 can carry out heating uniformly in a short period of time, complete the surface crosslinking, and carry out continuous operation. The amount of the mixture filled with respect to the internal volume of the stirrer (stirring means) 100 is not especially limited, but the amount of the mixture filled is preferably suitable for a large scale production that is more than a certain amount, and in addition, the amount of the mixture filled is preferably suitable for the continuous production. Using, as a reference, the mass of the mixture of the water-absorbing resin and the aqueous solution containing the surface crosslinking agent when put in the stirrer (stirring means) 100, it is preferable that, for example, the amount of the mixture filled per internal volume be preferably from 150 $kg/m^3$ to 700 $kg/m^3$, and especially preferably from 200 $kg/m^3$ to 600 $kg/m^3$.

The water-absorbing resin can be obtained by stirring and heating the above mixture and surface crosslinking the hydrophilic crosslinked polymer. In the present specification, the hydrophilic crosslinked polymer which has been subjected to the surface crosslinking in the modifying step is termed the water-absorbing resin. Since the water-absorbing resin shrinks by drying, a filling rate in the stirrer changes chronologically. In the case of less than 150 $kg/m^3$, the generation of powder may occur. Meanwhile, in the case of more than 700 $kg/m^3$, the surface crosslinking may be insufficient.

In the present embodiment, a time for mixing the mixture, that is, a staying time of the mixture in the device can be determined freely depending on the number of the rotation axes 70, whether the stirring board 80 has the scraping blade 90, whether the stirring board 80 has a lacked portion, the internal volume of the stirrer (stirring means) 100, etc., however it is generally from 10 minutes to 120 minutes, and preferably from 20 minutes to 90 minutes. This staying time can be controlled by adjusting the mount of a raw material supplied.

Moreover, the number of rotations of the stirring board 80 is not especially limited, but is preferably from 2 rpm to 40 rpm, and more preferably from 5 rpm to 30 rpm. The number of rotations of the stirring board 80 can be determined properly depending on the staying time and the presence or absence of the generation of the aggregate.

Moreover, the following will explain another embodiment of the modifying step in reference to FIG. 5. That is, in the present embodiment, a water-absorbing resin manufacturing device includes, as shown in FIG. 5, a first processing device 2 and a second processing device 3. Each of the first processing device 2 and the second processing device 3 includes a driving device 10, a horizontal drum 20, a raw material supply opening 30, heat medium input ports 40 and 40', heat medium outlet ports 45 and 45', a water-absorbing resin discharge opening 50, a carrier gas installation port 81, and an exhaust port 85 (see FIG. 5).

Note that the water-absorbing resin discharge opening of the first processing device 2 is connected to the raw material supply opening of the second processing device 3.

Specific operations of a water-absorbing resin manufacturing device shown in FIG. 5 are as follows. A wet mixture (raw material) of (a) the water-absorbing resin precursor and (b) a solution containing the surface crosslinking agent which mixture is supplied from the raw material supply opening 30 of the first processing device 2 floats by the rotation of the stirring board 80 which rotates in accordance with the rotation of the driving device 10, and the mixture is heated and dried by contacting with the stirring board 80 which contains the heat medium. Although the wet mixture supplied from the raw material supply opening 30 is wet at first, it passes through the lacked portion (not shown) of the stirring board 80 in the drum 20, and moves to the second processing device 3. By the carrier gas, such as a small amount of air or inactive gas, supplied from the carrier gas installation port 81, the vapor generated during the heating flows above the top surface of the heating/stirring layer and is discharged from the exhaust port 85. Even if the wet mixture combines each other by the stirring and heating, and aggregates are generated, the rotation of the stirring board 80 breaks these aggregates. Similarly, the mixture supplied continuously is mixed and heated by the rotation of the stirring board 80, and moves to the second processing device 3.

The dried particulate composition (powder) having moved to the second processing device 3 moves in the same manner as the wet mixture moving in the first processing device 2. Then, finally, the water-absorbing resin having excellent physical properties is discharged from the water-absorbing resin discharge opening 50.

In the embodiment shown in FIG. 5, both the first processing device 2 and the second processing device are biaxial trough stirring dryers. As another embodiment, the first processing device 2 and the second processing device 3 may be conventionally known processing devices or heat treatment devices. For example, as such a processing device or a heat treatment device, it is possible to use a mixer which is generally used to mix powder. When these devices need to carry out heating, it is possible to use a heat source. Examples are (i) heating by causing pressurized vapor or thermal oil to circulate in a heat medium circulating device and (ii) heating by heating wire, microwave, or electromagnetic induction. These heat medium circulating device and heating device can be attached to any locations, such as a jacket which can be attached to the processing device and the inside of the stirring blade. The type of the heat source, the spec of a heat source device, the set temperature of the heat source, and the amount of heat supplied from the heat source per unit time can be set properly depending on the type of the surface crosslinking agent used and the type of the heat treatment device used.

When roughly classifying mixers, which are generally used for powder, by mechanical actions applied to the powder, there are (i) a mixer in which a container itself rotates, vibrates, and shakes, such as a container rotating type mixer and a built-in stirring blade/container rotating type mixer, (ii) a mixer in which a container is fixed and a stirring blade, etc. carries out stirring, such as a horizontal rotation axis mechanical stirring type mixer and a vertical rotation axis mechanical stirring type mixer, (iii) a mixer which carries out stirring by air or gas, such as a flow stirring type mixer, (iv) a mixer which uses gravity flow and flow paths divided by branching plates or tubes. Other examples of the mixer are a high-speed shearing mixer and an impact mixer. Regarding the types of the mixers in the above respective classifications, examples of the container rotating type mixer are a horizontal cylinder type mixer, a gradient cylinder type mixer, a V-type mixer, a double cone type mixer, and a continuous V-type mixer, examples of the built-in stirring blade/container rotating type mixer are a horizontal cylinder type mixer, a gradient cylinder type mixer, a V-type mixer, and a double cone type mixer, examples of the horizontal rotation axis mechanical stirring type mixer are a ribbon mixer, a screw mixer, a lot mixer, a pin mixer, and a paddle mixer, examples of the vertical rotation axis mechanical stirring type mixer are a ribbon mixer, a screw mixer, a cone screw mixer, a high-speed flow mixer, a rotating disc mixer, and a muller mixer, and examples of the flow stirring type mixer are a fluidized bed mixer, a circular flow mixer, and a jet pump mixer.

As processing types of these devices, there are a batch type and a continuous processing type. However, the present invention is not especially limited. A mixer suitable for the object of the present invention can be used among commercially available mixers. In addition to the above examples, it is possible to use a mixer suitable for the object of the present invention.

Moreover, in another embodiment, the first processing device 2 and the second processing device 3 may be different types of heat treatment devices or may be the same type of heat treatment devices. Moreover, in yet another embodiment, in the case of a water-absorbing resin manufacturing device in which three or more heat treatment devices are connected to each other, any combination is possible (for example, some of these heat treatment devices are the same, but the rest is/are different).

Since the first processing device 2 is used for the stirring/drying step, it is preferable that the first processing device 2 can carry out strong stirring. Among the above examples, a processing device having a stirring blade is preferable. Examples of such a processing device are a paddle dryer produced by Nara Machinery Co., Ltd., and a single paddle dryer produced by Nara Machinery Co., Ltd. Meanwhile, since the second processing device 3 is used for the surface crosslinking step, it is preferable that the stirring of the second processing device 3 carry out weaker stirring than the first processing device 2. Among the above examples, a heat treatment device having a stirring blade whose shape is such that shearing is not applied by stirring is preferable, and a heat treatment device having no stirring blade is also preferable. One example of the processing device having the stirring blade which does not cause damage by stirring is the multi-fin processor produced by Nara Machinery Co., Ltd., and one example of the processing device having no stirring blade is a towered dryer produced by Nara Machinery Co., Ltd.

Further, although, in the water-absorbing resin manufacturing device (show in FIG. 5) of the present embodiment, the second processing device 3 is the biaxial trough stirring dryer having the stirring boards 80, the second processing device 3 may be, as another embodiment, a dryer having no stirring board 80.

The shape of the stirring blade of the water-absorbing resin manufacturing device shown in FIG. 5 is not especially limited, and it is possible to use conventionally known stirring blade arbitrary. For example, the shape of the stirring blade may be the shape explained in the above <Thickness of Stirring Board>. Moreover, as explained in the above <Scraping Blade>, the scraping blade 90 may be provided on the stirring board 80 to carry out stirring efficiently, or may not be provided.

For the purpose of stirring powder more efficiently, in the first processing device 2, it is preferable that, for example, a plurality of axes be provided, the stirring board have the scraping blade, and the contact area of the stirring blade with the powder be large. In the second processing device 3, it is preferable that, for example, a plate-like stirring blade be provided perpendicular to an axis so that shearing is not applied to the powder. The number of the stirring blades per unit length of a stirring axis depends on the shape of the stirring blade. However, the larger the number of the stirring blades is, the more the efficiency of stirring increases.

Note that in the present specification, the term "stirring axis" is synonymous with the term "rotation axis".

Moreover, the diameter of the stirring blade is not especially limited. However, the first processing device 2 needs to carry out stronger stirring than the second processing device 3. Therefore, if the number of rotations of the stirring blade of the first processing device 2 and the number of rotations of the stirring blade of the second processing device 3 are the same, it is preferable that the diameter of the stirring blade of the first processing device 2 be larger than that of the stirring blade of the second processing device 3.

Moreover, if the diameter of the stirring blade of the first processing device 2 and the diameter of the stirring blade of the second processing device 3 are the same, it is preferable that the number of rotations of the stirring blade of the first processing device 2 be set to be larger than that of the stirring blade of the second processing device 3. Note that it is preferable that stirring conditions of the first processing device 2 and second processing device 3 satisfy the above conditions, however these stirring conditions are not especially limited to specific numerical values.

Generally, in the first processing device 2, the number of rotations of the stirring blade is preferably in a range from 5 rpm to 300 rpm, more preferably in a range from 10 rpm to 300 rpm, and further preferably in a range from 20 rpm to 300 rpm. Moreover, a peripheral speed of the stirring blade is preferably from 0.15 m/s to 10 m/s, more preferably from 0.3 m/s to 10 m/s, and further preferably from 0.5 m/s to 10 m/s.

In the second processing device 3, the number of rotations of the stirring blade is preferably from 0 rpm to 30 rpm, more preferably from 0 rpm to 20 rpm, and further preferably from 0 rpm to 10 rpm. Moreover, the peripheral speed of the stirring blade is preferably 2 m/s or less, more preferably 1 m/s or less, and further preferably 0.3 m/s or less.

In the water-absorbing resin manufacturing device shown in FIG. 5, it is preferable that the discharge opening incline downwardly. Since this configuration does not require forced stirring during discharging, it is possible to reduce the damage to the water-absorbing resin manufactured. A downwardly inclined portion may be provided inside the device, however such a configuration can be realized by causing the device itself to incline when installing the device. The above downward inclination is usually a slight inclination. Therefore, even if the device is caused to incline when installing the device, no problems occur regarding the operations of the device and the installation of the device. Note that the downward inclination is not a must. Especially, a heat treatment device having a delivering blade does not require such a downward inclination.

Moreover, as shown in FIG. 5, in the water-absorbing resin manufacturing device of the present embodiment, the water-absorbing resin discharge opening 50 is provided downwardly. According to this configuration, when conveying the water-absorbing resin powder, the powder can be discharged downwardly only by gravity. Therefore, it is possible to reduce the damage to the water-absorbing resin manufactured.

Further, in the water-absorbing resin manufacturing device shown in FIG. 5, the first processing device 2 and the second processing device 3 are connected to each other in a hierarchical manner. Therefore, power is not especially required to convey the resin powder from the first processing device 2 to the second processing device 3.

The carrier gas installation port 81 and the exhaust port 85 are formed for aeration by the carrier gas. The carrier gas is not especially limited, but examples thereof are vapor, air, and nitrogen. Moreover, the amount of carrier gas supplied is not especially limited, and may be determined properly. Further, the carrier gas is preferably heated so as not to lower the temperature inside the heat treatment device.

According to the above configuration, the vapor generated during the reaction is removed efficiently. Therefore, it is possible to dry the water-absorbing resin in a short period of time.

Moreover, the first processing device 2 and/or the second processing device 3 may include means for depressurizing or pressurizing the carrier gas. Further, the first processing device 2 and/or the second processing device 3 may include means for heating or cooling the carrier gas. Specifically, it is preferable that the first processing device 2 and/or the second processing device 3 can supply the carrier gas (for example, air) of around room temperature (for example, 0° C. to 50° C.) at substantially normal pressure ($1.013\times10^5$ Pa (1 atmospheric pressure)±10%, preferably ±5%, and more preferably ±1%).

Note that in the present embodiment, the carrier gas installation port 81 and the exhaust port 85 are provided. As another embodiment, the carrier gas installation port 81 and the exhaust port 85 may not be provided.

Moreover, it is preferable that the second processing device 3 can heat the water-absorbing resin powder discharged from the water-absorbing resin discharge opening 50 so that the temperature of the water-absorbing resin powder is from 180° C. to 250° C., more preferably from 180° C. to 230° C., and further preferably from 190° C. to 210° C. Thus, the surface crosslinking step in the method for surface crosslinking the water-absorbing resin can be carried out efficiently.

(2. Cooling Step)

The hydrophilic crosslinked polymer (hereinafter referred to as "water-absorbing resin") surface crosslinked is subjected to the cooling step. Means for carrying out the cooling is not especially limited as long as it can cool down the mixture uniformly. For example, it is possible to use a conventionally known cooling device which can be connected to the stirrer (stirring means) 100. In the cooling step, the water-absorbing resin may or may not be stirred. However, in light of improvement of the efficiency of cooling, it is preferable to stir the water-absorbing resin. As described above, the cooling medium is not especially limited, and may be water, cold water, wind, etc. Moreover, as with the stirrer 100, it is preferable to use a device which is configured so that the cooling medium circulate in each stirring board 80. Moreover, it is preferable that the surface crosslinked water-absorbing resin be cooled down to from about room temperature to 100° C. A cooling device used in the cooling step is, for example, a device connected to the stirrer (stirring means) 100 to cool down the surface crosslinked water-absorbing resin after the surface crosslinking.

Regarding a timing of starting the cooling step, the water-absorbing resin taken out of the stirrer (stirring means) 100 starts to be cooled down preferably within 1 minute after the surface crosslinking, and more preferably within 30 seconds after the surface crosslinking. Moreover, in light of the physical properties and the productivity, the temperature of the water-absorbing resin when starting the cooling is preferably from 150° C. to 250° C., and the temperature of the water-absorbing resin after the cooling is preferably from 40° C. to 100° C., more preferably 90° C. or less, and especially preferably 70° C. or less.

In the cooling device, the water-absorbing resin has a temperature gradient. That is, the temperature of the water-absorbing resin near an input port of the cooling device is a surface treatment temperature or close to the surface treatment temperature, and the temperature of the water-absorbing resin near an outlet port of the cooling device is close to a cooling predetermined temperature. Factors of determining the temperature of the water-absorbing resin at the outlet port are the temperature of the cooling medium, the heat transfer area of the cooling device, and the staying time in the cooling device, and these factors may be set properly so that a desired temperature of the water-absorbing resin at the outlet port can be obtained.

Moreover, it is preferable that the cooling device be provided so that the water-absorbing resin is fed continuously. The cooling device may be placed longitudinally (the water-absorbing resin is fed from top to bottom), or may be placed laterally (the water-absorbing resin is fed laterally). However, especially when the cooling device is provided laterally, it is preferable that the cooling device not be placed horizontally but be placed so as to incline downwardly. When the cooling device does not incline, it is difficult to stably feed the water-absorbing resin due to the powder characteristics of the heated water-absorbing resin. Therefore, the physical properties of the water-absorbing resin may deteriorate, or may become unstable. How much the cooling device inclines downwardly is determined properly, but the downward inclination is preferably from 0.1 degree to 30 degrees, more preferably from 1 degree to 20 degrees, and further preferably from 3 degrees to 15 degrees.

Further, in the modifying step, it is preferable to use the stirrer (stirring means) 100 which inclines downwardly. That is, in addition to the cooling device which inclines, it is preferable that the stirrer used for the modifying step that is before the cooling also incline. Thus, it is possible to carry out steps of obtaining preferable physical properties of the water-absorbing resin of the present invention. Since the stirrer (stirring means) 100 inclines downwardly, it is possible to improve piston flowability of the powder during continuous driving, and also possible to easily switch from one product to another.

Piston flow (also referred to as "extrusion flow" or "plug flow") is defined as flow that, ideally, (i) has a velocity distribution which is uniform when viewed from a direction perpendicular to a direction of a material flowing from an input port of a device to an outlet port of the device and (ii) moves in a flow direction without mixing or dispersing.

By the improvement of the piston flowability of the water-absorbing resin powder, the staying time of the water-absorbing resin powder in the stirrer (stirring means) 100 or in the cooling device becomes stable, and the modifying step and the cooling step are carried out stably, and it is possible to stably manufacture the water-absorbing resin powder having high physical properties. Moreover, since a phenomenon that part of the water-absorbing resin powder stays in a device for a long time does not occur, the generation of powder of the water-absorbing resin does not occur. Thus, it is possible to suppress the generation of the fine powder.

Moreover, by the improvement of the piston flowability, an essential field (zone) of an specific temperature range in a powder layer in the cooling device is formed more clearly for adding aqueous liquid (will be described later), and the addition of the aqueous liquid becomes easier.

When the piston flowability is low, the staying time of the water-absorbing resin powder in the stirrer (stirring means) 100 or in the cooling device varies largely. Therefore, the physical properties of the water-absorbing resin become unstable, or products having low physical properties and a large amount of fine powder are manufactured. Moreover, the field of the specific temperature range which field is essential for the addition of the aqueous liquid (will be described later) is formed unclearly, and the addition of the aqueous liquid becomes difficult.

Moreover, as disclosed in Document 5, it is preferable that the aqueous liquid be added in the cooling step. By adding, during the cooling after the modifying step, water or aqueous liquid containing water as the main component (In the following explanation, both of water and the aqueous liquid are collectively called the "aqueous liquid") to the field of 40° C. to 100° C. of the water-absorbing resin powder, it is possible to reduce the generation of the fine powder and dust. Moreover, it is possible to obtain, without a common granulating step, the water-absorbing resin powder which is equivalent to granulated water-absorbing resin powder.

That is, it is possible to granulate the water-absorbing resin powder by adding the aqueous liquid. That is, it is possible to easily carry out granulation without using expensive equipment only for granulation. In this case, as conditions in the cooling step, usually, the temperature of the water-absorbing resin powder when starting the cooling step is more than 100° C., and the temperature of the water-absorbing resin powder after the cooling step is preferably 70° C. or less.

The addition of water to the water-absorbing resin usually causes heat generation, not heat absorption. By adding the aqueous liquid to the water-absorbing resin powder, an exothermic reaction by the heat of hydration occurs, and the water-absorbing resin generates heat. However, at the same time, the water-absorbing resin is forcibly cooled down in the cooling device. Therefore, the surface characteristics of the water-absorbing resin changes, and the water-absorbing resin having more excellent physical properties can be obtained. Moreover, the generation of the fine powder may be suppressed, and the form of the resin powder may become satisfactory.

Moreover, by the addition of the aqueous liquid, the flowability of the wet water-absorbing resin can be further improved, the amount of fine powder of the water-absorbing resin can be reduced, and the destruction of the surface of the water-absorbing resin in the following process can be prevented. Thus, by adding the aqueous liquid to the field of 40° C. to 100° C. of the water-absorbing resin powder, it is possible to obtain the water-absorbing resin powder (i) whose mass average particle diameter is from 200 μm to 600 μm, and preferably from 300 μm to 500 μm, and (ii) whose amount of fine powder having a diameter of 150 μm or less is 5 mass %, preferably 3 mass %, and further preferably 1 mass % or less.

The addition of the aqueous liquid to the cooling device is carried out with respect to the field of 40° C. to 100° C. of the water-absorbing resin powder, preferably 50° C. to 90° C., and further preferably 60° C. to 80° C. The term "field" used herein indicates a region (zone) having a specific temperature when the temperature of the water-absorbing resin continuously flowing changes (lowers) continuously. When adding the aqueous liquid to the field of 40° C. or less, (i) the water-absorbing resin may become agglomerates (clumps), and these agglomerates may block the outlet port of the cooling device, (ii) the water-absorbing resin may adhere to the heat transferring surface of the cooling device, this may lower the efficiency of heat transfer, and the efficiency of cooling may deteriorate practically, and (iii), the water-absorbing resin constituting the agglomerates may be damaged when destroying these agglomerates, and the physical properties of the water-absorbing resin may deteriorate.

Moreover, when the aqueous liquid is added to the field of 100° C. or more, (i) a low-boiling point component (for example, water) in the aqueous liquid vaporizes, and the aqueous liquid is not be added to the water-absorbing resin effectively, (ii) dew condensation occurs in the cooling device by, for example, the above vaporized water, and the agglomerates are formed by the dew condensation water, (iii) the agglomerates block the outlet port of the cooling device, and stable driving cannot be carried out, (iv) the water-absorbing resin adheres to the heat transferring surface of the cooling device, this lowers the efficiency of heat transfer, and the efficiency of cooling deteriorates practically and the physical properties of the water-absorbing resin deteriorate. When adding the aqueous liquid in the cooling step, it is necessary to add the aqueous liquid to the field of the above-described temperatures. A method for finding out these preferable temperature ranges in the cooling device is, for example, (i) to actually measure temperatures under set driving conditions or (ii) to assume a counter flow or parallel flow contact-type heat exchanger from the temperature of the water-absorbing resin at the input port of the cooling device, the temperature of the water-absorbing resin at the outlet port of the cooling device, the specific heat of the water-absorbing resin, the speed of supply, the temperature of the cooling medium at the input port, the temperature of the cooling medium at the outlet port, etc., calculate an overall heat transfer coefficient, use the heat transfer area as a function of the distance in the flow direction, and obtain the temperatures by numerical analysis. The temperature of the aqueous liquid added is usually 0° C. or more but less than the boiling point, and preferably from 10° C. to 50° C. The amount of the aqueous liquid added is usually 0.01 mass part to 50 mass parts with respect to 100 mass parts of the water-absorbing resin powder, preferably 0.01 mass part to 30 mass parts, and more preferably 0.1 mass part to 10 mass parts.

A water spraying device for adding the aqueous liquid is not especially limited as long as it serves the object of the present invention. However, it is preferable that the device can uniformly spray the aqueous liquid to a narrow area. Preferable examples of the device are a flat spray and a one-fluid or two-fluid spray having spray patterns such as a hollow cone and a full cone. A further preferable example of the device is a narrow angle spray for spraying to a narrow region.

The size of a droplet sprayed is not especially limited, but is preferably and averagely from 10 μm to 1,000 μm. If the size of the droplet is too large, the water content of the water-absorbing resin may become nonuniform, particles having absorbed a large amount of water may form agglomerates, and those agglomerates may cause clogging of the device. Moreover, if the size of the droplet is less than 10 μm, the water sprayed does not adhere to the water-absorbing resin effectively, and is discharged from the device as splash or becomes the dew condensation water which causes problems. The most appropriate size of the droplet is from 50 μm to 500 μm. As a general trend, the size of the droplet may be small if the airflow in the device is slow. Moreover, if the airflow is fast, the size of the droplet needs to be large to prevent the droplet from escaping as splash. It is preferable that the aqueous liquid be added so as not to contact anything other than the water-absorbing resin. However, if there is a possibility that the added aqueous liquid contacts a portion(s) of the device in addition to the water-absorbing resin powder, it is preferable that the water-absorbing resin powder contain, for example, an adherence prevention agent such as polyethylene glycol (PEG) or polypropylene glycol (PPG).

Various additive agents may be dissolved or dispersed in the added aqueous liquid so that the added aqueous liquid has additional functions. Examples of such additive agents are metal salt, acid, alkali, a deodorant, a coloring agent, an inorganic antibacterial agent, an organic antibacterial agent, and surfactant. More specific examples of the additive agent are (i) sulfite, such as sodium bisulfite (SBS), for reducing residual monomers (ii) organic base, inorganic base, organic acid, inorganic acid, monovalent metal salt, and polyvalent metal salt (for example, aluminium sulfate), for adjusting the water-absorbing speed, (iii) a deodorant for giving an odor eliminating function, (iv) a coloring agent for giving a visual value, and (iv) various chelating agents for improving urine resistance. The concentration of the entire additive agents in the aqueous liquid is usually 0.01 mass % to 50 mass %, preferably 0.1 mass % to 40 mass %, and more preferably 1 mass % to 30 mass %.

The stirrer(s) used in the modifying step and the cooling step is (are) not especially limited, and it is possible to use the stirrers explained in the present specification.

For example, only one of the modifying step and the cooling step may be carried out by using the above-described stirrer (stirring means) 100 since it is possible to suppress the generation of the fine powder. In this case, the remaining step can be carried out by using a conventionally known heat stirrer or stirring/cooling device. As the conventionally known device, it is possible to use, for example, a biaxial trough stirrer disclosed in Document 4.

Moreover, it is more preferable that both the modifying step and the cooling step be carried out by using the above-described stirrer (stirring means) 100, since it is possible to carry out the surface crosslinking reaction and the cooling uniformly, and this can further suppresses the generation of the fine powder.

(3. Details of Manufacture of Water-Absorbing Resin)

The following will explain details of a method for manufacturing water-absorbing resin of the present invention.

(a—Water-absorbing Resin)

The water-absorbing resin of the present invention is not especially limited, and may be water-absorbing resin obtained by crosslinking the surface of a hydrophilic crosslinked polymer (water-absorbing resin precursor), containing a carboxyl group, by using a surface crosslinking agent containing two or more functional groups which react with the carboxyl group.

Note that in the present specification, the water-absorbing resin is a water-absorbing resin precursor whose surface is crosslinked. Conversely, in the present specification, the water-absorbing resin precursor is water-absorbing resin whose surface is not crosslinked.

That is, in the present specification, the term "hydrophilic crosslinked polymer" is synonymous with the term "water-absorbing resin precursor".

Moreover, in the present specification, "the water-absorbing resin" is particles or powder. Moreover, the term "powder" means a group of particles. When expressing the character of a bulk, such as flowability, the term "powder" is used. That is, in the present specification, the term "water-absorbing resin particle" is synonymous with the term "water-absorbing resin powder".

The shape of the water-absorbing resin of the present invention is not especially limited, and may be a spherical shape, a squamous shape, an indeterminate crushed shape, a fibrous shape, a granular shape, a rod shape, a substantially spherical shape, a flat shape, etc.

Moreover, the water-absorbing resin of the present invention may be crushed and classified, and be particulate water-absorbing resin having a predetermined size. In such a case, the particle size is preferably 2 mm or less, and more preferably from 10 μm to 1 mm. The weight average particle diameter depends on applications, but usually, it is preferably from 100 μm to 1,000 μm, more preferably from 150 μm to 800 μm, and further preferably from 300 μm to 600 μm. Moreover, the percentage of particles passing through a sieve having a mesh size of 150 μm is preferably 15 mass % or less, more preferably 10 mass % or less, and further preferably 5 mass % or less.

Regarding the water-absorbing resin of the present invention, its absorbency (hereinafter also referred to as "CRC") measured by a method adopted in the following Examples is preferably from 10 g/g to 60 g/g, more preferably from 20 g/g to 55 g/g, and further preferably from 25 g/g to 50 g/g. Further, the absorbency against pressure (hereinafter also referred to as "AAP") measured by a method adopted in the following Examples is preferably 10 g/g or more, more preferably 15 g/g or more, and further preferably 20 g/g or more.

A step of manufacturing the above water-absorbing resin precursor (hereinafter also referred to as "water-absorbing resin precursor manufacturing step") is not especially limited, and it is possible to use, for example, the following step.

(I. Water-Absorbing Resin Precursor Manufacturing Step)

Manufactured in the water-absorbing resin precursor manufacturing step is the water-absorbing resin precursor which can be used in the present invention, contains the carboxyl group, and is not surface crosslinked. One example of the water-absorbing resin precursor is conventionally known resin which can be obtained by polymerizing hydrophilic unsaturated monomer containing acrylic acid and/or its salt as the main component, which absorbs a large amount of water (50 times to 1,000 times) in ion exchanged water, and which forms a hydrophilic crosslinked polymer having a water-swelling property and a water-insolubility.

Moreover, it is preferable that a crosslinked structure be formed inside the water-absorbing resin precursor by using an internal crosslinking agent when manufacturing the water-absorbing resin precursor.

The following will explain the hydrophilic unsaturated monomer, the hydrophilic crosslinked polymer, the internal crosslinking agent, and a method for polymerizing the hydrophilic unsaturated monomer, however the present invention is not limited to these.

<Hydrophilic Unsaturated Monomer>

One example of the above hydrophilic unsaturated monomer is a hydrophilic unsaturated monomer containing acrylic acid and/or its salt as the main component. Moreover, the hydrophilic unsaturated monomer may contain an unsaturated monomer other than acrylic acid or its salt according to need. Examples of such an unsaturated monomer are (i) an anionic unsaturated monomer and its salt, such as methacrylic acid, maleic acid, vinyl sulfonic acid, styrene sulfonic acid, styrenesulfonic acid, 2-(meth)acrylamide-2-methylpropanesulfonic acid, 2-(meth)acryloylethanesulfonic acid, and 2-(meth)acryloylpropanesulfonic acid, (ii) a nonionic hydrophilic group-containing unsaturated monomer, such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, methoxypolyethyleneglycol(meth)acrylate, polyethylene glycol mono(meth) acrylate, vinylpyridine, N-vinylpyrrolidone, N-acryloyl piperidine, and N-acryloyl pyrrolidine, and (iii) a cationic unsaturated monomer, such as N,N-dimethylaminoethyl (meth)acrylate, N,N-diethylaminoethyl(meth)acrylate, N,N-dimethylaminopropyl(meth)acrylate, N,N-dimethylaminopropyl(meth)acrylamide, and quaternary salts of these. However, the above "unsaturated monomer other than acrylic acid or its salt" is not especially limited. In the case of using the above "unsaturated monomer other than acrylic acid or its salt", the amount thereof is preferably 30 mole % or less of the entire hydrophilic unsaturated monomers, and more preferably 10 mole % or less.

<Hydrophilic Crosslinked Polymer>

In the present specification, the hydrophilic crosslinked polymer is synonymous with the water-absorbing resin precursor, and is not especially limited as long as it absorbs a large amount of water and has the water-swelling property and the water-insolubility. Moreover, it is more preferable that the acid group in the hydrophilic crosslinked polymer be neutralized with, for example, alkali metal salt, ammonium salt, amine salt, or the like. Moreover, the percentage of the acid group neutralized in the crosslinked polymer is preferably from 30 mole % to 100 mole %, more preferably from 50 mole % to 90 mole %, and especially preferably from 60 mole % to 80 mole %. Therefore, in the present specification, the expression "the water-absorbing resin precursor containing the carboxyl group" implies the expression "the water-absorbing resin precursor containing carboxyl group and/or its salt". The acid group may be neutralized (a) when preparing the hydrophilic unsaturated monomer before obtaining the crosslinked polymer, (b) during polymerization of the hydrophilic unsaturated monomer, or (c) when the crosslinked polymer is obtained after the polymerizing reaction of the hydrophilic unsaturated monomer. Moreover, the neutralization may be carried out in some or all of the above (a) to (c).

<Internal Crosslinking Agent>

The internal crosslinking agent is not especially limited as long as it is a compound, each molecule of which contains a plurality of reactive groups which react with a polymerizable unsaturated group and/or a carboxyl group. That is, the internal crosslinking agent may be a compound, each molecule of which contains a plurality of substituents which are copolymerized with the hydrophilic unsaturated monomer and/or react with the carboxyl group. Note that the hydrophilic unsaturated monomer may be a self crosslinking compound which forms the crosslinked structure without the internal crosslinking agent.

Examples of the internal crosslinking agent are N,N'-methylene bis(meth)acrylamide, (poly)ethylene glycol di(meth) acrylate, (poly)propylene glycol di(meth)acrylate, trimethylolpropane tri(meth)acrylate, trimethylolpropane di(meth) acrylate, glycerin tri(meth)acrylate, glycerin acrylate methacrylate, ethylene oxide modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallyl amine, poly(meth) allyloxyalkane, (poly)ethylene glycol diglycidyl ether, glycerol diglycidyl ether, ethylene glycol, polyethylene glycol, propylene glycol, glycerin, pentaerythritol, ethylenediamine, polyethylenimine, and glycidyl(meth)acrylate. However, the internal crosslinking agent is not especially limited. These internal crosslinking agents may be used alone or in combination of two or more. Then, by using, among the above internal crosslinking agents, the internal crosslinking agent each molecule of which contains a plurality of polymerizable unsaturated groups, it is possible to further improve an absorption property, etc. of the water-absorbing resin to be obtained.

The amount of the internal crosslinking agent used is preferably in a range from 0.005 mole % to 3 mole % of the hydrophilic unsaturated monomers. When polymerizing the hydrophilic unsaturated monomer so as to obtain the water-absorbing resin precursor (hydrophilic unsaturated polymer), it may be possible to add, to a reaction system, (i) a hydrophilic high-molecular-weight compound, such as starch, a starch derivative, cellulose, a cellulose derivative, polyvinyl alcohol, polyacrylic acid (salt), and crosslinked polyacrylic acid (salt), (ii) a chain transfer agent, such as hypophosphorous acid (salt), (iii) a water-soluble or water-dispersible surfactant, etc.

<Method for Polymerizing Hydrophilic Unsaturated Monomer>

The method for polymerizing the hydrophilic unsaturated monomer is not especially limited. For example, it is possible to adopt known methods, such as aqueous polymerization, reversed phase suspension polymerization, bulk polymerization, and precipitation polymerization. Moreover, reaction conditions, such as a reaction temperature and a reaction time, may be set properly depending on, for example, the composition of the hydrophilic unsaturated monomer component to be used, and are not especially limited.

When polymerizing the hydrophilic unsaturated monomer, it is possible to use, for example, (i) an initiator of radical polymerization, such as potassium persulfate, sodium persulfate, ammonium persulfate, t-butyl hydroperoxide, hydrogen peroxide, or 2,2'-azobis(2-amidinopropane)dihydrochloride, (ii) an initiator of radical photopolymerization, such as 2-hydroxy-2-methyl-1-phenyl-propane-1-one, or (iii) active energy ray, such as ultraviolet ray or electron ray. Moreover, in the case of using an initiator of oxidation radical polymerization, redox polymerization may be carried out by also using a reducing agent, such as sodium sulfite, sodium bisulfite, ferrous sulfate, or L-ascorbic acid. The amount of the polymerization initiator used is preferably in a range from 0.001 mole % to 2 mole %, and more preferably in a range from 0.01 mole % to 0.5 mole %.

The water-absorbing resin of the present invention can be obtained by surface crosslinking the water-absorbing resin precursor (hydrophilic crosslinked polymer), obtained in the above step, by using the following method for surface crosslinking the water-absorbing resin.

(b—Method for Surface Crosslinking Water-Absorbing Resin)

The method for surface crosslinking the water-absorbing resin of the present invention is suitable for mass production on an industrial scale. In the case of a conventional method for carrying out heat treatment by using a single processing device, there are problems in that (i) the larger the processing device is, the longer the staying time becomes, (ii) the water-absorbing resin is damaged, and (iii) the physical properties of the water-absorbing resin deteriorate.

Conventionally, it has been difficult to obtain both the improvements of the physical properties of the water-absorbing resin to be obtained and the improvement of the productivity. Therefore, in order to obtain both the improvements of the physical properties of the water-absorbing resin to be obtained and the improvement of the productivity, the present inventors have uniquely found that it is effective to carry out, as two separate steps in a process of surface crosslinking the water-absorbing resin, (i) acquisition of the dried particulate composition by stirring and drying the wet mixture of the solution containing the surface crosslinking agent and the water-absorbing resin precursor and (ii) heating of the dried particulate composition in order to obtain a desired crosslink density. Thus, the present invention has been achieved.

Specifically, the method for surface crosslinking the water-absorbing resin of the present invention includes a step (1) of mixing the solution containing the surface crosslinking agent with the water-absorbing resin precursor so as to obtain the wet mixture (hereinafter also referred to as "wet mixture preparing step"), a step (2) of stirring and drying the wet mixture so as to obtain the dried particulate composition containing the surface crosslinking agent (hereinafter also referred to as "stirring/drying step") and a step (3) of heating the dried particulate composition so as to cause the surface crosslinking reaction (hereinafter also referred to as "surface crosslinking step"). Further, 80 weight % or more of the dried particulate composition obtained in the stirring/drying step is particles which pass through a sieve having a mesh size of 10 mm, each of the stirring/drying step and the surface crosslinking step is carried out by using at least one processing device, and a processing device used for the stirring/drying step and a processing device used for the surface crosslinking step are serially connected to each other.

That is, in the wet mixture preparing step of the method for surface crosslinking the water-absorbing resin, the solution containing the surface crosslinking agent and the water-absorbing resin precursor are mixed with each other, and then the wet mixture is obtained. The wet mixture is put in the processing device. When moisture vaporizes from the wet mixture, aggregates are easily formed. However, as the stirring and drying proceed in the stirring/drying step, those aggregates break, and the wet mixture disperses and becomes powder 80 weight % or more of which is particles which pass through the sieve having the mesh size of 10 mm, that is, the dried particulate composition having high flowability. As above, in the heat treatment device, the characteristics of the wet mixture changes in accordance with elapsed time. However, in a conventional method for surface crosslinking the water-absorbing resin, the stirring and heating are carried out by a single processing device. That is, the stirring/drying step and the surface crosslinking step are not carried out separately, that is, these steps are carried out under the same conditions.

Meanwhile, in the present invention, each of the stirring/drying step and the surface crosslinking step is carried out by using at least one processing device, and the processing device used for the stirring/drying step and the processing device used for the surface crosslinking step are serially connected to each other. Therefore, in each of these steps, stirring conditions and the temperature setting can be determined in accordance with the characteristics of the powder. As a result, it is possible to shorten a time for the heat treatment, reduce the damage to the water-absorbing resin, and obtain the water-absorbing resin having excellent physical properties without decreasing the amount of production.

That is, in the method for surface crosslinking the water-absorbing resin of the present invention, (i) the solution containing the surface crosslinking agent and the water-absorbing resin precursor are mixed with each other, (ii) this mixture is put in the heat treatment device, (iii) although the wet mixture may have low flowability, and a large amount of aggregates are formed when moisture vaporizes, those aggregates are broken by strong stirring, and (iv) the water content of the water-absorbing resin particle is quickly reduced by increasing an average temperature-rising speed of the wet mixture, and this makes it possible to break the aggregates in a short period of time. Further, a heat treatment device which carries out comparatively weak stirring or has no stirring blade can be used for the dried particulate composition whose aggregates are broken, particles are dispersed, and flowability is increased. Further, it is possible to lower the average temperature-rising speed of the dried particulate composition, and also possible to easily control the surface crosslink density of the water-absorbing resin (final product).

Only by strengthening the stirring and increasing the average temperature-rising speed, it is possible to carry out the heat treatment in a short period of time. However, if the amount of production is large and the average temperature-rising speed increases, it becomes more difficult to control the crosslink density. Therefore, a step in which the average temperature-rising speed is comparatively low is required to more easily control the surface crosslink density of the final product.

In the method for surface crosslinking the water-absorbing resin of the present invention, it is preferable that the stirring/drying step and the surface crosslinking step be carried out continuously. Thus, it is possible to manufacture the water-absorbing resin having excellent physical properties in a short period of time.

Further, it is preferable that the processing device used for the stirring/drying step and the processing device used for the surface crosslinking step be different in type and/or effective volume from each other. Moreover, it is preferable that the processing device used for the stirring/drying step and the processing device used for the surface crosslinking step be driven under different heating conditions and/or different stirring conditions. Thus, it is possible to select appropriate heating conditions and/or stirring conditions for each step, and also possible to efficiently manufacture the water-absorbing resin having excellent physical properties.

Note that the above expression "different in type" means that the shapes of the processing devices are different from each other. Moreover, the above expression "different in effective volume" means that values of the effective volumes of the processing devices are different from each other. The above expression "different heating conditions" means that at least one of the type of the heat source which can be attached to the processing device, the spec of the heat source device which can be attached to the processing device, the set temperature of the heat source which can be attached to the processing device, and the amount of supply per unit time of the heat source which can be attached to the processing device is different. Further, the above expression "different stirring conditions" means that at least one of the shape of the stirring blade, the size of the diameter of the stirring blade, the number of the stirring blades per unit length of the stirring axis, and the number of rotations of the stirring blade is different.

Moreover, as another embodiment of the method for surface crosslinking the water-absorbing resin of the present invention, the stirring/drying step and the surface crosslinking step can be carried out by one processing device, and the stirring/drying step and the surface crosslinking step can be carried out under different processing conditions.

According to the above configuration, in each of the stirring/drying step and the surface crosslinking step, the stirring conditions and the temperature setting can be determined in accordance with the characteristics of the powder. As a result, it is possible to shorten the time for the heat treatment. Therefore, it is possible to reduce the damage to the water-absorbing resin, and also possible to obtain the water-absorbing resin having excellent physical properties without decreasing the amount of production.

In the method for surface crosslinking the water-absorbing resin, each of the stirring/drying step and the surface crosslinking step can be divided into a plurality of steps. That is, the stirring/drying step can be further divided into a plurality of steps in accordance with the characteristics of the particle. Similarly, the surface crosslinking step can be further divided into a plurality of steps in accordance with the characteristics of the particle.

The following will explain the above respective steps in detail.

(I. Wet Mixture Preparing Step)

The wet mixture preparing step is not especially limited as long as it is a step of mixing the solution containing the surface crosslinking agent with the above-described water-absorbing resin precursor so as to obtain the wet mixture. Moreover, in addition to the solution containing the surface crosslinking agent and the water-absorbing resin precursor, the wet mixture may contain an additive agent suitable for the present invention. The following will explain the surface crosslinking agent, usable additive agents, and a method and device for mixing the solution containing the surface crosslinking agent with the water-absorbing resin precursor. However, the present invention is not limited to these.

<Surface Crosslinking Agent>

The surface crosslinking agent to be used in the present invention is not especially limited as long as it is a compound (i) each molecule of which contains a plurality of functional groups which react with two or more carboxyl groups contained in the water-absorbing resin precursor, and (ii) in which covalent binding is formed by the crosslinking reaction. Preferable examples of the surface crosslinking agent are an oxazoline compound (U.S. Pat. No. 6,297,319), a vinyl ether compound (U.S. Pat. No. 6,372,852), an epoxy compound (U.S. Pat. No. 625,488), an oxetane compound (U.S. Pat. No. 6,809,158), a polyhydric alcohol compound (U.S. Pat. No. 4,734,478), a polyamide polyamine-epihalo adduct (U.S. Pat. Nos. 4,755,562 and 4,824,901), a hydroxy acrylamide compound (U.S. Pat. No. 6,239,230), an oxazolidinone compound (U.S. Pat. No. 6,559,239), a bis- or poly-oxazolidinone compound (U.S. Pat. No. 6,472,478), a 2-oxotetrahydro-1,3-oxazolidine compound (U.S. Pat. No. 6,657,015), and an alkylene carbonate compound (U.S. Pat. No. 5,672,633). These may be used alone or in combination of two or more.

Moreover, water-soluble cation (U.S. Pat. Nos. 6,605,673 and 6,620,899) such as aluminum salt may be add to the surface crosslinking agent. Moreover, alkali (U.S. Patent No. 2004-106745), or organic acid or inorganic acid (U.S. Pat. No. 5,610,208) may be used together with the surface crosslinking agent.

Specific examples of the surface crosslinking agent are (i) polyhydric alcohol, such as ethylene glycol, propylene glycol, glycerin, pentaerythritol, sorbitol, diethylene glycol, triethylene glycol, tetraethylene glycol, dipropylene glycol, tripropylene glycol, 1,3-butanediol, 1,4-butanediol 1,3-pentanediol, 1,4-pentanediol, 1,5-pentanediol 2,4-pentanediol, 1,6-hexanediol, 2,5-hexanediol, and trimethylolpropane, (ii) a carbonate compound, such as ethylene carbonate (1,3-dioxolane-2-one), propylene carbonate (4-methyl-1,3-dioxolane-2-one), and 4,5-dimethyl-1,3-dioxolane-2-one, (iii) a polyvalent amine compound, such as diethanolamine, triethanolamine, ethylenediamine, diethylenetriamine, and triethylenetetramine, (iv) a polyvalent glycidyl compound, such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, and polypropylene glycol diglycidyl ether, and (v) a polyvalent aziridine compound, such as 2,4-tolylene diisocyanate, ethylene carbonate (1,3-dioxolane-2-one), propylene carbonate (4-methyl-1,3-dioxolane-2-one), 4,5-dimethyl-1,3-dioxolane-2-one, (poly, di, or mono)2-oxazolidinone, epichlorohydrin, epibromohydrin, diglycol silicate, and 2,2-bishydroxymethylbutanol-tris[3-(1-aziridinyl)propionate]. Moreover, these surface crosslinking agents may be used alone or in combination of two or more. It is preferable that the surface crosslinking agent contains at least one of polyhydric alcohol, a carbonate compound, a polyvalent amine compound, a polyvalent glycidyl compound, poly 2-oxazolidinone, bis 2-oxazolidinone, and mono 2-oxazolidinone, and it is more preferable that the surface crosslinking agent contain at least one of polyhydric alcohol, a carbonate compound, and a polyvalent amine compound.

The amount of the surface crosslinking agent used may be set properly depending on, for example, the surface crosslinking agent used or the combination of the surface crosslinking agents to be used. Generally, the amount of the surface crosslinking agent used is preferably in a range from 0.001 mass part to 5 mass parts with respect to the solid content (100 mass parts) of the water-absorbing resin precursor, and more preferably in a range from 0.005 mass part to 2 mass parts. It is not preferable that the amount of the surface crosslinking agent used exceed the above range, since it is uneconomical, and the amount of the surface crosslinking agent used is excessive to form appropriate crosslinked structure of the water-absorbing resin. Moreover, when the amount of the surface crosslinking agent used is less than the above range, it tends to be difficult to obtain the surface crosslinked water-absorbing resin having high absorbency against pressure.

In order to dissolve the surface crosslinking agent, it is preferable to use water as a solvent. Moreover, the amount of the solvent used can be changed properly depending on, for example, the type and particle diameter of the water-absorbing resin precursor. Generally, the amount of the solvent used is preferably in a range from more than 0 mass part to 20 mass parts with respect to the solid content (100 mass parts) of the water-absorbing resin precursor, and more preferably in a range from 0.5 mass part to 10 mass parts.

Used in the present invention as the solution containing the surface crosslinking agent is preferably a solution containing a surface crosslinking agent which reacts with the carboxyl group of the water-absorbing resin precursor by esterification reaction of polyhydric alcohol, alkylene carbonate, or the like.

Note that in the present specification, a solution prepared by dissolving a surface crosslinking agent in a solvent is termed “the solution containing the surface crosslinking agent”.

Moreover, in the present invention, the surface crosslinking may be realized by polymerizing monomers on the surface of the water-absorbing resin precursor (U.S. Patent No. 2005-48221).

<Other Additive Agents>

In addition to the surface crosslinking agent, it is possible to add, to the solution containing the surface crosslinking agent of the present invention, (i) as a dispersing agent, a surfactant or particles for improving an effectiveness of mixing, (ii) as a modifying agent, a metal complex, and (iii) as other additive agents, an antibacterial agent, a deodorant, an aroma chemical, a food additive, an oxidizing agent, a reducing agent, a chelating agent, an oxidation inhibitor, a radical inhibitor, and a dye stuff. These additive agents may be added as an aqueous solution prepared by, according to need, dissolving in a solvent or dispersing in a solvent. Moreover, a separate nozzle may be used to add these additive agents.

One example of the surfactant which can be used as the dispersing agent is a nonionic, anionic, cationic or amphoteric surfactant (disclosed in Published Japanese Translation of PCT International Publication for Patent Application 2002-527547 (Tokuhyo 2002-527547)) whose HLB value is 3 or more. Moreover, the amount of the surfactant used is preferably in a range from 0 mass % to 5 mass % with respect to the water-absorbing resin precursor.

One example of the particles for improving the effectiveness of mixing is inorganic particles, such as carbon black disclosed in Japanese Unexamined Patent Publication 4-214734 (Tokukaihei 4-214734). Moreover, the amount of the particles used is preferably in a range from 0 mass part to 10 mass parts with respect to 100 mass parts of the water-absorbing resin precursor.

One example of the metal complex to be used as the modifying agent is a bivalent or polyvalent metal salt solution disclosed in Published Japanese Translation of PCT International Publication for Patent Application 2002-527547 (Tokuhyo 2002-527547).

The above antibacterial agent is not especially limited, and it is possible to use conventionally known antibacterial agents having an antibacterial property. One example of the antibacterial agent is an antibacterial agent disclosed in Japanese Unexamined Patent Publication 11-267500 (Tokukaihei 11-267500).

The above deodorant is not especially limited, and it is possible to use conventionally known deodorants which eliminate unpleasant odor of human urine, such as mercaptan, hydrogen sulfide, and ammonia. One example of the deodorant is a Theaceae plant extract containing flavanols or flavonols as a deodorant component.

The amount of the additive agent which is added so that the water-absorbing resin has an additional function can be changed properly depending on the purpose of the addition and the type of the additive agent. Generally, the amount of the additive agent is preferably from 0.001 mass part to 10 mass parts with respect to 100 mass parts of the water-absorbing resin precursor, more preferably from 0.01 mass part to 5 mass parts, and further preferably from 0.05 mass part to 1 mass part.

<Mixing Method and Mixing Device>

While satisfying the above conditions, the water-absorbing resin precursor and the solution containing the surface crosslinking agent are put in a mixing device and mixed with each other. More specifically, in the present invention, by adding the solution containing the surface crosslinking agent from a nozzle to the water-absorbing resin precursor, it is possible to mix the water-absorbing resin precursor with the solution containing the surface crosslinking agent. A mixing time is adjusted properly depending on the shape and size of the mixing device, and the amount of the solution containing the surface crosslinking agent. The mixing time is from 5 seconds to 10 minutes on a normal industrial scale.

Moreover, when mixing the water-absorbing resin precursor with the solution containing the surface crosslinking agent, it is possible to use a hydrophilic organic solvent as a solvent according to need. Examples of the hydrophilic organic solvent are (i) lower alcohols, such as methyl alcohol, ethyl alcohol, n-propyl alcohol, isopropyl alcohol, n-butylalcohol, isobutyl alcohol, and t-butyl alcohol (ii) ketones, such as acetone, (iii) ethers, such as dioxane, tetrahydrofuran, and alkoxy polyethylene glycol, (iv) amides, such as N,N-dimethylformamide, and (v) sulfoxides, such as dimethyl sulfoxide. The amount of the hydrophilic organic solvent used depends on, for example, the type and particle diameter of the water-absorbing resin precursor, but is preferably 20 mass parts or less with respect to the solid content (100 mass parts) of the water-absorbing resin precursor, more preferably from 0 mass part to 10 mass parts, further preferably from 0 mass part to 5 mass parts, and especially preferably from 0 mass part to 1 mass part.

The temperature of the water-absorbing resin precursor before the addition of the solution containing the surface crosslinking agent is preferably from 35° C. to 80° C., more preferably 35° C. to 70° C., and further preferably 35° C. to 50° C. It is preferable that the water-absorbing resin precursor be mixed with the solution containing the surface crosslinking agent after the temperature of the water-absorbing resin precursor is controlled to be in the above range. If the temperature of the water-absorbing resin precursor before the addition of the solution containing the surface crosslinking agent is higher than the above range, the miscibility of the water-absorbing resin precursor with the solution containing the surface crosslinking agent tends to deteriorate. Moreover, in the case of adjusting the temperature of the water-absorbing resin precursor to be lower than the above range, it may take time to forcedly cool or naturally cool the water-absorbing resin precursor, powder of the cooled water-absorbing resin precursor may aggregate, and energy loss when reheating may become large.

Moreover, it is preferable that the temperature of the solution containing the surface crosslinking agent be lower than the temperature of the water-absorbing resin precursor. Specifically, the temperature of the solution containing the surface crosslinking agent is preferably 10° C. or more lower than the temperature of the water-absorbing resin precursor, more preferably 20° C. or more, and especially preferably 30° C. or more. As described above, the solution containing the surface crosslinking agent can be sprayed from a nozzle. In such a case, the temperature of the solution should be the freezing point or higher. Moreover, if the temperature of the solution containing the surface crosslinking agent is too high, a liquid absorption speed of the water-absorbing resin precursor may become high, and uniform mixing may be hindered.

Regarding droplets of the solution containing the surface crosslinking agent when spraying from the nozzle, its average particle diameter is preferably smaller than the average particle diameter of the water-absorbing resin precursor. Specifically, the average particle diameter of the droplets of the solution containing the surface crosslinking agent is preferably 300 μm or less, and further preferably 250 μm or less.

Moreover, a maximum spray angle from the nozzle is preferably 50 degrees or more. Thus, the solution containing the surface crosslinking agent can be sprayed from the nozzle so that a spray pattern is in the shape of a hollow cone showing a circle or the spray pattern is in the shape of an elliptic cone showing a double-convex lens, as disclosed in Japanese Unexamined Patent Publication 2002-201290 (Tokukai 2002-201290). Meanwhile, if the above spray angle is smaller than 50 degrees, there may be a portion, in the mixing device, where the solution containing the surface crosslinking agent is sprayed excessively and a portion, in the mixing device, where the solution is sprayed less densely, and a mixed state of the water-absorbing resin precursor and the solution containing the surface crosslinking agent may become nonuniform. Note that the maximum spray angle is 180 degrees or less because of the configuration of the nozzle.

Further, when the solution containing the surface crosslinking agent is sprayed from the nozzle at the above predetermined spray angle, an area of a region, where a spray diffusing state of the aqueous solution is shown, on a cross section of the mixing device which cross section is perpendicular to the axial direction of the mixing device and contains a spraying point of the nozzle is preferably from 70% to 100% of the area of the cross section perpendicular to the axial direction of the mixing device, more preferably from 80% to 100%, and further preferably from 90% to 100%. If the area of the region is less than 70%, the mixed state of the water-absorbing resin precursor and the solution containing the surface crosslinking agent may become nonuniform.

The number of the nozzles attached to the mixing device may be one or may be two or more. However, in order to increase the area of the region, where the spray diffusing state is shown, on the cross section of the mixing device which cross section contains the spraying point of the nozzle, it is preferable that the number of the nozzles attached to the mixing device be two or more. In order to surely mix the water-absorbing resin precursor with the solution containing the surface crosslinking agent, the mixing device preferably has a high power of mixing, and it is preferable that the water-absorbing resin precursor flow by stirring or airflow.

Examples of the mixing device are a harrow mixing device, a cylinder mixer, a double wall cone mixer, a V-shaped mixer, a ribbon mixer, a screw mixer, a flow type furnace rotary disc mixer, an airflow mixer, a double-arm kneader, an internal mixer, a crush kneader, a rotary mixer, a screw extruder, a Loedige stirrer, and a turbulizer stirrer. Moreover, it is possible to preferably use a high-speed stirring mixer, a harrow mixing device, a sawtooth mixing device, etc. each of which has the stirring axis including a plurality of the stirring boards. The term "high-speed stirring mixer" here is a mixer which generates a mixing power by the rotation of the stirring axis including a plurality of the stirring boards. Moreover, the number of rotations of the stirring axis is usually from 100 rpm to 5,000 rpm, but is preferably from 200 rpm to 4,000 rpm, and more preferably from 500 rpm to 3,000 rpm.

Moreover, in order to prevent the formation of the aggregate by the adhesion of the wet mixture of the water-absorbing resin precursor and the solution containing the surface crosslinking agent, it is preferable that the mixing device have an inner wall formed by a base material whose contact angle with respect to water is 60 degrees or more and whose heat distortion temperature is 70° C. or more. Examples of such a base material are any base materials disclosed in Japanese Unexamined Patent Publication 4-214734 (Tokukaihei 4-214734).

It is preferable that the temperature of the inner wall of the mixing device be higher than room temperature. Specifically, the temperature of the inner wall of the mixing device is preferably 40° C. or more, and more preferably from 50° C. to 100° C. or more. Moreover, it is preferable that the temperature of the inner wall of the mixing device be higher than the temperature of the water-absorbing resin precursor. Specifically, the temperature difference between the inner wall of the mixing device and the water-absorbing resin precursor is preferably 40° C. or less, and further preferably 20° C. or less. When the temperature of the inner wall of the mixing device is room temperature or less, the wet mixture of the water-absorbing resin precursor and the solution containing the surface crosslinking agent may adhere to the inner wall when mixing the solution containing the surface crosslinking agent with the water-absorbing resin precursor, and the aggregates may be formed.

(II. Stirring/Drying Step)

The stirring/drying step may be any step as long as the dried particulate composition which contains the surface crosslinking agent and 80 weight % or more of which is particles which pass through the sieve having the mesh size of 10 mm can be obtained by stirring and drying the wet mixture. Specific conditions, such as a device used and drying conditions, are not especially limited. In order words, the stirring/drying step is a step of breaking, by stirring and drying, the wet mixture of the solution containing the surface crosslinking agent and the water-absorbing resin precursor which mixture is in an aggregate state and is low in flowability, so as to obtain the dried particulate composition which is high in flowability and is in a dispersion state. Note that in the present specification, the term "dry(ing)" is to reduce the water content of the water-absorbing resin particles aggregated.

Since the wet mixture is not dried uniformly or efficiently if it is in an aggregate state, it is preferable in the stirring/drying step that such an aggregate state is broken as soon as possible. Thus, it is possible to manufacture the water-absorbing resin more efficiently.

In the stirring/drying step, it is preferable that the wet mixture of the solution containing the surface crosslinking agent and the water-absorbing resin precursor be changed into particles each of which has such a particle diameter that these particles can pass through the sieve having the mesh size of 10 mm. More specifically, the particle diameter is preferably 10 mm or less, more preferably 5 mm or less, further preferably 2 mm or less, and especially preferably 1 mm or less. Such particles can disperse sufficiently, the flowability of the powder is high, and a heating efficiency in the following surface crosslinking step improves.

Moreover, it is preferable that 80 weight % or more of the particles obtained in the stirring/drying step be particles each having the above particle diameter. If the particles each having the above particle diameter is in the above range, it is possible to uniformly carry out the heat treatment with respect to the water-absorbing resin particles in the surface crosslinking step.

Note that a method for measuring the particles which pass through the sieve having the mesh size of 10 mm is carried out in accordance with a particle size measuring method for measuring the water-absorbing resin particles by using a JIS standard sieve. Specifically, the water-absorbing resin particles are put in the JIS standard sieve (The IIDA TESTING SIEVE, Internal Diameter of 80 mm) having the mesh size of 10 mm, the particles are classified for a minute by using a low tap sieve shaker (produced by Iida Seisakusho, ES-65 Sieve Shaker), and the weight of the particles having passed through the sieve is measured. A method for measuring the particles which pass through a sieve having a mesh size of 5 mm, 2 mm, or 1 mm is carried out similarly in accordance with the above.

In the stirring/drying step, the water content of the wet mixture which is a mixture of the solution containing the surface crosslinking agent and the water-absorbing resin precursor and whose particles are in an aggregate state lowers by the drying. In the stirring/drying step, as the water content of the wet mixture lowers, the aggregates of the particles decrease, and the powder having high flowability can be obtained.

The water content of the water-absorbing resin powder after the stirring/drying step is not especially limited, but may be changed properly depending on a desired crosslinking reaction and/or the type of the surface crosslinking agent used. Moreover, a lowering rate of the water content of the wet mixture in the stirring/drying step is not especially limited, but is usually preferably from 20% to 90%, more preferably from 30% to 90%, further preferably from 40% to 90%, and especially preferably from 50% to 80%.

Note that a method for measuring the water content in the present specification is as follows.

About 1.0 g of the water-absorbing resin powder that is a measurement sample is put in an aluminium cup which is 0.8 g in weight, and the powder is dried for three hours in an oven heated to 180° C. Then, the powder is immediately put in a desiccator and cooled down to around room temperature. Then, the weight of the powder is measured. The water content can be calculated by the following formula.

Water Content (%)=(Weight of Measurement Sample Before Drying−Weight of Measurement Sample After Drying)÷(Weight of Measurement Sample Before Drying)×100

Moreover, the lowering rate of the water content of the wet mixture by the drying in the stirring/drying step can be calculated by the following formula.

Lowering Rate Of Water Content Of Wet Mixture (%)=(Water Content Of Wet Mixture (%)−Water Content Of Water-absorbing Resin Powder After Stirring/drying Step (%))÷(Water Content Of Wet Mixture (%))×100

In the stirring/drying step, it is preferable to use a processing device having a stirring blade. In the case of using a processing device having a stirring blade whose shape and size are the same as those of a stirring blade of a processing device to be used in the following surface crosslinking step, it is preferable that the number of rotations of the stirring blade used in the stirring/drying step be larger than the number of rotations of the stirring blade used in the surface crosslinking step. On a normal production scale, the number of rotations in the stirring/drying step is in a range preferably from 5 rpm to 300 rpm, more preferably from 10 rpm to 300 rpm, and further preferably from 20 rpm to 300 rpm.

In the case of comparing a stirring blade used in the stirring/drying step and a stirring blade used in the surface crosslinking step when these stirring blades are different from each other, it is possible to use the peripheral speed that is a parameter expressed by the diameter of the stirring blade and the number of rotations of the stirring blade. The peripheral speed is a parameter expressed by the following formula.

$$V=2\pi rn/60$$

(In this formula, V denotes the peripheral speed (m/s), r denotes the diameter of the stirring blade (m), and n denotes the number of rotations of the stirring blade (rpm).)

It is preferable that the peripheral speed of the stirring blade in the stirring/drying step be higher than that of the stirring blade in the surface crosslinking step. A preferable range of the peripheral speed in the stirring/drying step depends on the size of the device. However, the peripheral speed is preferably from 0.15 to 10 (m/s), more preferably 0.3 to 10 (m/s), and further preferably 0.5 to 10 (m/s).

As above, if the number of rotations of the stirring blade is large and the peripheral speed of the stirring blade is high, it is possible to shorten the time for the stirring/drying step.

There exist various shapes of stirring blades, and the shape of the stirring blade in the present invention is not especially limited. The number of the stirring blades per unit length of the stirring axis depends on the shape of the stirring blade, but it is preferable that the number of the stirring blades be large, since strong stirring can be realized.

Generally, as the average temperature-rising speed of the water-absorbing resin powder increases, a reaction rate of the surface crosslinking agent also increases. Therefore, in light of the improvement of the productivity of the water-absorbing resin, it is preferable that the average temperature-rising speed of the water-absorbing resin powder in the stirring/drying step be high. Moreover, in the present invention, the increase in the average temperature-rising speed of the water-absorbing resin powder in the stirring/drying step causes not only the increase in the reaction rate of the surface crosslinking agent but also quick vaporization of moisture contained in the wet mixture of the solution containing the surface crosslinking agent and the water-absorbing resin precursor. As a result, the aggregate state is broken, and the powder having high flowability can be obtained in a short period of time. If the powder having high flowability is obtained in the stirring/drying step, it is possible to cause the powder to react in the following surface crosslinking step by stirring that is weaker than that of the stirring/drying step or by a heat treatment device having no stirring blade, so as to obtain a necessary surface crosslink density. As a result, it is possible to reduce the damage to the water-absorbing resin to be obtained finally, and also possible to obtain the water-absorbing resin having excellent physical properties.

The average temperature-rising speed in the stirring/drying step is not especially limited, and may be changed properly depending on a desired crosslinking reaction and/or the type of the surface crosslinking agent used. Note that the above "average temperature-rising speed" means an average value of temperatures of the water-absorbing resin powder which temperatures are increased in a certain time period in a temperature profile of the water-absorbing resin moved from the input port to the outlet port in the heat treatment device. On a normal production scale, the average temperature-rising speed in five minutes from the start of the stirring/drying step is preferably 10° C./min or more, more preferably 15° C./min or more, and further preferably 20° C./min or more. Moreover, the average temperature-rising speed from 5 minutes after the start of the stirring/drying step to 15 minutes after the start of the stirring/drying step is preferably 3° C./min or more, more preferably 5° C./min or more, and further preferably 7° C./min or more. Further, the average temperature-rising speed after 15 minutes after the start of the stirring/drying step is preferably 3° C./min or more. Thus, the wet mixture is subjected to a high temperature in a short period of time. As a result, the moisture contained in the wet mixture of the solution containing the surface crosslinking agent and the water-absorbing resin precursor vaporizes in a short period of time, and the particles having high flowability can be obtained in a short period of time.

However, if the average temperature-rising speed in the stirring/drying step is too high, the surface crosslinking reaction proceeds excessively, and the CRC (Centrifuge Retention Capacity of a physiological saline solution) that is one of important physical properties of the water-absorbing resin to be obtained finally tends to be too low. Especially, this trend becomes significant in the case of using a highly reactive surface crosslinking agent. Therefore, it is preferable that the average temperature-rising speed in the stirring/drying step be in such a range that a desired CRC can be obtained.

One factor for determining the temperature-rising speed of the heat treatment device is a ratio of the heat transfer area to the volume. By using the heat treatment device whose heat transfer area with respect to the volume is comparatively large, it is possible to realize a high temperature-rising speed which is, as described above, preferable in the present invention. The stirring/drying step can be carried out by using a conventionally known heat treatment device, however it is preferable to select, depending on the production scale of the water-absorbing resin, a heat treatment device whose ratio of the heat transfer area to the effective volume (heat transfer area/effective volume) is appropriate. Specifically, the heat transfer area/effective volume is preferably 10 $m^{-1}$ or more, and more preferably 15 $m^{-1}$ or more. Regarding the same type of processing devices, the smaller the effective volume is, the larger the heat transfer area/effective volume becomes.

Moreover, in order to adjust the average temperature-rising speed to be in the above preferable range, a heat source can be used for the heat treatment device so as to increase the heating temperature. The type of the heat source is not especially limited, and examples are (i) heating by causing, for example, pressurized vapor or thermal oil to circulate in a heat medium circulating device and (ii) heating by heating wire, microwave, or electromagnetic induction. These heat medium circulating device and heating device can be attached to any locations, such as a jacket which can be attached to the processing device and the inside of the stirring blade. The type of the heat source, the spec of a heat source device, the set temperature of the heat source, and the amount of heat supplied from the heat source per unit time can be set properly depending on the type of the surface crosslinking agent used and the type of the heat treatment device used.

Moreover, a processing time of the stirring/drying step changes depending on the processing device, but is preferably from 10 minutes to 60 minutes, more preferably from 10 minutes to 40 minutes, and further preferably from 10 minutes to 30 minutes. The shorter the processing time is, the more the productivity of the water-absorbing resin improves.

The processing device used for the stirring/drying step is not especially limited, and it is possible to use a conventionally known processing device or heat treatment device. For example, by putting in a biaxial trough stirring dryer the wet mixture of the solution containing the surface crosslinking agent and the water-absorbing resin precursor, and heating the mixture, it is possible to stir and dry the wet mixture of the surface crosslinking agent and the water-absorbing resin precursor. The stirring/drying step can be further divided depending on the characteristics of the particle.

Moreover, it is preferable that the stirring/drying step be carried out while supplying carrier gas for adjusting the temperature and the dew point. Drying does not necessarily require heating. Moreover, the wet mixture can be dried to a predetermined state by the introduction of the carrier gas. Examples of the carrier gas are vapor, air, and nitrogen. Moreover, the amount of the carrier gas supplied is not especially limited, and can be determined properly. By supplying the carrier gas, the vapor generated during the reaction in the stirring/drying step can be removed efficiently. Thus, it is possible to dry the wet mixture in a short period of time.

Further, the carrier gas may be properly depressurized or pressurized. Moreover, the carrier gas may be properly heated or cooled. Generally, it is preferable that air having around room temperature (for example, 0° C. to 50° C.) be supplied at substantially normal pressure ($1.013\times10^5$ Pa (1 atmospheric pressure)±10%, preferably ±5%, and more preferably ±1%).

Moreover, when in the stirring/drying step there is a space above the wet mixture of the solution containing the surface crosslinking agent and the water-absorbing resin precursor which mixture does not contact the heat transferring surface, the temperature and dew point may be controlled to a specific temperature and a specific dew point.

Moreover, the wet mixture of the solution containing the surface crosslinking agent and the water-absorbing resin precursor which mixture is subjected to the stirring/drying step may have a normal temperature or may be heated so that the powder is easy to handle. However, if the wet mixture is heated excessively, the surface crosslinking agent reacts. Therefore, the temperature of the wet mixture is heated so as to be preferably from room temperature to 100° C., more preferably from room temperature to 80° C., and further preferably from room temperature to 40° C.

Moreover, in the case of carrying out both the stirring/drying step and the surface crosslinking step by using one processing device, the heating conditions and/or stirring conditions which satisfy the above conditions in the stirring/drying step can be set in a former portion of the processing device.

(III. Surface Crosslinking Step)

The surface crosslinking step may be any step as long as the dried particulate composition is subjected to the heat treatment, and this causes a desired surface crosslinking reaction. Specific conditions, such as a device used and reaction conditions are not especially limited. More specifically, for the purpose of obtaining a desired crosslink density, the surface crosslinking step is a step of (i) heating the dried particulate composition which is obtained by stirring and drying the wet mixture of the solution containing the surface crosslinking agent and the water-absorbing resin precursor and has high flowability, and (ii) causing a desired crosslinking reaction to proceed.

Regarding the dried particulate composition, the aggregates are broken, the particles are dispersed, and the flowability is high. Therefore, in the surface crosslinking step, it may be possible to use weak stirring or the heat treatment device having no stirring blade. Further, it is possible to lower the average temperature-rising speed of the water-absorbing resin powder, and also possible to more easily control the surface crosslink density of a final product.

Specifically, the above "desired crosslink density" means that each of the CRC and AAP measured by methods adopted in the following Examples is in the following range. That is, the CRC is preferably from 10 g/g to 60 g/g, more preferably from 20 g/g to 55 g/g, and further preferably from 25 g/g to 50 g/g. Moreover, the AAP is preferably 10 g/g or more, more preferably 15 g/g or more, and further preferably 20 g/g or more.

The average temperature-rising speed in the surface crosslinking step is not especially limited, and can be changed properly depending on the average temperature-rising speed in the stirring/drying step, a desired crosslinking reaction, and/or the type of the surface crosslinking agent. By strengthening the stirring and increasing the average temperature-rising speed only in the stirring/drying step, it is possible to shorten the processing time, and it is also possible to suppress the damage to the powder since the processing time is short.

However, if the heat treatment is carried out only in the stirring/drying step, the control of the surface crosslink density becomes more difficult since the average temperature-rising speed is high. Here, by comparatively lowering the average temperature-rising speed in the surface crosslinking step of the present invention, it is possible to improve the controllability of the surface crosslink density of a final product. Specifically, the average temperature-rising speed in the surface crosslinking step is preferably 10° C./min or less, more preferably 5° C./min or less, further preferably 3° C./min or less, and especially preferably 1° C./min or less. As above, since the surface crosslinking step does not require temperature rising unlike the stirring/drying step, the heat transfer area/effective volume in the surface crosslinking step can be smaller than that in the stirring/drying step. For the reasons described above, in the case of using the same type of devices in the stirring/drying step and in the surface crosslinking step, the effective volume of the processing device used for the stirring/drying step is preferably smaller than that of the processing device used for the surface crosslinking step, in light of the temperature rising.

Further, adjusting the average temperature-rising speed in the surface crosslinking step to be in the above range can be realized by increasing the heating temperature by using the heat source in the heat treatment device. The type of the heat source is not especially limited, and examples are (i) heating by causing, for example, pressurized vapor or thermal oil to circulate in a heat medium circulating device and (ii) heating by heating wire, microwave, or electromagnetic induction. These heat medium circulating device and heating device can be attached to any locations, such as a jacket which can be attached to the processing device and the inside of the stirring blade. The type of the heat source, the spec of a heat source device, the set temperature of the heat source, and the amount of heat supplied from the heat source per unit time can be set properly depending on the type of the surface crosslinking agent used and the type of the heat treatment device used.

When polyhydric alcohol, carbonate compound, or the like is used as the surface crosslinking agent, and the surface crosslinking is carried out by the esterification reaction, it is preferable that the temperature profile of the water-absorbing resin powder pass through 190° C. or more at which it is possible to sufficiently carry out esterification disclosed, for example, as an esterification crosslinking reaction by polyvalent alcohol in U.S. Pat. No. 4,734,478.

Moreover, in the surface crosslinking step, the dried particulate composition may be stirred or may not be stirred. In the case of stirring the dried particulate composition, the stirring may be weaker than that in the stirring/drying step since the aggregates have already been broken in the stirring/drying step. Specifically, it is preferable that the number of rotations of the stirring blade in the surface crosslinking step be smaller than that in the stirring/drying step, and the peripheral speed of the stirring blade in the surface crosslinking step be lower than that in the stirring/drying step. The number of rotations of the stirring blade in the surface crosslinking step is preferably in a range from 0 rpm to 30 rpm, more preferably in a range from 0 rpm to 20 rpm, and further preferably from 0 rpm to 10 rpm. Further, the peripheral speed of the stirring blade in the surface crosslinking step is preferably 2 m/s or less, more preferably 1 m/s or less, and further preferably 0.3 m/s or less. The number of the stirring blades per unit length of the stirring axis depends on the shape of the stirring blade, but is preferably small. This is because the smaller the number of the stirring blades per unit length of the stirring axis is, the weaker the stirring becomes.

A device used for the surface crosslinking step is not especially limited, and a device used for the stirring/drying step can be used for the surface crosslinking step. Note that since it is not necessary to stir the mixture in the surface crosslinking step, it is also possible to use a device having no stirring blade. The surface crosslinking step can be further divided depending on the characteristics of the particle.

Moreover, in the case of carrying out both the stirring/drying step and the surface crosslinking step by using one processing device, the heating conditions and/or stirring conditions which satisfy the above conditions in the surface crosslinking step can be set in a latter portion of the processing device.

Moreover, in the method for manufacturing the water-absorbing resin of the present invention, it is preferable that the water-absorbing resin be cooled down after the surface crosslinking step.

In the case of using the above surface crosslinking method of the present invention, it is possible to preferably use, in the above step (2), step (3) and/or cooling step, a processing device including the stirring means explained in the above [Aspect Of Stirrer (Stirring Means) Used In Modifying Step And/or Cooling Step In Method For Manufacturing Water-absorbing Resin Of Present Invention].

In this case, at least one of the above steps (2) and (3) and cooling step is carried out by using the processing device including the stirring means. However, since the processing device including the stirring means can carry out the surface crosslinking reaction and the cooling uniformly, it is preferable that all of the steps (2) and (3) and cooling step be carried out by using the processing device including the stirring means.

Note that in the case of carrying out at least one of the step (2) and (3) and cooling step by using the processing device including the stirring means, it is possible to obtain the effect of suppressing the generation of the fine powder by the processing device including the stirring means. In this case, the processing device and heat treatment device described in (1. Modifying Step) can be used for the remaining steps.

Moreover, it is preferable that the processing devices used in the steps (2) and (3) and cooling step be different in type and/or effective volume from each other. Moreover, it is preferable that the processing devices used in the steps (2) and (3) and cooling step be driven under different heating conditions and/or different stirring conditions. Thus, it is possible to select the heating conditions and/or stirring conditions which are appropriate for each step, and also possible to efficiently manufacture the water-absorbing resin having excellent physical properties.

Not that the above "processing devices different in type from each other" means that the shapes of the processing devices are different from each other. Moreover, the above "processing devices different in effective volume from each other" means that the values of the effective volumes of the processing devices are different from each other.

The above "different heating conditions" means that at least one of (i) the type of the heat source which can be attached to the processing device, (ii) the spec of the heat source device which can be attached to the processing device, (iii) the set temperature of the heat source which can be attached to the processing device, (iv) the amount of heat supplied, per unit time, from the heat source which can be attached to the processing device, and (v) the heat transferring means included in the stirring board, the rotation axis, or the scraping blade is different.

Further, the above "different stirring conditions" means that at least one of (i) the ratio of the maximum thickness of the stirring board to the minimum thickness of the stirring board, (ii) the shape of the stirring board, (iii) the diameter of the stirring board, (iv) the number of the stirring boards per unit length of the rotation axis, (v) the number of rotations of the stirring board, (vi) the cross-sectional area of the scraping blade, (vii) the length of the scraping blade in the y direction, and (viii) the number of the scraping blades attached to the stirring boards is different.

The present invention is not limited to the description of the embodiments above, but may be altered within the scope of the claims. An embodiment based on a proper combination of technical means disclosed in different embodiments is encompassed in the technical scope of the present invention.

EXAMPLES

The following will explain the present invention in more detail on the basis of Examples and Comparative Examples, however the present invention is not limited to these Examples. Note that the water-absorbing resin and properties of the water-absorbing resin are measured by the following methods.

Note that since the water-absorbing resin used as an end product such as hygienic goods is wet, measurements are carried out after the water-absorbing resin is separated from the end product and dried at low temperature under reduced pressure (for example, at 60° C. under pressure of 1 mmHg or less for 12 hours). Moreover, the water content of the water-absorbing resin used in Examples and Comparative Examples in the present invention is 6 mass % or less.

A person with ordinary skill in the art can make various changes, modifications, and alterations within the scope of the present invention. Note that CRC (Centrifuge Retention Capacity), AAP (Absorbency Against Pressure (absorbency under pressure of 4.83 kPa)), SFC (Saline Flow Conductivity), and a particle size in the following Examples and Comparative Examples were evaluated in the following manner.

<CRC Measurement>

The CRC was evaluated as absorbency measured under no pressure for 30 minutes using a 0.90 mass % physiological saline solution. Specifically, 0.20 g of the water-absorbing resin was uniformly put into a bag (60 mm×60 mm) made of nonwoven fabric at room temperature (20° C. to 25° C.) and 50% RH, and the bag was sealed and immersed in the 0.9 mass % physiological saline solution at room temperature. The bag was pulled out of the solution 30 minutes later, and was drained off using a centrifuge (produced by Kokusan Co., Ltd., Centrifuge: Type H-122) by 250 G for 3 minutes. Then, a weight W1 (g) of the bag was measured. Moreover, the same operation was carried out without the water-absorbing resin. Then, a weight W0 (g) of the bag was measured. Then, the absorbency (g/g) was calculated by Formula (1) below using W1 and W0.

$$\text{Absorbency (g/g)}=(W1(\text{g})-W0\ (\text{g}))/\text{Weight Of Water-absorbing Resin (g)} \quad (1)$$

<AAP Measurement>

The AAP was evaluated as absorbency under pressure of 4.83 kPa for 60 minutes using the 0.90 mass % physiological saline solution. Specifically, a stainless steel 400 mesh metal screen (mesh size 38 μm) was fusion-bonded to the bottom of a plastic supporting cylinder having an internal diameter of 60 mm, and 0.90 g of the water-absorbing resin was uniformly spread on the metal screen at room temperature (20° C. to 25° C.) and 50% RH. Then, a piston and a load were placed in this order on the water-absorbing resin. The piston and the load were adjusted so as to apply load of 4.83 kPa (0.7 psi) uniformly to the water-absorbing resin. Each of the piston and the load had an external diameter which was slightly smaller than 60 mm so that (i) there was no gap between the piston (the load) and the supporting cylinder and (ii) the vertical motions of the piston (the load) were smooth. A weight Wa (g) of this complete set of measuring device was measured.

A glass filter (produced by Sogo Rikagaku Glass Works Co., Ltd., Pore Diameter: 100 μm to 120 μm) having a diameter of 90 mm was placed inside a petri dish having a diameter of 150 mm, and a 0.90 mass % physiological saline solution (20° C. to 25° C.) was added to the petri dish so that the liquid level of the 0.90 mass % physiological saline solution was the same as the top surface of the glass filter. Then, a piece of filter paper (produced by Advantec Toyo Co., Ltd., Product. Name: (JIS P 3801, No. 2), Thickness: 0.26 mm, Retained Particle Diameter: 5 μm) having a diameter of 90 mm was placed on the glass filter so that the surface of the filter paper got wet entirely, and excessive liquid was removed.

The complete set of measuring device was placed on the wet filter paper, and the liquid was absorbed under pressure. The complete set of measuring device was lifted up an hour later, and a weight Wb (g) of the complete set of measuring device was measured. Then, the absorbency against pressure (g/g) was calculated by Formula (2) below using Wa and Wb.

$$\text{Absorbency Against Pressure (g/g)}=(Wa(\text{g})-Wb(\text{g}))/\text{Weight (0.9 g) of Water-absorbing Resin} \quad (2)$$

<SFC Measurement>

The saline flow conductivity (SFC) is a value indicating liquid permeability of swollen water-absorbing resin particles or swollen water-absorbing resin composition. The larger the SFC value is, the higher the liquid permeability is.

The measurement was carried out in accordance with a saline flow conductivity (SFC) test disclosed in Published Japanese Translation of PCT International Publication for Patent Application 9-509591 (Tokuhyohei 9-509591).

Figure 4:
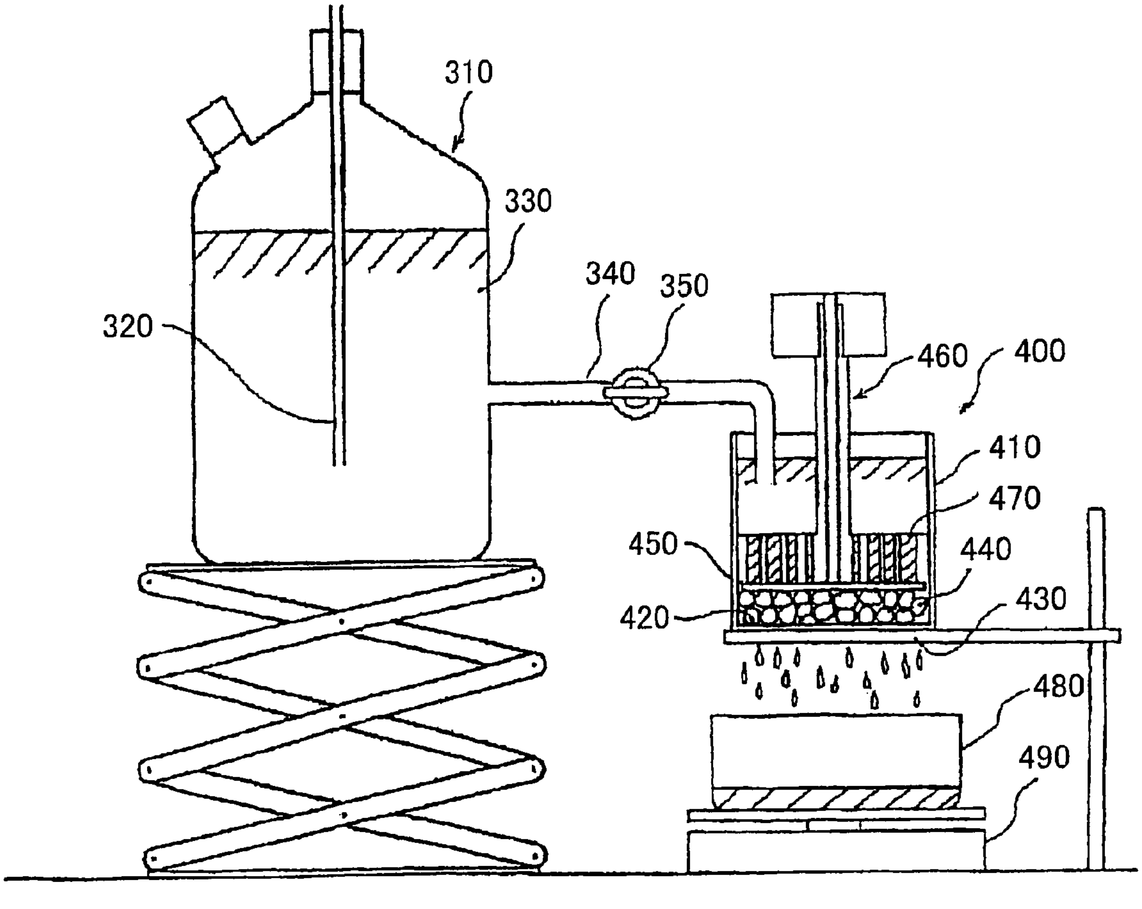
FIG. 4 is a schematic diagram of an SFC measuring device.

An apparatus shown in FIG. 4 was used. The water-absorbing resin (water-absorbing resin composition) (0.900 g) evenly spread in a container 400 was swollen in artificial urine (1) under pressure of 0.3 psi (2.07 kPa) for 60 minutes, and then the height of a gel layer of a gel 440 was recorded. Next, under pressure of 0.3 psi (2.07 kPa), a 0.69 mass % saline solution 330 was supplied from a tank 310 at a certain hydrostatic pressure so as to pass through the swollen gel layer. This SFC test was carried out at room temperature (20° C. to 25° C.).

Using a computer and a balance, the amount of liquid passing through the gel layer was recorded every 20 seconds for 10 minutes as a function of time. A flow speed Fs (T) of the liquid passing through (mainly between the particles of) the swollen gel 440 was determined by dividing an increased weight (g) by an increased time (s) and expressed by g/s.

A time the hydrostatic pressure became constant and the flow speed became stable is Ts. Data obtained in 10 minutes from Ts is used for calculating the flow speed. Then, the value of Fs (T=0), that is, an initial flow speed of the liquid passing through the gel layer was calculated using the flow speed. Fs (T=0) was extrapolated from a result of a least square method of Fs (T) versus time.

$$\begin{aligned}\text{Saline Flow Conductivity }(SFC) &= (Fs(t=0)\times L0)/(\rho\times A\times\Delta P)\\ &= (Fs(t=0)\times L0)/139506\end{aligned}$$

In this formula, Fs (t=0) denotes the flow speed and is shown by g/s, L0 denotes the height of the gel layer and is shown by cm, ρ denotes the density of a NaCl solution (1.003 $g/cm^3$), A denotes the area of an upper surface of the gel layer in a cell 410 (28.27 $cm^2$), and ΔP denotes the hydrostatic pressure applied to the gel layer (4,920 $dyne/cm^2$). In addition, the unit of the SFC value is $10^{-7} \cdot cm^3 \cdot s \cdot g^{-1}$.

Regarding the apparatus shown in FIG. 4, a glass tube 320 was inserted into a tank 310, the lower end of the glass tube 320 was placed so that the liquid level of the 0.69 mass % saline solution 330 was maintained to be 5 cm above the bottom of the swollen gel 440 in the cell 410. The 0.69 mass % saline solution 330 in the tank 310 was supplied to the cell 410 through an L-shaped tube 340 having a cock 350. A container 480 for collecting the liquid having passed through the cell 410 was placed under the cell 410, and this collecting container 480 was placed on an even balance 490. The internal diameter of the cell 410 was 6 cm, and a No. 400 stainless steel metal screen 420 (mesh size 38.mu.m) was provided at the bottom of the cell 410.

A hole 470 through which liquid can pass was formed at a lower portion of the piston 460, and a glass filter 450 having high permeability was provided at a bottom of the piston 460 so that the water-absorbing resin particles or the swollen gel do not get into the hole 470. The cell 410 was placed on a base for mounting a cell, and a stainless steel metal screen 430 which does not disturb the penetration of the liquid was placed on a surface of the base, the surface being in contact with the cell 410.

Artificial urine (1) was a mixture of 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of diammonium hydrogen phosphate, and 994.25 g of pure water.

<Particle Size Measurement>

The water-absorbing resin particles were classified by JIS standard sieves having mesh sizes of 850 μm, 710 μm, 600 μm, 500 μm, 425 μm, 300 μm, 212 μm, 150 μm, 106 μm, and 45 μm, the weight percentage of particles each having the particle diameter of less than 150 μm was measured, and a residual percentage R of each particle size was plotted to a logarithmic probability sheet. Thus, a particle diameter corresponding to R=50 mass % was considered as the weight average particle diameter (D50).

Regarding the classification, 10.00 g of the water-absorbing resin was put into the JIS standard sieves (The IIDA TESTING SIEVE, Internal Diameter of 80 mm) having the above mesh sizes, and classified with the low tap sieve shaker (produced by Iida Seisakusho, ES-65 Sieve Shaker) for five minutes. Note that the "mass average particle diameter (D50)" of particles corresponds to a certain mesh size of a standard sieve on which 50 mass % of the particles remain, as disclosed in U.S. Pat. No. 5,051,259, etc.

Manufacture Example

Manufacture of Water-Absorbing Resin Precursor

In a kneader having two sigma blades, (i) prepared was a monomer aqueous solution which contains sodium acrylate, acrylic acid and water, whose monomer concentration was 38 mass %, and whose neutralization ratio was 70 mole %, and (ii) polyethylene glycol diacrylate (the average number of ethylene glycol units: 9) was dissolved as the internal crosslinking agent so that polyethylene glycol diacrylate is 0.03 mole % with respect to the monomers.

Next, nitrogen gas was blown in the monomer aqueous solution to reduce dissolved oxygen in the monomer aqueous solution, and nitrogen substitution was carried out in the entire reactor vessel. Then, while causing two sigma blades to rotate, sodium persulfate (0.12 g/mol with respect to the monomers) and L-ascorbic acid (0.005 g/mol with respect to the monomers) were added as the polymerization initiator, and the polymerization with stirring was carried out in the kneader. About 40 minutes later, the hydrophilic crosslinked polymer whose average particle diameter was about 2 mm was obtained.

In the case of using the obtained hydrophilic crosslinked polymer in Examples 1 to 4 and Comparative Example 1 to 4, it was dried by a hot air drier at 170° C. for 55 minutes. Meanwhile, in the case of using the obtained hydrophilic crosslinked polymer in Examples 5 and 6 and Comparative Examples 5 and 6, it was dried by a hot air drier at 170° C. for 60 minutes. The dried polymer was crushed by a roller mill, the crushed particles were classified by sieves having the mesh sizes of 850 μm and 105 μm, and obtained was a water-absorbing resin precursor (A) whose water content was 5%, weight average particle size was 478 μm, and weight percentage of particles each having the particle diameter of less than 150 μm was 0.8%.

Example 1

3.9 mass parts of a surface crosslinking agent-containing aqueous solution containing 0.34 mass part of 1,4-butanediol (hereinafter also referred to as "1,4-BD"), 0.56 mass part of propylene glycol (hereinafter also referred to as "PG"), and 3 mass parts of pure water was sprayed to and mixed with 100 parts by weight of the water-absorbing resin precursor (A), obtained in Manufacture Example, by a continuous high-speed stirring mixer (Turbulizer produced by Hosokawa Micron). Thus, a wet product was obtained. This wet product was subjected to the heat treatment by using a conductive heat transfer trough stirring dryer (produced by Nara Machinery Co., Ltd., Multi-fin Processor; NFP-1.6W) whose paddle (stirring board) diameter was 170 mmϕ, heat transfer area was 1.5 $m^2$, and effective volume was 0.089 $m^3$.

The conductive heat transfer trough stirring dryer was a biaxial trough stirring dryer in which (i) 15 stirring boards each of which has the scraping blade and was a flat disc shape (fan shape) were provided for each rotation axis (the total number of stirring boards was 30) (In the cross section taken along the y-z plane, the ratio of the maximum thickness of the stirring board to the minimum thickness of the stirring board was "4 mm/4 mm=1", the cross-sectional area of the scraping blade was "120 mm×30 mm=3,600 $mm^2$", and the area between the stirring boards was 16,366 $mm^2$), and (ii) the rotation axes are provided in parallel with each other. The stirring boards attached to two rotation axes do not overlap each other, and are provided in parallel with each other. The term "overlap" means that when the conductive heat transfer trough stirring dryer has a plurality of rotation axes, a plurality of stirring boards provided on different rotation axes engages with each other.

Heated vapor was injected in the inner wall, stirring board and rotation axis of the stirring dryer, and the surface temperature of each of the inner wall, the stirring board and the rotation axis was 210° C. A throughput was 45 kg/h, and an average staying time was 60 minutes. After the heat treatment, the surface crosslinked water-absorbing resin was put in a cooling device (produced by Okawara Seisakusho, Horizontal Continuous Fluidized Bed Dryer With Heating Tube; FCA-2) serially connected to the stirring dryer. Regarding the cooling by the cooling device, the water-absorbing resin was cooled down by (i) causing normal-temperature tap water to circulate in the heating tube, and (ii) room temperature wind of 0.5 m/s with respect to a floor surface of 0.3 $m^2$. This water-absorbing resin was sieved by a sieve having the mesh size of 850 μm. Thus, modified water-absorbing resin (water-absorbing resin 1) was obtained. The amount of the resin having passed through the sieve having the mesh size of 150 μm was 1.0% of the entire weight of the above surface crosslinked water-absorbing resin. The modified water-absorbing resin had the CRC of 29 (g/g), the AAP of 26 (g/g), and the average particle diameter of 480 μm. Results are shown in Table 1.

Example 2

3.9 mass parts of the surface crosslinking agent-containing aqueous solution containing 0.34 mass part of 1,4-butanediol, 0.56 mass part of propylene glycol, and 3 mass parts of pure water was sprayed to and mixed with 100 parts by weight of the water-absorbing resin precursor (A), obtained in Manufacture Example, by the continuous high-speed stirring mixer (Turbulizer produced by Hosokawa Micron). Thus, the wet product was obtained.

This wet product was continuously processed by a conductive heat transfer trough stirring dryer (produced by Nara Machinery Co., Ltd., Paddle Dryer; NPD-1.6W), the throughput of which was 40 kg/h. This stirring dryer was serially connected to the cooling device (produced by Nara Machinery Co., Ltd., Multi-fin Processor; NFP-1.6W). Regarding the number of rotations of the paddle (stirring board) of each device, the number of the stirring dryer was set to 30 rpm, and the number of the cooling device was set to 30 rpm. Barreltherm #400 produced by Matsumura Oil Co., Ltd. was used as a heat medium, the heat medium was caused to circulate in the paddle of the stirring dryer, and normal-temperature tap water was caused to circulate in the jacket and paddle of the cooling device. The above conductive heat transfer trough stirring dryer had two rotation axes, and the stirring boards attached to these two rotation axes are provided so as to overlap each other and engage with each other.

The temperature of the powder of the water-absorbing resin at the raw material supply opening of the stirring dryer was 40° C., and the temperature of the powder of the water-absorbing resin at the water-absorbing resin discharge opening of the stirring dryer was 210° C. The stirrer and the cooling were serially connected to each other by using a stainless pipe. The water-absorbing resin surface crosslinked in the modifying step was immediately conveyed to the cooling device, and was subjected to the cooling step. The surface crosslinked water-absorbing resin thus obtained was sieved by using the JIS standard sieve having the mesh size of 850 μm. Thus, modified water-absorbing resin (water-absorbing resin 2) was obtained.

The staying time in the modifying step was 60 minutes, and the staying time in the cooling step was 64.5 minutes. The amount of the resin having passed through the sieve having the mesh size of 150 μm was 2.1% of the entire weight of the above surface crosslinked water-absorbing resin. The modified water-absorbing resin had the CRC of 28 (g/g), the AAP of 25 (g/g), and the average particle diameter of 455 μm.

Example 3

The modified water-absorbing resin (water-absorbing resin 1) obtained in Example 1 was classified by the JIS standard sieves having the mesh sizes of from 850 μm to 150 μm. Thus, the water-absorbing resin whose particle size was adjusted was obtained. Note that the average particle diameter of the water-absorbing resin whose particle size was adjusted was 480 μm, and the amount (150 pass amount) of the resin having passed through the sieve having the mesh size of 150 μm was 1.0%.

Using the above water-absorbing resin whose particle size was adjusted, mixing was carried out by a batch cooling device (produced by Nara Machinery Co., Ltd., Multi-fin Processor; NFP-1.6W) whose water-absorbing resin discharge opening was closed. The number of rotations of the paddle (stirring board) of the batch cooling device was 30 rpm, normal-temperature tap water was injected in the inner wall, stirring board and rotation axis of the batch cooling device, and the amount of the water-absorbing resin accumulating in a cooling container was 50 kg.

While stirring at 30 rpm, samples were taken out every predetermined time (30 minutes after the start of the mixing, 60 minutes after the start of the mixing, and 120 minutes after the start of the mixing). Thus, water-absorbing resin (3-1 to 3-3) were obtained. The water-absorbing resin 3-1 had the 150 pass amount of 1.0%, the water-absorbing resin 3-2 had the 150 pass amount of 1.1%, and the water-absorbing resin 3-3 had the 150 pass amount of 1.3%.

Comparative Example 1

3.9 mass parts of the surface crosslinking agent-containing aqueous solution containing 0.34 mass part of 1,4-butanediol, 0.56 mass part of propylene glycol, and 3 mass parts of pure water was sprayed to and mixed with 100 parts by weight of the water-absorbing resin precursor (A), obtained in Manufacture Example, by the continuous high-speed stirring mixer (Turbulizer produced by Hosokawa Micron). Thus, the wet product was obtained. This wet product was subjected to the heat treatment by using the conductive heat transfer trough stirring dryer (produced by Nara Machinery Co., Ltd., NPD-1.6W) whose paddle diameter was 160 mmφ, heat transfer area was 2.5 $m^2$, and effective volume was 0.065 $m^3$.

The conductive heat transfer trough stirring dryer has 17 scraping blades and 16 stirring boards each having the lacked portion, and in the cross section taken along the y-z plane, the ratio of the maximum thickness of the stirring board to the minimum thickness of the stirring board was "26 mm/3 mm", the cross-sectional area of the scraping blade was "39 mm×25 mm×2 scraping blades=1,950 $mm^2$", and the area between the stirring boards was 15,190 $mm^2$. Moreover, this conductive heat transfer trough stirring dryer was a biaxial trough stirring dryer in which the stirring boards overlap each other. The stirring boards attached to two rotation axes were provided so as to overlap each other and engage with each other.

Heated vapor was injected in the inner wall, stirring board and rotation axis of the stirring dryer, and the surface temperature of each of the inner wall, the stirring board and the rotation axis was 210° C. The average staying time was 60 minutes, and the throughput was 40 kg/h. The surface crosslinked water-absorbing resin was taken out to an SUS container, and was cooled down. This water-absorbing resin was sieved by a sieve having the mesh size of 850 μm. Thus, comparative water-absorbing resin 1 was obtained. The amount of the resin having passed through the sieve having the mesh size of 150 μm was 2.0% of the entire weight of the above surface crosslinked water-absorbing resin. The comparative water-absorbing resin 1 had the CRC of 29 (g/g), the AAP of 25 (g/g), and the average particle diameter of 460 μm.

Comparative Example 2

3.9 mass parts of the surface crosslinking agent-containing aqueous solution containing 0.34 mass part of 1,4-butanediol, 0.56 mass part of propylene glycol, and 3 mass parts of pure water was sprayed to and mixed with 100 parts by weight of the water-absorbing resin precursor (A), obtained in Manufacture Example, by the continuous high-speed stirring mixer (Turbulizer produced by Hosokawa Micron). Thus, the wet product was obtained.

This wet product was continuously processed by the conductive heat transfer trough stirring dryer (produced by Nara Machinery Co., Ltd., Paddle Dryer; NPD-1.6W), the throughput of which was 40 kg/h. This stirring dryer was serially connected to the cooling device (produced by Nara Machinery Co., Ltd., Paddle Dryer; NPD-1.6W). Regarding the number of rotations of the paddle (stirring board) of each device, the number of the stirring dryer was set to 30 rpm, and the number of the cooling device was set to 30 rpm. Barreltherm #400 produced by Matsumura Oil Co., Ltd. was used as a heat medium, the heat medium was caused to circulate in the paddle of the stirring dryer, and normal-temperature tap water was caused to circulate in the jacket and paddle of the cooling device. The above conductive heat transfer trough stirring dryer had two rotation axes, and the stirring boards attached to these two rotation axes are provided so as to overlap each other and engage with each other.

The temperature of the powder of the water-absorbing resin at the raw material supply opening of the stirring dryer was 40° C., and the temperature of the powder of the water-absorbing resin at the water-absorbing resin discharge opening of the stirring dryer was 210° C. The stirrer and the cooling device were serially connected to each other by using the stainless pipe. The water-absorbing resin surface crosslinked in the modifying step was immediately conveyed to the cooling device, and was subjected to the cooling step. The surface crosslinked water-absorbing resin thus obtained was sieved by using the JIS standard sieve having the mesh size of 850 μm. Thus, comparative water-absorbing resin 2 was obtained.

The staying time in the modifying step was 64 minutes, and the staying time in the cooling step was 74 minutes. The amount of the resin having passed through the sieve having the mesh size of 150 μm was 4.0% of the entire weight of the above surface crosslinked water-absorbing resin. The comparative water-absorbing resin 2 had the CRC of 28.5 (g/g), the AAP of 25 (g/g), and the average particle diameter of 412 μm.

Comparative Example 3

The modified water-absorbing resin (water-absorbing resin 1) obtained in Example 1 was classified by the JIS standard sieves having the mesh sizes of from 850 μm to 150 μm. Thus, the water-absorbing resin whose particle size was adjusted was obtained. Note that the average particle diameter of the water-absorbing resin whose particle size was adjusted was 480 μm, and the 150 pass amount was 1.0%.

Using the above water-absorbing resin whose particle size was adjusted, mixing was carried out by the batch cooling device (produced by Nara Machinery Co., Ltd., NPD-1.6W) whose water-absorbing resin discharge opening was closed. The number of rotations of the paddle (stirring board) of the batch cooling device was 30 rpm, normal-temperature tap water was injected in the inner wall, stirring board and rotation axis of the batch cooling device, and the amount of the water-absorbing resin accumulating in the cooling container was 40 kg.

While stirring at 30 rpm, samples were taken out every predetermined time (30 minutes after the start of the mixing, 60 minutes after the start of the mixing, and 120 minutes after the start of the mixing). Thus, comparative water-absorbing resin (3-1 to 3-3) were obtained. The comparative water-absorbing resin 3-1 had the 150 pass amount of 1.30%, the comparative water-absorbing resin 3-2 had the 150 pass amount of 1.7%, and the comparative water-absorbing resin 3-3 had the 150 pass amount of 2.2%.

Example 4

3.9 mass parts of the surface crosslinking agent-containing aqueous solution containing 0.34 mass part of 1,4-butanediol, 0.56 mass part of propylene glycol, and 3 mass parts of pure water was sprayed to and mixed with 100 parts by weight of the water-absorbing resin precursor (A), obtained in Manufacture Example, by the continuous high-speed stirring mixer (Turbulizer produced by Hosokawa Micron). Thus, the wet product was obtained.

This wet product was continuously processed by the conductive heat transfer trough stirring dryer (produced by Nara Machinery Co., Ltd., Multi-fin Processor; NFP-1.6W), the throughput of which was 40 kg/h. This stirring dryer was serially connected to the cooling device (produced by Nara Machinery Co., Ltd., Multi-fin Processor; NFP-1.6W). Regarding the number of rotations of the paddle (stirring board) of each device, the number of the stirring dryer was set to 30 rpm, and the number of the cooling device was set to 30 rpm. Barreltherm #400 produced by Matsumura Oil Co., Ltd. was used as the heat medium, the heat medium was caused to circulate in the paddle of the stirring dryer, and normal-temperature tap water was caused to circulate in the jacket and paddle of the cooling device. The stirring boards attached to two rotation axes of the above conductive heat transfer trough stirring dryer do not overlap each other but were provided in parallel with each other.

The temperature of the powder of the water-absorbing resin at the raw material supply opening of the stirring dryer was 40° C., and the temperature of the powder of the water-absorbing resin at the water-absorbing resin discharge opening of the stirring dryer was 210° C. The stirrer and the cooling device were serially connected to each other by using the stainless pipe. The water-absorbing resin surface crosslinked in the modifying step was immediately conveyed to the cooling device, and was subjected to the cooling step. The surface crosslinked water-absorbing resin thus obtained was sieved by using the JIS standard sieve having the mesh size of 850 μm. Thus, modified water-absorbing resin (water-absorbing resin 4) was obtained.

The staying time in the modifying step was 60 minutes, and the staying time in the cooling step was 64.5 minutes. The amount of the resin having passed through the sieve having the mesh size of 150 μm was 2.1% of the entire weight of the surface crosslinked water-absorbing resin. The modified water-absorbing resin had the CRC of 29 (g/g), the AAP of 26 (g/g), and the average particle diameter of 478 μm.

Comparative Example 4

3.9 mass parts of the surface crosslinking agent-containing aqueous solution containing 0.34 mass part of 1,4-butanediol, 0.56 mass part of propylene glycol, and 3 mass parts of pure water was sprayed to and mixed with 100 parts by weight of the water-absorbing resin precursor (A), obtained in Manufacture Example, by the continuous high-speed stirring mixer (Turbulizer produced by Hosokawa Micron).

The wet product was subjected to the heat treatment by using a conductive heat transfer trough stirring dryer (produced by Kurimoto, Ltd., CD-80, Stirring Board Conversion Type) whose paddle (stirring board) diameter was 80 mmϕ, heat transfer area was 0.35 $m^2$, and effective volume was 0.046 $m^3$.

The stirring dryer has 14 scraping blades, and 14 stirring boards each having the lacked portion, and in the cross section taken along the y-z plane, the ratio of the maximum thickness of the stirring board to the minimum thickness of the stirring board was "15 mm/2.5 mm", the cross-sectional area of the scraping blade was "20 mm×10 mm=200 $mm^2$", and the area between the stirring boards was 2,400 $mm^2$. Moreover, this stirring dryer is a biaxial trough stirring dryer in which the stirring boards attached to two rotation axes are provided so as to overlap each other and engage with each other.

Heated vapor was injected in the inner wall, stirring board and rotation axis of the stirring dryer, and the surface temperature of each of the inner wall, the stirring board, and the rotation axis was 220° C. The average staying time was 35 minutes, and the throughput was 7 kg/h. The surface crosslinked water-absorbing resin was taken out to the SUS container, and was cooled down. This water-absorbing resin was sieved by the sieve having the mesh size of 850 μm. Thus, modified water-absorbing resin (comparative water-absorbing resin 4) was obtained. The amount of the resin having passed through the sieve having the mesh size of 150 μm was 1.5%. The comparative water-absorbing resin 4 had the CRC of 27 (g/g), the AAP of 24 (g/g), and the average particle diameter of 475 μm.

Experimental conditions and physical properties of the modified water-absorbing resin in the above Examples and Comparative Examples are shown in Tables 1 and 2. In these tables, the term "Blade Pitch" means a distance between adjacent stirring boards in the y direction in the y-z plane. Examples of the blade pitch are $T_4$ in FIG. 2(A) and $T_4'$ in FIG. 3(A). Moreover, in the tables, the term "Blade Length" means a length of the scraping blade in the y direction in the y-z plane. Examples of the blade length are $T_5$ in FIG. 2(A) and $T_5'$ in FIG. 3(A). Further, in the tables, the term "Scraping Blade (mm)" means the size in the z direction and size in the y direction of the scraping blade in the y-z plane ($T_5 \times T_6$). Meanwhile, in the tables, the term "Cross-sectional Area Of Scraping Blade (%)" means, for example, the area of the scraping blade with respect to the area between the stirring boards, and is, for example, shown by, in FIG. 2(A), "$(T_6 \times T_5 \times 2) \div (T_3 \times T_4) \times 100$". Moreover, the term "Distance Of Scraping Blade (%)" means the length of the scraping blade with respect to the area between the stirring boards, and is, for example, shown by, in FIG. 2(A), "$(T_5) \div (T_3 \div T_4) \times 100$".

TABLE 1

| | Example 1 | Comparative Example 1 | Example 2 | Comparative Example 2 | Comparative Example 4 | Example 4 |
|---|---|---|---|---|---|---|
| Device 1 | Conductive Heat Transfer Dryer (NFP-1.6 W) | Conductive Heat Transfer Dryer (NPD-1.6 W) | Conductive Heat Transfer Dryer (NPD-1.6 W) | Conductive Heat Transfer Dryer (NPD-1.6 W) | Conductive Heat Transfer Dryer (CD-80) | Conductive Heat Transfer Dryer (NFP-1.6 W) |
| Device 2 | Cooling Device (FCA-2) | SUS Container | Cooling Device (NFP-1.6 W) | Cooling Device (NPD-1.6 W) | — | Cooling Device (NFP-1.6 W) |
| Throughput (kg/h) Of Device 1 | 45 | 40 | 40 | 40 | 4 | 45 |
| Throughput (kg/h) Of Device 2 | 45 | — | 40 | 40 | — | 45 |
| Average Staying Time (min) Of Device 1 | 60 | 60 | 60 | 64 | 35 | 60 |
| Average Staying Time (min) Of Device 2 | 30 | — | 64.5 | 74 | — | 60 |
| Surface Temperature (° C.) Of Powder Of Device 1 | 40→210 | 40→210 | 40→211 | 40→210 | 40→220 | 40→210 |
| Surface Temperature (° C.) Of Powder Of Device 2 | 180→Room Temperature | 180→Room Temperature | 160→40 | 180→40 | 190→Room Temperature | 180→40 |
| Number Of Rotations (rpm) Of Stirring Of Device 1 | 30 | 30 | 30 | 30 | 30 | 30 |
| Number Of Rotations (rpm) Of Stirring Of Device 2 | — | — | 30 | 30 | — | 30 |
| Cross Section Of Heat Transfer | | | | | | |

TABLE 1-continued

| | | | | | | |
|---|---|---|---|---|---|---|
| Board Of Device 1 | | | | | | |
| Maximum (mm) | 4 | 26 | 26 | 26 | 15 | 4 |
| Minimum (mm) | 4 | 3 | 3 | 3 | 2.5 | 4 |
| Cross Section Of Heat Transfer Board Of Device 2 | | | | | | |
| Maximum (mm) | — | — | 4 | 26 | — | 4 |
| Minimum (mm) | — | — | 4 | 3 | — | 4 |
| Ratio Of Maximum To Minimum Of Device 1 | 1 | 8.7 | 8.7 | 8.7 | 6 | 1 |
| Ratio Of Maximum To Minimum Of Device 2 | — | | 1 | 8.7 | — | 1 |
| Blade Pitch (mm) Of Device 1 | 98 | 98 | 98 | 98 | 30 | 98 |
| Blade Pitch (mm) Of Device 2 | 98 | — | 98 | 98 | — | 98 |
| Blade Length (mm) Of Device 1 | 167 | 155 | 155 | 155 | 80 | 167 |
| Blade Length (mm) Of Device 2 | — | — | 167 | 167 | — | 167 |
| Area ($mm^2$) Between Heat Transfer Boards Of Device 1 | 16366 | 15190 | 15190 | 15190 | 2400 | 16366 |
| Area ($mm^2$) Between Heat Transfer Boards Of Device 2 | — | — | 15190 | 16366 | —<br>— | 16366 |
| Scraping Blade (mm) Of Device 1 | 120 × 30 | 39 × 25 × 2 | 39 × 25 × 2 | 39 × 25 × 2 | 20 × 10 | 120 × 30 |
| Scraping Blade (mm) Of Device 2 | | — | 120 × 30 | 39 × 25 × 2 | — | 120 × 30 |
| Cross-sectional Area (%) Of Scraping Blade Of Device 1 | 22 | 12.8 | 12.8 | 12.8 | 8.3 | 22 |
| Cross-sectional Area (%) Of Scraping Blade Of Device 2 | — | — | 22 | 12.8 | — | 22 |
| Distance (%) Of Scraping Blade Of Device 1 | 122 | 39.8 | 39.8 | 39.8 | 66.7 | 122 |
| Distance (%) Of Scraping Blade Of Device 2 | — | — | 122 | 39.8 | | 122 |

| | Water-absorbing Resin 1 | Comparative Water-absorbing Resin 1 | Water-absorbing Resin 2 | Comparative Water-absorbing Resin 2 | Comparative Water-absorbing Resin 4 | Water-absorbing Resin 4 |
|---|---|---|---|---|---|---|
| CRC (Absorbency; g/g) | 29 | 29 | 28 | 28.5 | 27 | 29 |
| AAP (Absorbency Against Pressure; g/g) | 26 | 25 | 25 | 25 | 24 | 26 |
| SFC (Permeability Under Pressure; $cm^3 \cdot s/g$) | 55 | 50 | 50 | 45 | 55 | 55 |
| Average Particle Diameter (μm) | 480 | 460 | 455 | 412 | 475 | 478 |
| 150 Pass (%) | 1 | 2 | 2.1 | 4 | 1.5 | 1.1 |
| Stirring Power (A) (Except for Idling (A)) | — | — | — | — | — | — |

TABLE 2

| | Example 3-1 | Example 3-2 | Example 3-3 | Comparative Example 3-1 | Comparative Example 3-2 | Comparative Example 3-3 |
|---|---|---|---|---|---|---|
| Device 1 | Cooling Device (NFP-1.6 W) | ← | ← | Cooling Device (NPD-1.6 W) | ← | ← |
| Device 2 | | | | | | |
| Throughput (kg/h) Of Device 1 | 50 | 50 | 50 | 40 | 40 | 40 |
| Throughput (kg/h) Of Device 2 | — | — | — | — | — | — |
| Average Staying Time (min) Of Device 1 | 30 | 60 | 120 | 30 | 60 | 120 |
| Average Staying Time (min) Of Device 2 | — | — | — | — | — | — |
| Surface Temperature (° C.) Of Powder Of Device 1 | Room Temperature | Room Temperature | Room Temperature | Room Temperature | Room Temperature | Room Temperature |
| Surface Temperature (° C.) Of Powder Of Device 2 | — | — | — | — | — | — |
| Number Of Rotations (rpm) Of Stirring Of Device 1 | 30 | 30 | 30 | 30 | 30 | 30 |
| Number Of Rotations (rpm) Of Stirring Of Device 2 | — | — | — | — | — | — |
| Cross Section Of Heat Transfer Board Of Device 1 | | | | | | |
| Maximum (mm) | 4 | 4 | 4 | 26 | 26 | 26 |
| Minimum (mm) | 4 | 4 | 4 | 3 | 3 | 3 |
| Cross Section Of Heat Transfer Board Of Device 2 | | | | | | |
| Maximum (mm) | — | — | — | — | — | — |
| Minimum (mm) | — | — | — | — | — | — |
| Ratio Of Maximum To Minimum Of Device 1 | 1 | 1 | 1 | 8.7 | 8.7 | 8.7 |
| Ratio Of Maximum To Minimum Of Device 2 | — | — | — | — | — | — |
| Blade Pitch (mm) Of Device 1 | 98 | 98 | 98 | 98 | 98 | 98 |
| Blade Pitch (mm) Of Device 2 | — | — | — | — | — | — |
| Blade Length (mm) Of Device 1 | 167 | 167 | 167 | 155 | 155 | 155 |
| Blade Length (mm) Of Device 2 | — | — | — | — | — | — |
| Area ($mm^2$) Between Heat Transfer Boards Of Device 1 | 16366 | 16366 | 16366 | 15190 | 15190 | 15190 |

TABLE 2-continued

| | | | | | | |
|---|---|---|---|---|---|---|
| Area ($mm^2$) Between Heat Transfer Boards Of Device 2 | — | — | — | — | — | — |
| Scraping Blade (mm) Of Device 1 | 120 × 30 | 120 × 30 | 120 × 30 | 39 × 25 × 2 | 39 × 25 × 2 | 39 × 25 × 2 |
| Scraping Blade (mm) Of Device 2 | — | — | — | — | — | — |
| Cross-sectional Area (%) Of Scraping Blade Of Device 1 | 22 | 22 | 22 | 12.8 | 12.8 | 12.8 |
| Cross-sectional Area (%) Of Scraping Blade Of Device 2 | — | — | — | — | — | — |
| Distance (%) Of Scraping Blade Of Device 1 | 122 | 122 | 122 | 39.9 | 39.9 | 39.9 |
| Distance (%) Of Scraping Blade Of Device 2 | — | — | — | — | — | — |

| | Water-absorbing Resin 3-1 | Water-absorbing Resin 3-2 | Water-absorbing Resin 3-3 | Comparative Water-absorbing Resin 3-1 | Comparative Water-absorbing Resin 3-2 | Comparative Water-absorbing Resin 3-3 |
|---|---|---|---|---|---|---|
| CRC (Absorbency; g/g) | 29 | 29 | 29 | 29 | 29 | 29 |
| AAP (Absorbency Against Pressure; g/g) | 26 | 26 | 26 | 25 | 25 | 23 |
| SFC (Permeability Under Pressure; $cm^3 \cdot s/g$) | 55 | 55 | 55 | 50 | 50 | 47 |
| Average Particle Size (μm) | 480 | 481 | 473 | 475 | 466 | 450 |
| 150 Pass (%) | 1.0 | 1.1 | 1.3 | 1.3 | 1.7 | 2.2 |
| Stirring Power (A) (Except for Idling (A)) | 0.1 | — | — | 0.5 | — | — |

Example 5

0.34 mass part of 1,4-butanediol (hereinafter also referred to as "1,4-BD"), 0.56 mass part of propylene glycol (hereinafter also referred to as "PG"), and 3 mass parts of pure water were added to and mixed with 100 mass parts of the water-absorbing resin precursor (A), obtained in Manufacture Example, at room temperature. 500 mass parts of the obtained wet product was put in a 5 L Mortar Heat Treatment Device (Processor, produced by Nishi Nippon Shikenki Seisakusho) in which (i) refined oil was used in an oil bath and (ii) the set temperature of the oil bath was 230° C. The wet product was stirred at high speed (rotation movement of 280 rpm and revolution movement of 125 rpm) and subjected to the heat treatment for 15 minutes. Then, the product was immediately put in the 5 L Mortar Heat Processing Device (Processor, produced by Nishi Nippon Shikenki Seisakusho) in which the set temperature of the refined oil bath was 210° C. The product was stirred at low speed (rotation movement of 140 rpm and revolution movement of 62 rpm). The heat treatment was further carried out for 5 minutes (see Table 3). The resulting mixture was caused to pass through the JIS standard sieve having the mesh size of 850 μm. Thus, water-absorbing resin (1) was obtained.

TABLE 3

| Manufacture Conditions | | |
|---|---|---|
| | Water-absorbing Resin (1) Of Example 5 | Water-Absorbing Resin (3) Of Comparative Example 5 |
| Oil Bath (° C.) Of First Device | 230 | 210 |
| Processing Time (min) Of First Device | 15 | 30 |
| Oil Bath (° C.) Of Second Device | 210 | — |
| Processing Time (min) Of Second Device | 5 | — |
| Total Processing Time (min) | 20 | 30 |

Physical properties of the water-absorbing resin composition (1) obtained by the above method were evaluated. Results are shown in Table 4.

TABLE 4

| Comparison Of Physical Properties | | |
|---|---|---|
| | Water-absorbing Resin (1) Of Example 5 | Water-absorbing Resin (3) Of Comparative Example 5 |
| CRC (Average Value) | 27.5 | 27.3 |
| AAP (Average Value) | 24.5 | 24.6 |
| SFC (Average Value) | 81 | 80 |

As shown in Tables 3 and 4, the processing time of the heat treatment for obtaining the surface crosslink density (in order words, the CRC value) similar to that of Comparative Example 5 below was reduced from 30 minutes to 20 minutes.

Example 6

0.34 mass part of 1,4-BD, 0.56 mass part of PG, and 3 mass parts of pure water were added to and mixed with 100 mass parts of the water-absorbing resin precursor (A) obtained in Manufacture Example. The obtained wet product was continuously processed by an apparatus (throughput: 50 kg/h) that is configured by serially connecting with each other three conductive heat transfer trough stirring dryers (produced by Nara Machinery Co., Ltd., NPD-1.6W) each of whose paddle diameter was 160 mmϕ, heat transfer area was 2.5 $m^2$ and effective volume was 0.065 $m^3$ (see Table 5). The first processing device was used for the stirring/drying step, the second processing device was used for the surface crosslinking step, and the third processing device was used for the cooling step. Regarding the number of rotations of the paddle of each processing device, the number in the stirring/drying step was set to 30 rpm, the number in the surface crosslinking step was set to 5 rpm, and the number in the cooling step was set to 5 rpm. In the first and second devices, the height of a discharge weir was set to 60% (when the upper surface of the stirring blade was regarded as 100%). Barreltherm #400 produced by Matsumura Oil Co., Ltd. was used as the heat medium. In the first and second conductive heat transfer trough stirring dryers, the heat medium was caused to circulate in the paddle. In the third conductive heat transfer trough stirring dryer, normal-temperature tap water was caused to circulate in the jacket and paddle. The temperature of the water-absorbing resin powder at the processing device input port of the first conductive heat transfer trough stirring dryer was 40° C., the temperature of the water-absorbing resin powder at the processing device outlet port of the first conductive heat transfer trough stirring dryer was 190° C., the temperature of the water-absorbing resin powder at the processing device input port of the second conductive heat transfer trough stirring dryer was 190° C., and the temperature of the water-absorbing resin powder at the processing device outlet port of the second conductive heat transfer trough stirring dryer was 200° C. (see Table 5). The first and second devices were serially connected to each other by a stainless pipe which was heated, and the second and third device were connected to each other by a stainless pipe which was not heated. The water-absorbing resin composition after the stirring/drying step was immediately processed in the surface crosslinking step (see Table 5), and the composition was immediately cooled down to room temperature in the cooling step. The resulting mixture was caused to pass through the JIS standard sieve having the mesh size of 850 μm. Thus, water-absorbing resin (2) was obtained.

TABLE 5

| Comparison Of Heat Treatment Devices | | |
|---|---|---|
| | Example 6 | Comparative Example 6 |
| Heat Transfer Area ($m^2$) | 2.5 | 2.5 |
| Effective Volume ($m^3$) | 0.065 | 0.065 |
| Paddle Diameter (mmϕ) | 160 | 160 |
| Number Of Rotations (rpm) | 30 (Former Portion) 5 (Latter Portion) | 30 |
| Number Of Devices, Arrangement | 2, Serially Connected | 1 |
| Processing Time (min) Of First Device | 30 | 65 |
| Processing Time (min) Of Second Device | 25 | — |
| Lowering Rate (%) Of Water Content Of First Device | 60 | 85 |
| Lowering Rate (%) Of Water Content Of Second Device | 85 | — |

Physical properties of the water-absorbing resin composition (2) obtained by the above method were evaluated. Results are shown in Table 6.

TABLE 6

| Comparison Of Physical Properties | | |
|---|---|---|
| | Water-absorbing Resin (2) Of Example 6 | Water-absorbing Resin (4) Of Comparative Example 6 |
| CRC (Average Value) | 28.5 | 28.5 |
| AAP (Average Value) | 25.6 | 25.0 |
| SFC (Average Value) | 50 | 45 |
| Weight Percentage Of Particles Of Less Than 150 μm In Diameter (Average Value) | 3% | 4% |

As shown in Tables 5 and 6, stirring power per unit weight of the dried particulate composition in the surface crosslinking step is lower than that of Comparative Example 6 below. Therefore, the amount of fine powder of 150 μm or less in diameter was suppressed. As a result, the AAP and SFC were improved.

Comparative Example 5

0.34 mass part of 1,4-BD, 0.56 mass part of PG, and 3 mass parts of pure water were added to and mixed with 100 mass parts of the water-absorbing resin precursor (A), obtained in Manufacture Example, at room temperature. 500 mass parts of the obtained wet product was put in the 5 L Mortar Heat Treatment Device (Processor, produced by Nishi Nippon Shikenki Seisakusho) in which (i) refined oil was used in the oil bath and (ii) the set temperature of the oil bath was 230° C. The wet product was stirred at low speed (rotation movement of 140 rpm and revolution movement of 62 rpm) and subjected to the heat treatment for 30 minutes (see Table 3). The resulting mixture was caused to pass through the JIS standard sieve having the mesh size of 850 μm. Thus, water-absorbing resin (3) was obtained.

Physical properties of the water-absorbing resin composition (2) were evaluated. Results are shown in Table 4.

Comparative Example 6

0.34 mass part of 1,4-BD, 0.56 mass part of PG, and 3 mass parts of pure water were added to and mixed with 100 mass parts of the water-absorbing resin precursor (A) obtained in Manufacture Example 1. The obtained wet product was continuously processed by two conductive heat transfer trough stirring dryers (throughput: 25 kg/h) (produced by Nara Machinery Co., Ltd., NPD1.6W) each of whose paddle diameter was 160 mmϕ, heat transfer area was 2.5 $m^2$ and effective volume was 0.065 $m^3$ (see Table 5). Regarding the number of rotations of the paddle of each processing device, the number of rotations of the paddle of the first conductive heat transfer trough stirring dryer was set to 30 rpm, and the number of rotations of the paddle of the second conductive heat transfer trough stirring dryer was set to 5 rpm. In the first dryer, Barreltherm #400 produced by Matsumura Oil Co., Ltd. was used as the heat medium, and was caused to circulate in the paddle. In the second dryer, normal-temperature tap water was used as the heat medium, and was caused to circulate in the jacket and paddle. The temperature of the water-absorbing resin powder at the processing device input port of the first dryer was 40° C., and the temperature of the water-absorbing resin powder at the processing device outlet port of the first dryer was 200° C. (see Table 5). The first and second dryers were connected to each other by a stainless pipe which was not heated. The resulting mixture was caused to pass through the JIS standard sieve having the mesh size of 850 μm. Thus, water-absorbing resin (4) was obtained.

Physical properties of the water-absorbing resin composition (4) were evaluated. Results are shown in Table 6.

As above, in the present invention, two steps that are the stirring/drying step and the surface crosslinking step are carried out. Therefore, it is possible to efficiently mass produce the water-absorbing resin having excellent physical properties.

Moreover, in the surface crosslinking treatment of the water-absorbing resin, the generation of the fine powder can be prevented efficiently by using stirring means including (i) a stirring board having a predetermined thickness and/or (ii) a scraping blade having a predetermined cross-sectional area and length.

Therefore, since the manufacturing method of the present invention can significantly contribute to efficient manufacturing of the water-absorbing resin having excellent physical properties, it can be utilized widely in a field regarding the manufacturing of various water-absorbing resin, such as disposable diapers, disposable adult incontinence clothes, disposable sanitary napkins and disposable bandages.

Moreover, the manufacturing method of the present invention can be used for manufacturing packing related products, such as drip sheets of foods.

Further, the manufacturing method of the present invention can be used in a field in which resin to be used needs to have the water-absorbing property and water-holding property, such as sealing complex between concrete blocks constituting a wall of a underwater tunnel, a water block tape of an optical fiber cable or transmission cable, water-retention agent for soil, pesticide, agricultural chemical and/or a carrier of herbicide.

Moreover, in the method for surface crosslinking the water-absorbing resin of the present invention, it is preferable that the processing device used for the step (2) and the processing device used for the step (3) be different in type and/or effective volume from each other.

According to the above configuration, it is possible to select processing devices which are appropriate for the properties of the water-absorbing resin to be manufactured and/or are appropriate for the respective steps (2) and (3).

That is, for example, in the step (2), it is possible to use a processing device (i) whose heat transfer area/effective volume is large, (ii) which has a plurality of axes to increase the stirring power, and (iii) in which each axis has a plurality of stirring boards. Moreover, for example, in the step (3), it is possible to use a processing device (i) whose heat transfer area/effective volume is small, (ii) which has no stirring board, and (iii) whose stirring power is mild.

As a result, in the step (2), it is possible to improve the efficiency of stirring, increase the average temperature-rising speed, and realize quick stirring and drying of the wet mixture. Moreover, in the step (3), it is possible to reduce, by the mild stirring, the damage to the water-absorbing resin, prevent the generation of the fine powder of the water-absorbing resin by lowering the average temperature-rising speed, and control the surface crosslink density. Therefore, it is possible to stably manufacture the water-absorbing resin having excellent physical properties.

Moreover, in the method for surface crosslinking the water-absorbing resin, it is preferable that the processing device used for the step (2) and the processing device used for the step (3) be driven under different heating conditions and/or different stirring conditions.

According to the above configuration, the heating conditions and/or the stirring conditions can be adjusted appropriately for the properties of the water-absorbing resin to be manufactured and/or appropriately for the respective steps (2) and the step (3).

That is, for example, in the processing device used for the step (2), the spec and set temperature of the heat source are adjusted so that the average temperature-rising speed becomes high, and the stirring power of the stirring board is adjusted so as to be high. Moreover, for example, in the processing device used for the step (3), the spec and set temperature of the heat source are adjusted so that the average temperature-rising speed becomes low, and the stirring power of the stirring board is adjusted so as to be low.

As a result, in the step (2), it is possible to improve the efficiency of stirring, increase the average temperature-rising speed, and realize quick stirring and drying of the wet mixture. Moreover, in the step (3), it is possible to reduce, by the mild stirring, the damage to the water-absorbing resin, prevent the generation of the fine powder of the water-absorbing resin by lowering the average temperature-rising speed, and control the surface crosslink density. Therefore, it is possible to stably manufacture the water-absorbing resin having excellent physical properties.

Moreover, in the method for manufacturing the water-absorbing resin of the present invention, it is preferable that the processing device used for the step (2) and the processing device used for the step (3) be different in type and/or effective volume from each other.

According to the above configuration, it is possible to select a processing device in which the stirring power of the stirring means and/or the temperature of heat applied by the stirring means and/or the heat transfer area/effective volume is/are appropriate for each step.

Therefore, it is possible to improve the efficiency of stirring and drying in the step (2) and/or the efficiency of surface crosslinking in the step (3). As a result, it is possible to reduce the damage to the hydrophilic crosslinked polymer and/or the water-absorbing resin in each step, and also possible to shorten the time of each step. Thus, it is possible to manufacture high-quality water-absorbing resin.

Moreover, in the method for manufacturing the water-absorbing resin of the present invention, it is preferable that the processing device used for the step (2) and the processing device used for the step (3) be driven under different heating conditions and/or different stirring conditions.

According to the above configuration, the stirring power of the stirring means and/or the temperature of heat applied by the stirring means and/or the heat transfer area/effective volume can be set appropriately for each step.

Therefore, it is possible to improve the efficiency of stirring and drying in the step (2) and/or the efficiency of surface crosslinking in the step (3). As a result, it is possible to reduce the damage to the hydrophilic crosslinked polymer and/or the water-absorbing resin in each step, and also possible to shorten the time of each step. Thus, it is possible to manufacture high-quality water-absorbing resin.

Moreover, it is preferable that a method for manufacturing water-absorbing resin of the present invention include: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step be carried out by using stirring means including a rotation axis having a plurality of stirring boards having sc raping blades, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring means be 10% or more but less than 50% of an area in the y-z plane between one stirring board from which the scraping blade projects and another stirring board provided so as to face the above one stirring board, and (ii) a length of the scraping blade in the y direction in the cross section taken along the y-z plane be 50% or more of a distance in the y-z plane between the above one stirring board and the above another stirring board, and (III) a ratio of a maximum thickness of the stirring board to a minimum thickness of the stirring board be 5 or less in the cross section taken along the y-z plane of the stirring means.

According to the above configuration, since the cross-sectional area and length of the scraping blade provided on the stirring board are adjusted to be in the above ranges, it is possible to stir the hydrophilic crosslinked polymer in a floating state without excessively compressing the hydrophilic crosslinked polymer, and also possible to prevent the aggregate and compression of the hydrophilic crosslinked polymer. Therefore, it is possible to suppress the generation of the fine powder. Further, since the ratio of the maximum thickness to the minimum thickness is 5 or less, that is, the stirring board whose thickness is comparatively uniform is used, it is possible to reduce the compression applied to the hydrophilic crosslinked polymer per cross-sectional area of the stirring board and release from the compression. Thus, it is possible to reduce the mechanical damage to the hydrophilic crosslinked polymer. Therefore, it is possible to manufacture the water-absorbing resin, the amount of fine powder of which is small.

Moreover, in the method for manufacturing the water-absorbing resin of the present invention, it is preferable that each of the scraping blades project from a plurality of the stirring boards, and the adjacent scraping blades among the scraping blades be provided alternately while sandwiching the rotation axis or be provided in parallel with each other, in the cross section taken along the y-z plane of the stirring means.

According to the above configuration, the cross-sectional area of the scraping blade can be made larger relative to the area in the y-z plane between (i) one stirring board from which the scraping blade projects or from which the scraping blade which is also connected to the other stirring board(s) projects and (ii) another stirring board provided so as to face the above one stirring board (hereinafter referred to as “area between the stirring boards”), and the length of the scraping blade can be increased.

Moreover, since the scraping blade is strongly fixed on the stirring board, it is possible to increase durability of the scraping blade. Therefore, it is possible to improve the efficiency of stirring and the delivery of powder, and also possible to carry out the surface crosslinking uniformly. Therefore, it is possible to manufacture the water-absorbing resin, the amount of fine powder of which is further small.

Moreover, in the method for manufacturing the water-absorbing resin of the present invention, it is preferable that the stirring board be in a disc shape or a disc shape a part of which is lacking.

According to the above configuration, as compared with a case where the stirring board is, for example, a wedge shape, it is possible to reduce the pressure applied to the hydrophilic crosslinked polymer when stirring the hydrophilic crosslinked polymer. Therefore, it is possible to reduce the density of powder of the hydrophilic crosslinked polymer. Therefore, it is possible to more efficiently manufacture the water-absorbing resin, the amount of fine powder of which is small.

Moreover, in the method for manufacturing the water-absorbing resin of the present invention, it is preferable than the stirring board also function as heat transferring means.

In order to crosslink the surface of the hydrophilic crosslinked polymer, it is necessary to heat the mixture of the hydrophilic crosslinked polymer containing the carboxyl group and the aqueous solution containing the surface crosslinking agent containing two or more functional groups which react with the carboxyl group.

According to the above configuration, the stirring means can carry out stirring without mechanically damaging the hydrophilic crosslinked polymer, can carry out stirring uniformly, and also functions as the heat transferring means. Therefore, while suppressing the generation of the fine powder, it is possible to uniformly apply, to the mixture, heat necessary for the crosslinking reaction. Therefore, it is possible to efficiently carry out the crosslinking reaction, and also possible to shorten the time of modification. On this account, it is possible to efficiently manufacture the water-absorbing resin, the amount of fine powder of which is small.

Moreover, a case where the stirring board is a disc shape or a disc shape a part of which is lacking is larger in the heat transfer area than a case where the stirring board is, for example, a wedge shape. Therefore, it is possible to improve the efficiency of the crosslinking reaction.

Further, since it is unnecessary to separately provide the heat transferring means, it is possible to miniaturize a water-absorbing resin manufacturing device.

Moreover, in the method for manufacturing the water-absorbing resin of the present invention, it is preferable that the stirring board also function as cooling means.

According to the above configuration, the stirring means can cool down the surface crosslinked hydrophilic crosslinked polymer while uniformly stirring the hydrophilic crosslinked polymer without mechanically damaging the hydrophilic crosslinked polymer. Therefore, it is possible to suppress the generation of the fine powder in the cooling step, and also possible to uniformly cool down the entire hydrophilic crosslinked polymers. Therefore, without excessively proceeding with the surface crosslinking, it is possible to manufacture the water-absorbing resin, the amount of fine powder of which is small. Moreover, since it is unnecessary to separately provide the cooling means, it is possible to miniaturize the water-absorbing resin manufacturing device.

As above, the method for surface crosslinking the water-absorbing resin of the present invention includes the steps of (i) mixing the solution containing the surface crosslinking agent with the water-absorbing resin precursor, so as to obtain the wet mixture, (ii) stirring and drying the wet mixture, so as to obtain the dried particulate composition containing the surface crosslinking agent, and (iii) carrying out the heat treatment of the dried particulate composition, so as to cause the surface crosslinking reaction of the dried particulate composition.

By stirring and drying the wet mixture so that the aggregate of particles which occurs when processing the wet mixture is suppressed, it is possible to obtain the dried particulate composition which is powder having high flowability. Therefore, in the step of causing the surface crosslinking reaction, it is possible to carry out a desired surface crosslinking with weak stirring or a device having no stirring blade. Therefore, the method for surface crosslinking the water-absorbing resin of the present invention can stably manufacture the water-absorbing resin having excellent physical properties.

Moreover, in the method for surface crosslinking the water-absorbing resin of the present invention, since efficient heating conditions and/or stirring conditions can be selected for each step, the staying time in the heat treatment device can be shortened. Therefore, it is possible to improve the productivity of the water-absorbing resin.

Moreover, as above, a method for manufacturing water-absorbing resin of the present invention includes a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step are/is carried out by using stirring means including a rotation axis having a plurality of stirring boards, and (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board is 5 or less in a cross section taken along a y-z plane of the stirring means.

Therefore, it is possible to reduce the compression applied to the hydrophilic crosslinked polymer per cross-sectional area of the stirring board and release from the compression, and also possible to uniformly stir the hydrophilic crosslinked polymer while suppressing the mechanical damage to the hydrophilic crosslinked polymer. Therefore, it is possible to manufacture the water-absorbing resin, the amount of fine powder of which is small.

Moreover, as above, a method for manufacturing water-absorbing resin of the present invention includes: a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, and in this method, (I) the modifying step and/or the cooling step are/is carried out by using stirring means including a rotation axis having a plurality of stirring boards having scraping blades, (II) where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring means is 10% or more but less than 50% of an area in the y-z plane between one stirring board from which the scraping blade projects and another stirring board provided so as to face the above one stirring board, and (ii) a length of the scraping blade in the y direction in the cross section taken along the y-z plane is 50% or more of a distance in the y-z plane between the above one stirring board and the above another stirring board.

Therefore, it is possible to uniformly stir the hydrophilic crosslinked polymer without excessively compressing the hydrophilic crosslinked polymer, and also possible to efficiently prevent the generation of the fine powder which is easily generated in the modifying step. On this account, it is possible to manufacture the water-absorbing resin, the amount of fine powder of which is small.

The present invention is not limited to the description of the embodiments above, but may be altered by a skilled person within the scope of the claims. An embodiment based on a proper combination of technical means disclosed in different embodiments is encompassed in the technical scope of the present invention. Moreover, all the Documents cited in the present specification are incorporated as references in the present specification.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method for manufacturing water-absorbing resin, comprising:

a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, at least one of the modifying step and the cooling step being carried out by using a stirring device including a rotation axis and including a plurality of stirring boards, wherein a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board being 5 or less in a cross section taken along a y-z plane of the stirring device, wherein the stirring board is in a disc shape or a disc shape a part of which is lacking.

2. A method for manufacturing water-absorbing resin, comprising:

a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, at least one of the modifying step and the cooling step being carried out by using a stirring device including a rotation axis and including a plurality of stirring boards having scraping blades, wherein a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring device being 10% or more but less than 50% of an area in the y-z plane between one stirring board from which the scraping blade projects and another stirring board provided so as to face said one stirring board, and (ii) a length of the scraping blade in the y direction in the cross section taken along the y-z plane being 50% or more of a distance in the y-z plane between said one stirring board and said another stirring board.

3. A method for surface crosslinking water-absorbing resin, comprising the sequential steps of:

(1) mixing a solution containing a surface crosslinking agent with a water-absorbing resin precursor, so as to obtain a wet mixture;

(2) stirring and drying the wet mixture, so as to obtain a dried particulate composition containing the surface crosslinking agent; and (3) carrying out a heat treatment of the dried particulate composition, so as to cause a surface crosslinking reaction of the dried particulate composition, 80 weight % or more of the dried particulate composition obtained in the step (2) being particles which pass through a sieve having a mesh size of 10 mm, each of the steps (2) and (3) being carried out by using at least one respective processing device, and the processing device used for the step (2) and the processing device used for the step (3) being serially connected to each other.

4. The method as set forth in claim 3, wherein the processing device used for the step (2) and the processing device used for the step (3) are different in at least one of type and effective volume from each other.

5. The method as set forth in claim 3, wherein the processing device used for the step (2) and the processing device used for the step (3) are driven under at least one of different heating conditions and different stirring conditions.

6. A method for surface crosslinking water-absorbing resin, comprising the sequential steps of:

(1) mixing a solution containing a surface crosslinking agent with a water-absorbing resin precursor, so as to obtain a wet mixture;

(2) stirring and drying the wet mixture, so as to obtain a dried particulate composition containing the surface crosslinking agent; and (3) carrying out a heat treatment of the dried particulate composition, so as to cause a surface crosslinking reaction of the dried particulate composition, 80 weight % or more of the dried particulate composition obtained in the step (2) being particles which pass through a sieve having a mesh size of 10 mm, the steps (2) and (3) being carried out by using one processing device, and the steps (2) and (3) being carried out under at least one of different heating conditions and different stirring conditions.

7. A method for manufacturing water-absorbing resin, comprising:

a modifying step that (i) is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer and (ii) includes a step (2) of stirring and drying the mixture, so as to obtain a dried particulate composition containing the surface crosslinking agent, and a step (3) of carrying out a heat treatment of the dried particulate composition, so as to cause a surface crosslinking reaction of the dried particulate composition; and a cooling step of cooling down the hydrophilic crosslinked polymer thus surface crosslinked, at least one of the step (2), the step (3) and the cooling step being carried out by using a processing device including a stirring device including a rotation axis and including a plurality of stirring boards, wherein a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board being 5 or less in a cross section taken along a y-z plane of the stirring device, the mixture being a wet mixture manufactured in a step (1) of mixing the hydrophilic crosslinked polymer containing the carboxyl group with the aqueous solution containing the surface crosslinking agent containing two or more functional groups which react with the carboxyl group, 80 weight % or more of the dried particulate composition obtained in the step (2) being particles which pass through a sieve having a mesh size of 10 mm, each of the steps (2) and (3) being carried out by using at least one respective processing device, and the processing device used for the step (2) and the processing device used for the step (3) being serially connected to each other, wherein the stirring board is in a disc shape or a disc shape a part of which is lacking.

8. A method for manufacturing water-absorbing resin, comprising:

a modifying step that (i) is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer and (ii) includes a step (2) of stirring and drying the mixture, so as to obtain a dried particulate composition containing the surface crosslinking agent, and a step (3) of carrying out a heat treatment of the dried particulate composition, so as to cause a surface crosslinking reaction of the dried particulate composition; and a cooling step of cooling down the hydrophilic crosslinked polymer thus surface crosslinked, at least one of the step (2), the step (3) and the cooling step being carried out by using a processing device including a stirring device including a rotation axis and including a plurality of stirring boards having scraping blades, wherein a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (a) a cross-sectional area of the scraping blade in a cross section taken along a y-z plane of the stirring device being 10% or more but less than 50% of an area in the y-z plane between one stirring board from which the scraping blade projects and another stirring board provided so as to face said one stirring board, and (b) a length of the scraping blade in the y direction in the cross section taken along the y-z plane being 50% or more of a distance in the y-z plane between said one stirring board and said another stirring board, the mixture being a wet mixture manufactured in a step (1) of mixing the hydrophilic crosslinked polymer containing the carboxyl group with the aqueous solution containing the surface crosslinking agent containing two or more functional groups which react with the carboxyl group, 80 weight % or more of the dried particulate composition obtained in the step (2) being particles which pass through a sieve having a mesh size of 10 mm, each of the steps (2) and (3) being carried out by using at least one respective processing device, and the processing device used for the step (2) and the processing device used for the step (3) being serially connected to each other.

9. A method for manufacturing water-absorbing resin, comprising:

a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, at least one of the modifying step and the cooling step being carried out by using a processing device including a stirring device including a rotation axis and including a plurality of stirring boards, wherein a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, a ratio of a maximum thickness of the stirring board to a minimum thickness of the stirring board being 5 or less in a cross section taken along a y-z plane of the stirring device, the mixture being a wet mixture manufactured in a step (1) of mixing the hydrophilic crosslinked polymer containing the carboxyl group with the aqueous solution containing the surface crosslinking agent containing two or more functional groups which react with the carboxyl group, the modifying step including a step (2) of stirring and drying the wet mixture, so as to obtain a dried particulate composition containing the surface crosslinking agent and a step (3) of carrying out a heat treatment of the dried particulate composition, so as to cause a surface crosslinking reaction of the dried particulate composition, 80 weight % or more of the dried particulate composition obtained in the step (2) being particles which pass through a sieve having a mesh size of 10 mm, the steps (2) and (3) being carried out by using one processing device, and the steps (2) and (3) being carried out under at least one of different heating conditions and different stirring conditions, wherein the stirring board is in a disc shape or a disc shape a part of which is lacking.

10. A method for manufacturing water-absorbing resin, comprising:

a modifying step that is a step of heating a mixture of a hydrophilic crosslinked polymer containing a carboxyl group and an aqueous solution containing a surface crosslinking agent containing two or more functional groups which react with the carboxyl group, so as to crosslink a surface of the hydrophilic crosslinked polymer; and a cooling step of cooling down the hydrophilic crosslinked polymer thus surface crosslinked, at least one of the modifying step and the cooling step being carried out by using a processing device including a stirring device including a rotation axis and including a plurality of stirring boards having scraping blades, where a direction parallel to a longitudinal direction of the rotation axis is a y direction, a direction that is perpendicular to the y direction and is parallel to a circumferential direction of the rotation axis is an x direction, and a direction perpendicular to the x direction and the y direction is a z direction, (i) a cross-sectional area of the scraping blade in a cross section taken along a y-z plane of the stirring device being 10% or more but less than 50% of an area in the y-z plane between one stirring board from which the scraping blade projects and another stirring board provided so as to face said one stirring board, and (ii) a length of the scraping blade in the y direction in the cross section taken along the y-z plane being 50% or more of a distance in the y-z plane between said one stirring board and said another stirring board, the mixture being a wet mixture manufactured in a step (1) of mixing the hydrophilic crosslinked polymer containing the carboxyl group with the aqueous solution containing the surface crosslinking agent containing two or more functional groups which react with the carboxyl group, the modifying step including a step (2) of stirring and drying the wet mixture, so as to obtain a dried particulate composition containing the surface crosslinking agent and a step (3) of carrying out a heat treatment of the dried particulate composition, so as to cause a surface crosslinking reaction of the dried particulate composition, 80 weight % or more of the dried particulate composition obtained in the step (2) being particles which pass through a sieve having a mesh size of 10 mm, the steps (2) and (3) being carried out by using one processing device, and the steps (2) and (3) being carried out under at least one of different heating conditions and different stirring conditions.

11. The method as set forth in claim 7, wherein the processing device used for the step (2) and the processing device used for the step (3) are different in at least one of type and effective volume from each other.

12. The method as set forth in claim 7, wherein the processing device used for the step (2) and the processing device used for the step (3) are driven under at least one of different heating conditions and different stirring conditions.

13. The method as set forth in claim 2, wherein a ratio of a maximum thickness of the stirring board to a minimum thickness of the stirring board is 5 or less in the cross section taken along the y-z plane of the stirring device.

14. The method as set forth in claim 1, wherein the stirring board also functions as a heat transferring device.

15. The method as set forth in claim 1, wherein the stirring board also functions as a cooling device.

16. The method as set forth in claim 8, wherein the processing device used for the step (2) and the processing device used for the step (3) are different in at least one of type and effective volume from each other.

17. The method as set forth in claim 8, wherein the processing device used for the step (2) and the processing device used for the step (3) are driven under at least one of different heating conditions and different stirring conditions.

18. The method as set forth in claim 8, wherein a ratio of a maximum thickness of the stirring board to a minimum thickness of the stirring board is 5 or less in the cross section taken along the y-z plane of the stirring device.

19. The method as set forth in claim 10, wherein a ratio of a maximum thickness of the stirring board to a minimum thickness of the stirring board is 5 or less in the cross section taken along the y-z plane of the stirring device.

20. The method as set forth in claim 2, wherein:

each of the scraping blades projects from a plurality of the stirring boards, and the adjacent scraping blades among the scraping blades are provided alternately while sandwiching the rotation axis or are provided in parallel with each other, in the cross section taken along the y-z plane of the stirring device.

21. The method as set forth in claim 8, wherein:

each of the scraping blades projects from a plurality of the stirring boards, and the adjacent scraping blades among the scraping blades are provided alternately while sandwiching the rotation axis or are provided in parallel with each other, in the cross section taken along the y-z plane of the stirring device.

22. The method as set forth in claim 10, wherein:

each of the scraping blades projects from a plurality of the stirring boards, and the adjacent scraping blades among the scraping blades are provided alternately while sandwiching the rotation axis or are provided in parallel with each other, in the cross section taken along the y-z plane of the stirring device.

23. The method as set forth in claim 2, wherein the stirring board is in a disc shape or a disc shape a part of which is lacking.

24. The method as set forth in claim 10, wherein the stirring board is in a disc shape or a disc shape a part of which is lacking.

25. The method as set forth in claim 2, wherein the stirring board also functions as a heat transferring device.

26. The method as set forth in claim 7, wherein the stirring board also functions as a heat transferring device.

27. The method as set forth in claim 10, wherein the stirring board also functions as a heat transferring device.

* * * * *